United States Patent [19]
Mical et al.

[11] Patent Number: 5,481,275
[45] Date of Patent: Jan. 2, 1996

[54] RESOLUTION ENHANCEMENT FOR VIDEO DISPLAY USING MULTI-LINE INTERPOLATION

[75] Inventors: Robert J. Mical, Redwood City; David L. Needle, Alameda; Teju J. Khubchandani, Mountain View; Stephen H. Landrum, San Leandro, all of Calif.

[73] Assignee: The 3DO Company, Redwood City, Calif.

[21] Appl. No.: 970,287

[22] Filed: Nov. 2, 1992

[51] Int. Cl.⁶ .................................................. G09G 1/06
[52] U.S. Cl. ........................ 345/132; 345/149; 345/138
[58] Field of Search .................................. 340/728, 731, 340/814; 358/140, 428, 451, 11, 298; 382/47; 364/229.4; 345/132, 136, 138, 127, 129, 130, 149, 147

[56] References Cited

U.S. PATENT DOCUMENTS

| | | |
|---|---|---|
| 4,345,244 | 8/1982 | Greer et al. . |
| 4,547,845 | 10/1985 | Ross ........................................ 364/229.4 |
| 4,653,013 | 3/1987 | Collins et al. ........................... 364/518 |
| 4,656,467 | 4/1987 | Strolle . |
| 4,719,509 | 1/1988 | Sakamoto . |
| 4,752,826 | 6/1988 | Barnett . |
| 4,771,279 | 9/1988 | Hannah .................................... 345/132 |
| 4,866,520 | 9/1989 | Nomura et al. . |
| 4,918,436 | 4/1990 | Johary . |
| 4,988,984 | 1/1991 | Gonzalez-Lopez .................... 345/132 |
| 5,019,903 | 5/1991 | Dougall et al. . |
| 5,038,297 | 8/1991 | Hannah ................................... 364/518 |
| 5,073,964 | 12/1991 | Resnikoff ................................ 382/41 |
| 5,081,645 | 1/1992 | Resnikoff et al. ...................... 375/1 |
| 5,091,717 | 2/1992 | Carrie et al. ........................... 340/703 |
| 5,101,446 | 3/1992 | Resnikoff et al. ..................... 382/56 |
| 5,119,082 | 6/1992 | Lumelsky et al. . |
| 5,134,495 | 7/1992 | Frazier et al. ......................... 358/298 |
| 5,170,442 | 12/1992 | Murai et al. .......................... 382/47 |
| 5,206,628 | 4/1993 | Kelleher . |
| 5,270,836 | 12/1993 | Kang . |

FOREIGN PATENT DOCUMENTS

| | | | |
|---|---|---|---|
| 0437630A1 | 7/1991 | European Pat. Off. | ......... G09G 5/36 |
| 0487267A2 | 5/1992 | European Pat. Off. | ......... H04N 9/76 |
| 90/15385 | 12/1990 | WIPO | ............................. G06F 12/00 |
| 91/19272 | 12/1991 | WIPO | ............................. G06K 9/36 |
| 92/02897 | 2/1992 | WIPO | ............................. G06K 9/36 |

OTHER PUBLICATIONS

Rosenfeld, Azriel and Kak, Avinash. "Digital Picture Processing", Academic Press, New York, 1976, pp. 57–59, 275–296 and 179–191.

*Primary Examiner*—Curtis Kuntz
*Assistant Examiner*—Vivian Chang
*Attorney, Agent, or Firm*—Fliesler, Dubb, Meyer & Lovejoy

[57] ABSTRACT

The invention provides a method and apparatus for enhancing apparent image resolution by way of multi-line interpolation. A method for enhancing the resolution of low-resolution image-data includes the steps of: providing a memory having independently addressable storage banks; storing the low-resolution image-data in the memory such that low-resolution image-data defining a first low-resolution row resides in a first of said storage banks and such that low-resolution image-data defining a second low-resolution row, adjacent to the first low-resolution row, resides in a second of said storage banks; extracting first through Nth low-resolution pixel signals from the memory, said signals representing values of low-resolution pixels in the adjacent first and second low-resolution rows of the low-resolution image-data; and producing a high-resolution pixel signal from said first through Nth low-resolution pixel signals in accordance with a distance-weighted algorithm.

43 Claims, 19 Drawing Sheets

NORMALIZED $d_{ST}$ FOR TARGET $T_{21}$ $1/d^2$ FOR $T_{21}$ (XY = 00)

| 0.5 | 1.0 | 0.5 | 0.2 |
|---|---|---|---|
| 1.0 | ■ | 1.0 | 0.25 |
| 0.5 | 1.0 | 0.5 | 0.2 |
| 0.2 | 0.25 | 0.2 | 0.125 |

$1/d^2$ FOR $T_{22}$ (XY = 01)

| 0.2 | 0.5 | 1.0 | 0.5 |
|---|---|---|---|
| 0.25 | 1.0 | ■ | 1.0 |
| 0.2 | 0.5 | 1.0 | 0.5 |
| 0.125 | 0.2 | 0.25 | 0.2 |

$1/d^2$ FOR $T_{11}$ (XY = 11)

| 0.2 | 0.25 | 0.2 | 0.125 |
|---|---|---|---|
| 0.5 | 1.0 | 0.5 | 0.2 |
| 1.0 | ■ | 1.0 | 0.25 |
| 0.5 | 1.0 | 0.5 | 0.2 |

$1/d^2$ FOR $T_{12}$ (XY = 10)

| 0.125 | 0.2 | 0.25 | 0.2 |
|---|---|---|---|
| 0.2 | 0.5 | 1.0 | 0.5 |
| 0.25 | 1.0 | ■ | 1.0 |
| 0.2 | 0.5 | 1.0 | 0.5 |

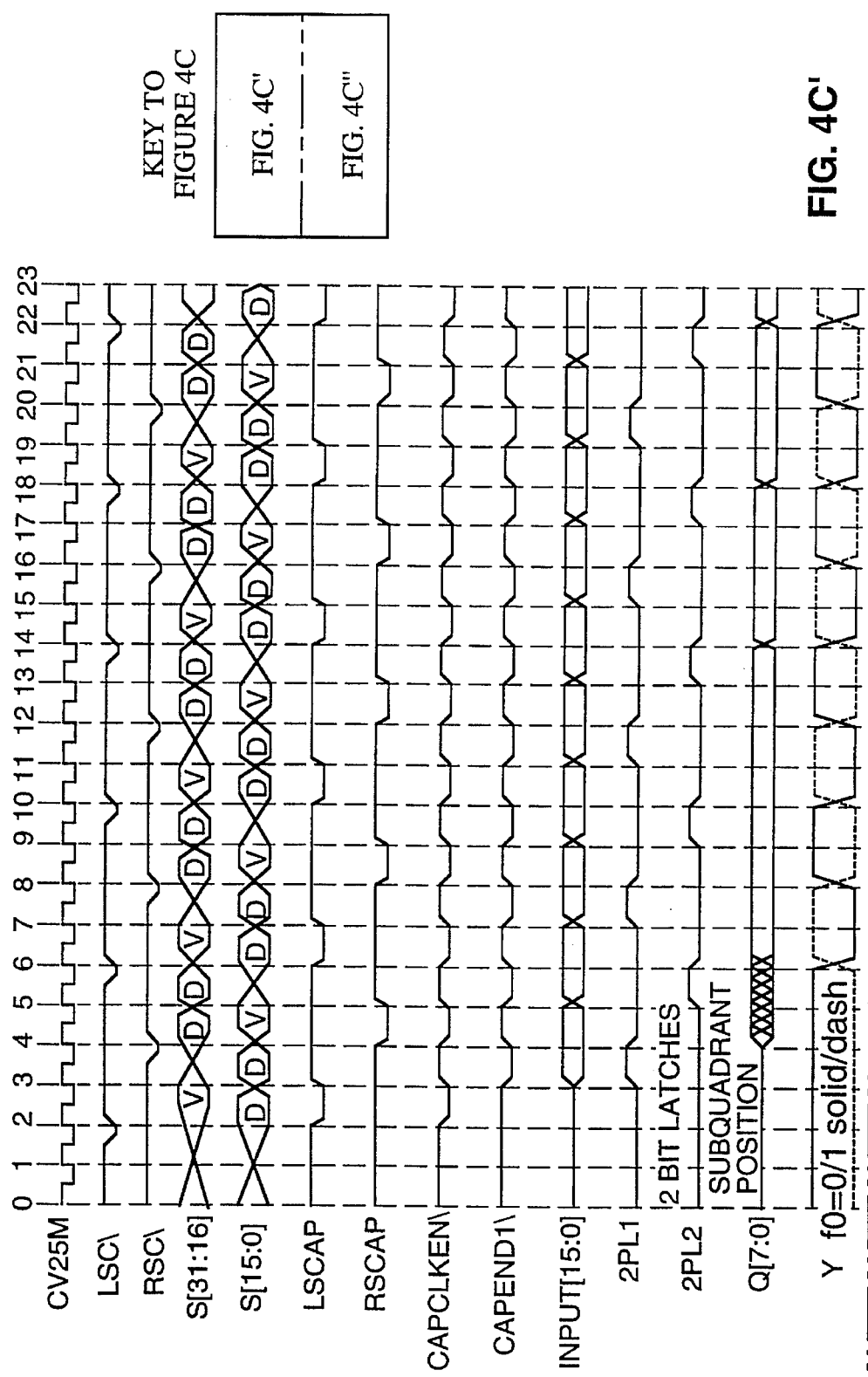

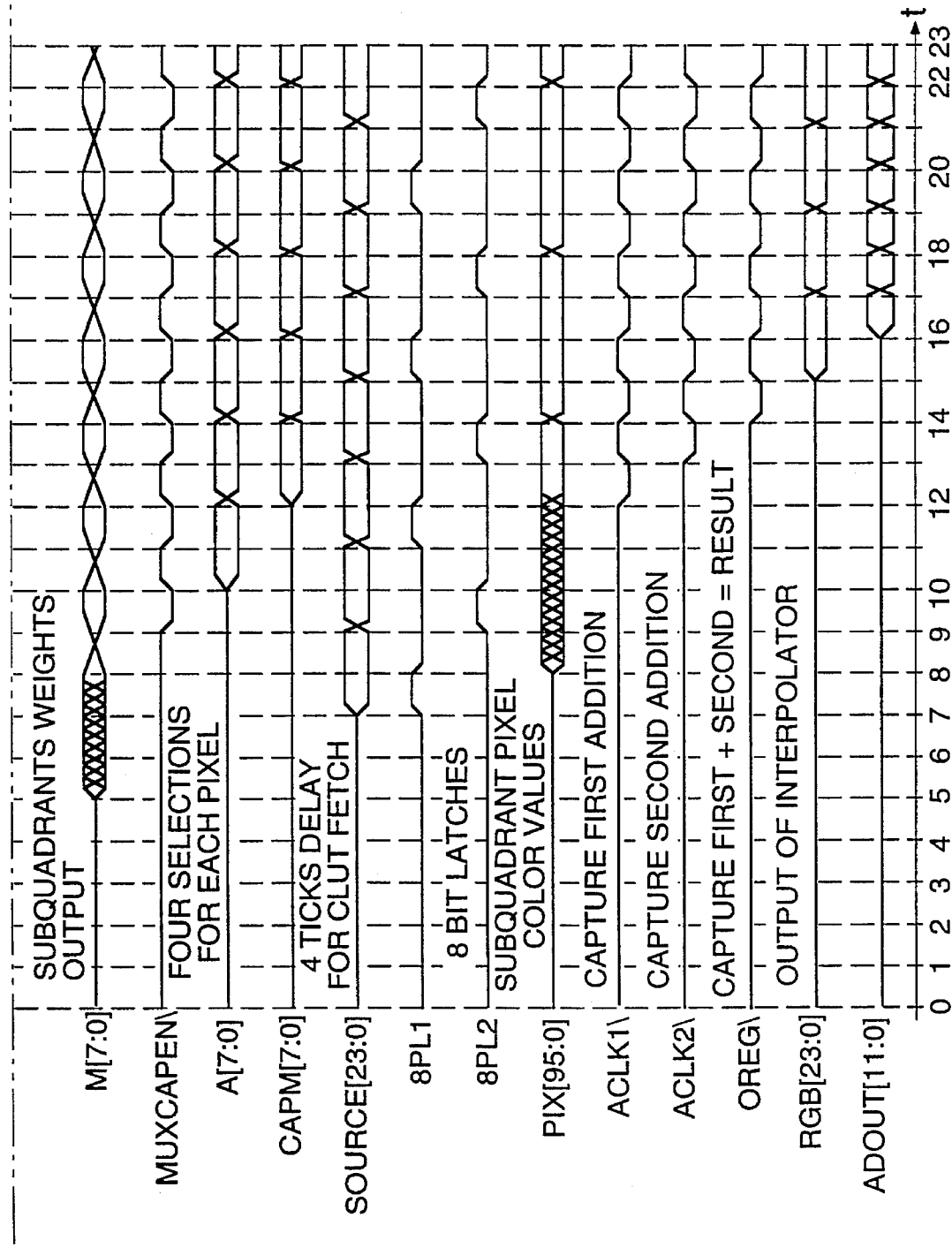
FIG. 4C"

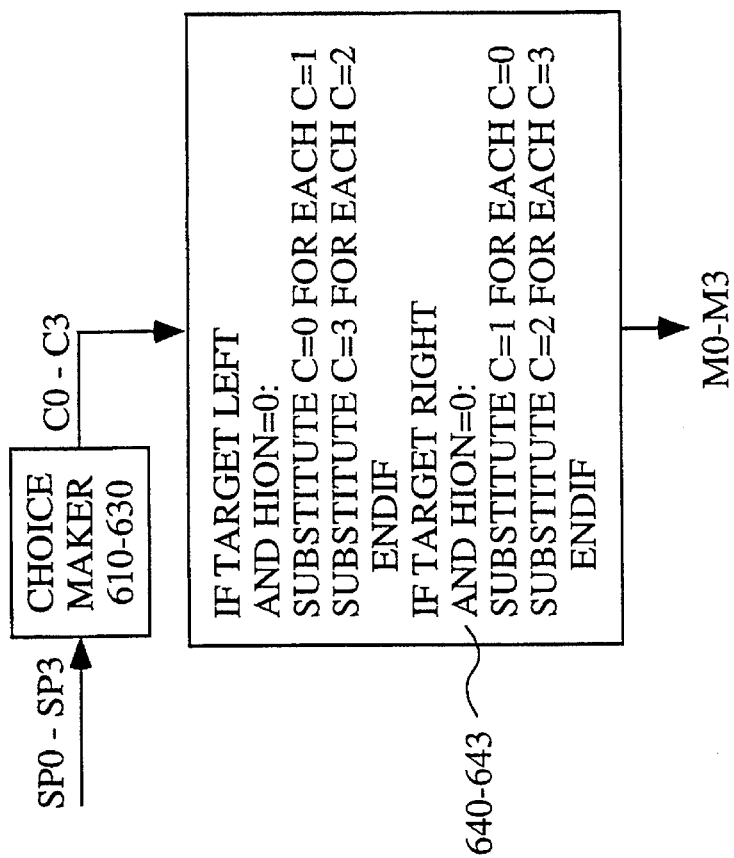
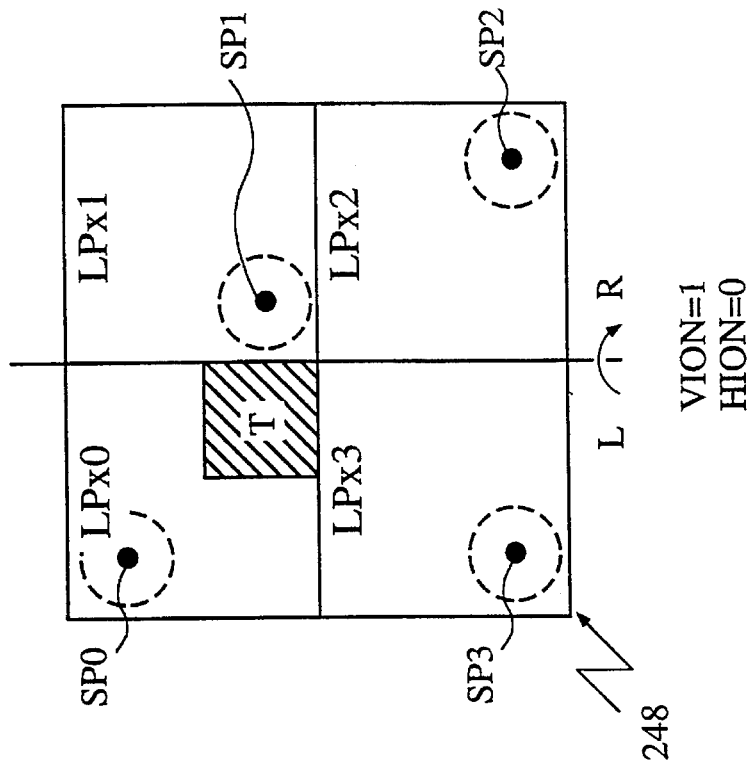
FIG. 6B.1

FIG. 6B.2
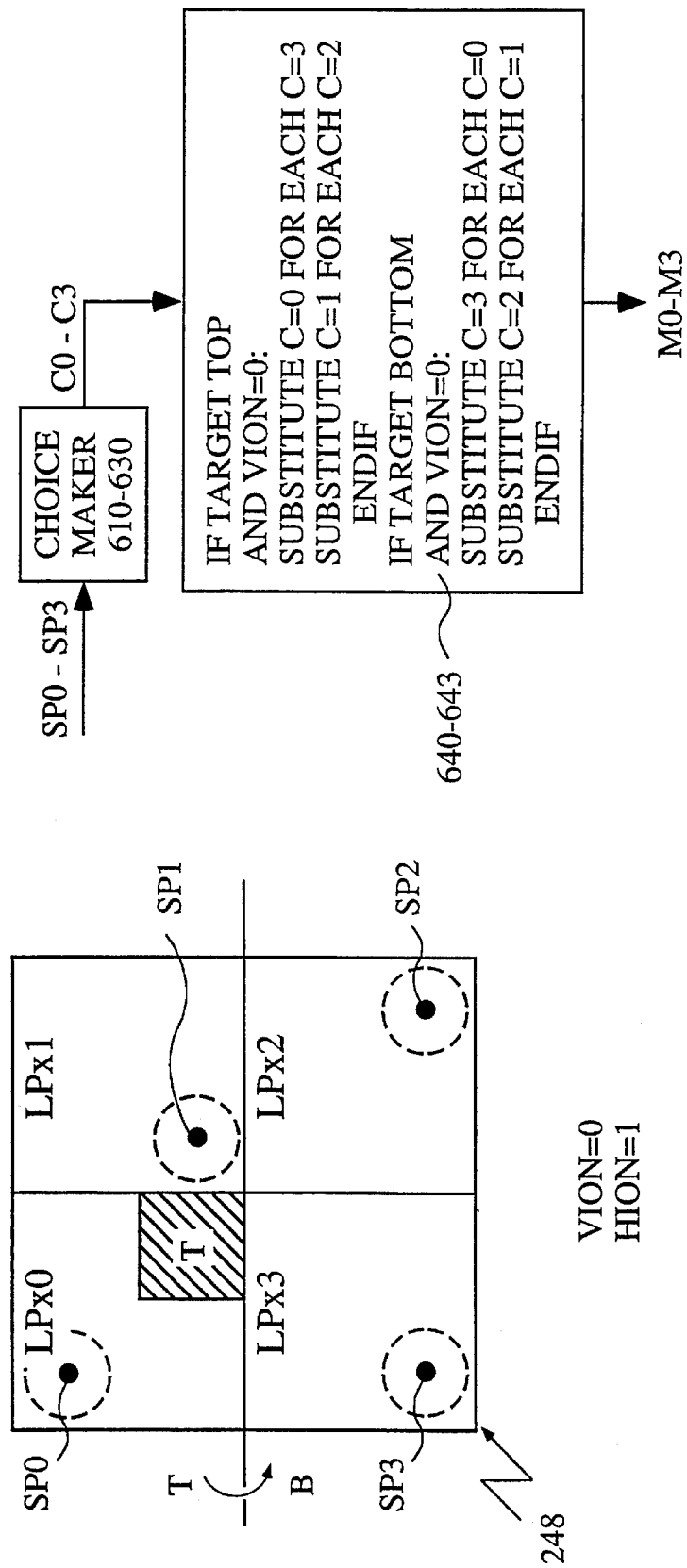

FIG. 6D.1
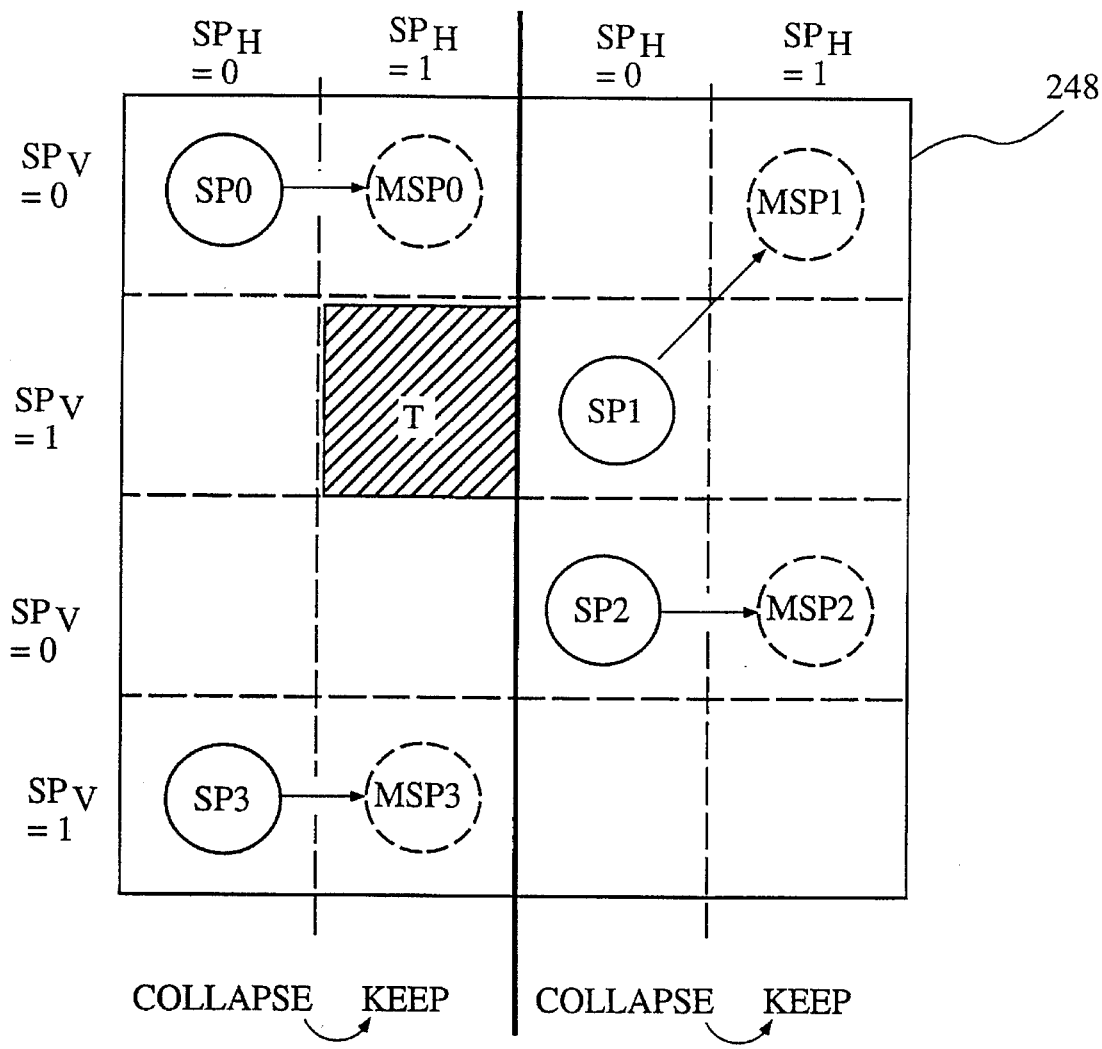

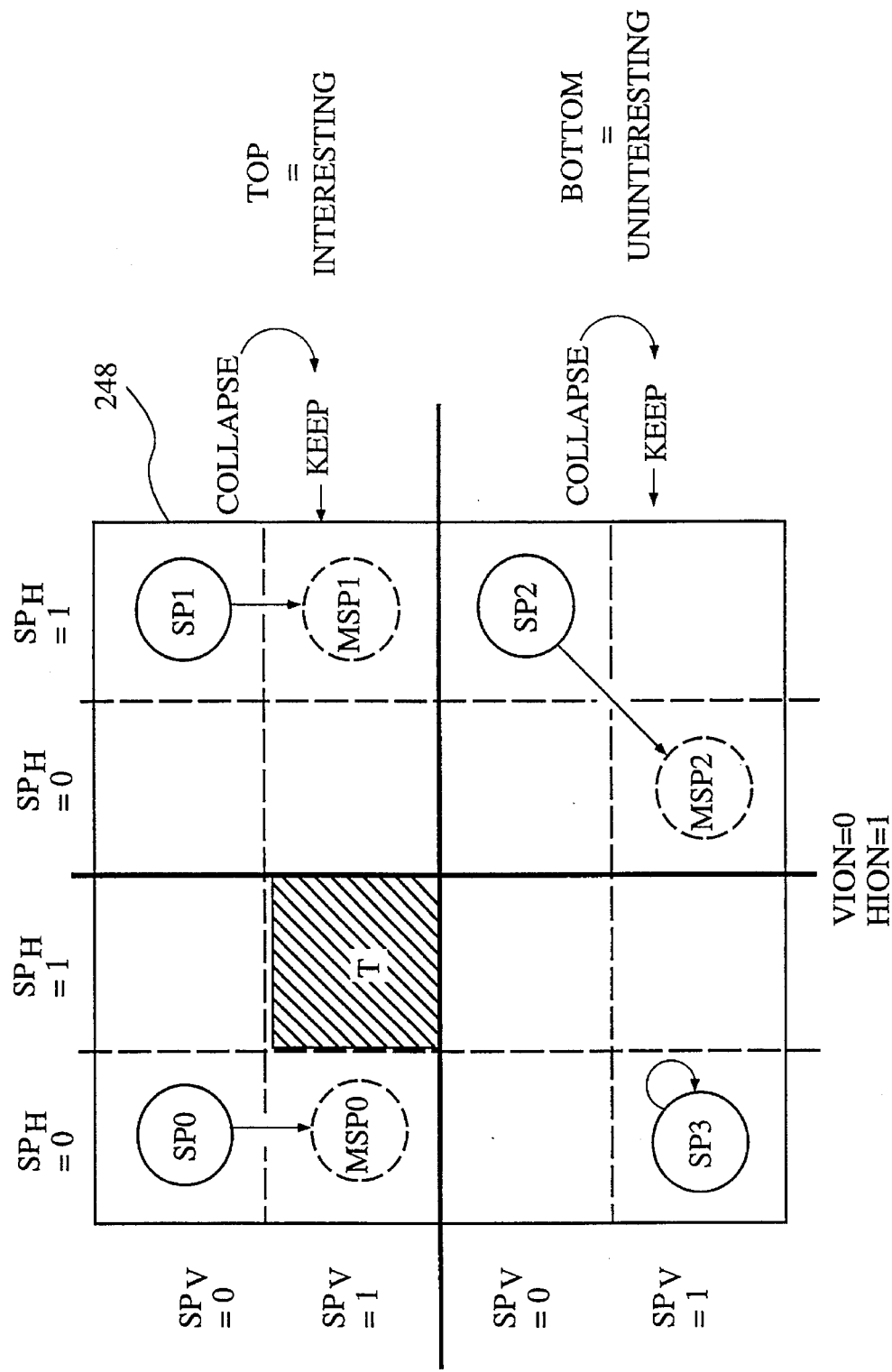
FIG. 6D.2

RESOLUTION ENHANCEMENT FOR VIDEO DISPLAY USING MULTI-LINE INTERPOLATION

BACKGROUND

FIELD OF THE INVENTION

The invention relates generally to digital image processing and the display of digitally generated images. The invention relates more specifically to the problem of creating high-resolution animated images in real time.

COPYRIGHT CLAIMS TO DISCLOSED CODE-CONVERSION TABLES

A portion of the disclosure of this patent document contains material which is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

In particular, this application includes listings of code conversion tables named: ITPCON, HVON, HV0ON, HV1ON, HV2ON, HV3ON. These code-conversion tables can be implemented by way of a computer program, microcode, in a ROM, and so forth. These code-conversion tables can also be implemented by way of combinatorial logic. Since implementations of the tables which are deemed to be "computer programs" are protectable under copyright law, copyrights not otherwise waived above in said code-conversion listings are reserved. This reservation includes the right to reproduce the code-conversion tables in the form of machine-executable computer programs.

CROSS REFERENCE TO RELATED APPLICATIONS

This application is related to:

PCT Patent Application Serial No. PCT/US92/09349, entitled AUDIO/VIDEO COMPUTER ARCHITECTURE, by inventors Mical et al., filed concurrently herewith, and also to U.S. patent application Ser. No. 07/970,380, bearing the same title, same inventors and also filed concurrently herewith;

PCT Patent Application Serial No. PCT/US92/09348, entitled METHOD FOR GENERATING THREE DIMENSIONAL SOUND, by inventor David C. Platt, filed concurrently herewith, and also to U.S. patent application Ser. No. 07/970,278, bearing the same title, same inventor and also filed concurrently herewith;

PCT Patent Application Serial No. PCT/US92/09350, entitled METHOD FOR CONTROLLING A SPRYTE RENDERING PROCESSOR, by inventors Mical et al., filed concurrently herewith, and also to U.S. patent application Ser. No. 07/970,278, bearing the same title, same inventors and also filed concurrently herewith;

PCT Patent Application Serial No. PCT/US92/09462, entitled SPRYTE RENDERING SYSTEM WITH IMPROVED CORNER CALCULATING ENGINE AND IMPROVED POLYGON-PAINT ENGINE, by inventors Needle et al., filed concurrently herewith, and also to U.S. patent application Ser. No. 07/970,289, bearing the same title, same inventors and also filed concurrently herewith;

PCT Patent Application Serial No. PCT/US92/09460, entitled METHOD AND APPARATUS FOR UPDATING A CLUT DURING HORIZONTAL BLANKING, by inventors Mical et al., filed concurrently herewith, and also to U.S. patent application Ser. No. 07/969,994, bearing the same title, same inventors and also filed concurrently herewith;

PCT Patent Application Serial No. PCT/US92/09467, entitled IMPROVED METHOD AND APPARATUS FOR PROCESSING IMAGE DATA, by inventors Mical et al., filed concurrently herewith, and also to U.S. patent application Ser. No. 07/970,083, bearing the same title, same inventors and also filed concurrently herewith; and PCT Patent Application Serial No. PCT/US92/09384, entitled PLAYER BUS APPARATUS AND METHOD, by inventors Needle et al., filed concurrently herewith, and also to U.S. patent application Ser. No. 07/970,151, bearing the same title, same inventors and also filed concurrently herewith.

The related patent applications are all commonly assigned with the present application and are all incorporated herein by reference in their entirety.

DESCRIPTION OF THE RELATED ART

In recent years, the presentation and pre-presentation processing of visual imagery has shifted from what was primarily an analog electronic format to an essentially digital format.

Unique problems come to play in the digital processing of image data and the display of such image data. The more prominent problems include providing adequate storage capacity for digital image data and maintaining acceptable data throughput rates while using hardware of relatively low cost. In addition, there is the problem of creating a sense of realism in digitally generated imagery, particularly in animated imagery.

The visual realism of imagery generated by digital video game systems, simulators and the like can be enhanced by providing special effects such as moving sprites, real-time changes in shadowing and/or highlighting, smoothing of contours and so forth.

Visual realism is further enhanced by increasing the apparent resolution of a displayed image so that it has a smooth photography-like quality rather than a grainy disjoined-blocks appearance of the type found in low-resolution computer-produced graphics of earlier years.

Although bit-mapped computer images originate as a matrix of discrete lit or unlit pixels, the human eye can be fooled into perceiving an image having the desired photography-like continuity if a matrix format comprised of independently-shaded (and/or independently colored) pixels is provided having dimensions of approximately 500-by-500 pixels or better at the point of display.

The VGA graphics standard, which is used in many present-day low-lost computer systems, approximates this effect with a display matrix having dimensions of 640-by-480 pixels. Standard-definition NTSC broadcast television also approximates this effect with a display technology that relies on interlaced fields with 525 lines per pair of fields and a horizontal scan bandwidth (analog) that is equivalent to approximately 500 RGB colored dots per line.

More advanced graphic display standards such as Super-VGA and High Definition Television (HDTV) rely on much higher resolutions, 1024-by-786 pixels for example. It is expected that display standards with even higher resolution numbers (e.g., 2048-by-2048) will emerge in the future.

As resolutions increase, the problem of providing adequate storage capacity for the corresponding digital image data becomes more acute. The problem of providing sufficient data processing throughput rates also becomes more acute. This is particularly so if the additional constraint of keeping hardware costs within acceptable price versus performance ranges comes in to play.

A display with 640-by-480 independent pixels (307,200 pixels total) calls for a video-speed memory unit (frame buffer) having at least 19 address bits or a corresponding $2^{19}$ independently-addressable data words (=512K words), where each data word stores a binary code representing the shading and/or color of an individual pixel. Each doubling of display resolution, say from 640-by-480 pixels to 1280-by-960 pixels, calls for a four-fold increase in storage capacity. This means an increase from 512K words to 2M words (two Megawords) in the given example. And in cases where parts or all of the 1280-by-960 display field have to be modified in real-time (to create a sense of animation), the four-fold increase of storage capacity calls for a corresponding four-fold increase in data processing bandwidth (image bits processed per second) as compared to what was needed for processing the 640-by-480 field.

The benefit versus cost ratio incurred by demands for more storage capacity and faster processing speed has to be questioned at some point. Perhaps the increase in performance is not worth the increase in system cost. On the other hand, it might be possible to create a perception of improved performance without the burden of increased cost.

SUMMARY OF THE INVENTION

The invention overcomes the above-mentioned problems by using a low-resolution image representation within an image data processing unit and by enhancing apparent image resolution through the use of interpolation prior to production of a displayable version of the image.

Instead of providing independent shading and/or coloring and/or illumination control for each pixel of a high resolution display, the invention provides an interpolation mechanism in which a first number, N, of low-resolution pixels determine the shading/coloring of a second larger number, M>N, of high-resolution pixels.

In one particular embodiment, a flying window overlaps a small number (N=4) of low-resolution pixels (interpolation group) belonging to adjacent rows. The contents of the flying window are interpolated in real time to produce a larger number (M=16) of high resolution pixels in alternate odd/even line passes. A 320-by-240 matrix of low-resolution stored pixels is interpolated in real time to produce a non-stored, dual-field, frame of display data with an apparent higher-resolution of 640-by-480 pixels.

The produced higher-resolution frame data is either immediately used or ultimately used to generate a light image that is intended to be transmitted to the eyes of a human being and appreciated by that human being for its opto-physiological and/or psycho-visual, graphic content. As such, high-resolution data signals that are produced in accordance with the invention ultimately manifest themselves as significant parts of a physically real entity; the displayed image.

One embodiment of the invention avoids the need of a row buffer for separately storing the image data of one or more rows during multi-row interpolation. Source image data is placed within independently addressable, parallel banks of a multi-bank video random access memory unit (VRAM). The image data is arranged such that pixels of adjacent rows but a same column will be fetched in parallel when same address signals are applied to each of the independently addressable banks of the multi-bank VRAM.

The advantages of such an arrangement include reduced demand for large-capacity video-speed memory, reduced demand for high-bandwidth image processing hardware, a consequential decrease in system cost, and automatic smoothing in the displayed image of pixel-to-adjacent-pixel discontinuities.

A structure in accordance with the invention comprises: (a) a memory unit for storing low-resolution pixel data of adjacent, low-resolution scan lines in adjacently addressable memory locations; (b) means for extracting from the memory unit, an interpolation group consisting of N low-resolution pixel words, where N is an integer substantially less than the number of pixels in a low-resolution line; (c) interpolating means for interpolating the N low-resolution pixel words of the interpolation group and producing therefrom one or more high-resolution pixel words; and (d) high-resolution display means for displaying a light image having pixels corresponding to each high-resolution pixel word produced by the interpolating means.

A method in accordance with the invention comprises the steps of: (a) storing low-resolution image-data in a memory having independently addressable storage banks such that low-resolution image-data defining a first low-resolution row resides in a first of said storage banks and such that low-resolution image-data defining a second low-resolution row, adjacent to the first low-resolution row, resides in a second of said storage banks; (b) extracting first through Nth low-resolution pixel signals $[S_1-S_3]$ from the memory, said signals representing values of low-resolution pixels in the adjacent first and second low-resolution rows $[LR_0, LR_1]$ of the low-resolution image-data and producing a high-resolution pixel signal [Hpx] from said first through Nth low-resolution pixel signals $[S_1-S_3]$ in accordance with a distance-weighted algorithm.

BRIEF DESCRIPTION OF THE DRAWINGS

The below detailed description makes reference to the accompanying drawings, in which:

FIG. 4C is a timing diagram showing the timing of various signals developed in the embodiment of FIG. 4A.

FIGS. 6B.1 and 6B.2 are diagrams explaining the functions of post-choice modifying units 640–643 of FIG. 6A.

FIGS. 6D.1 and 6D.2 are diagrams explaining the functions of subposition modifying units 1640–1643 of FIG. 6C.

DETAILED DESCRIPTION

Figure 1:
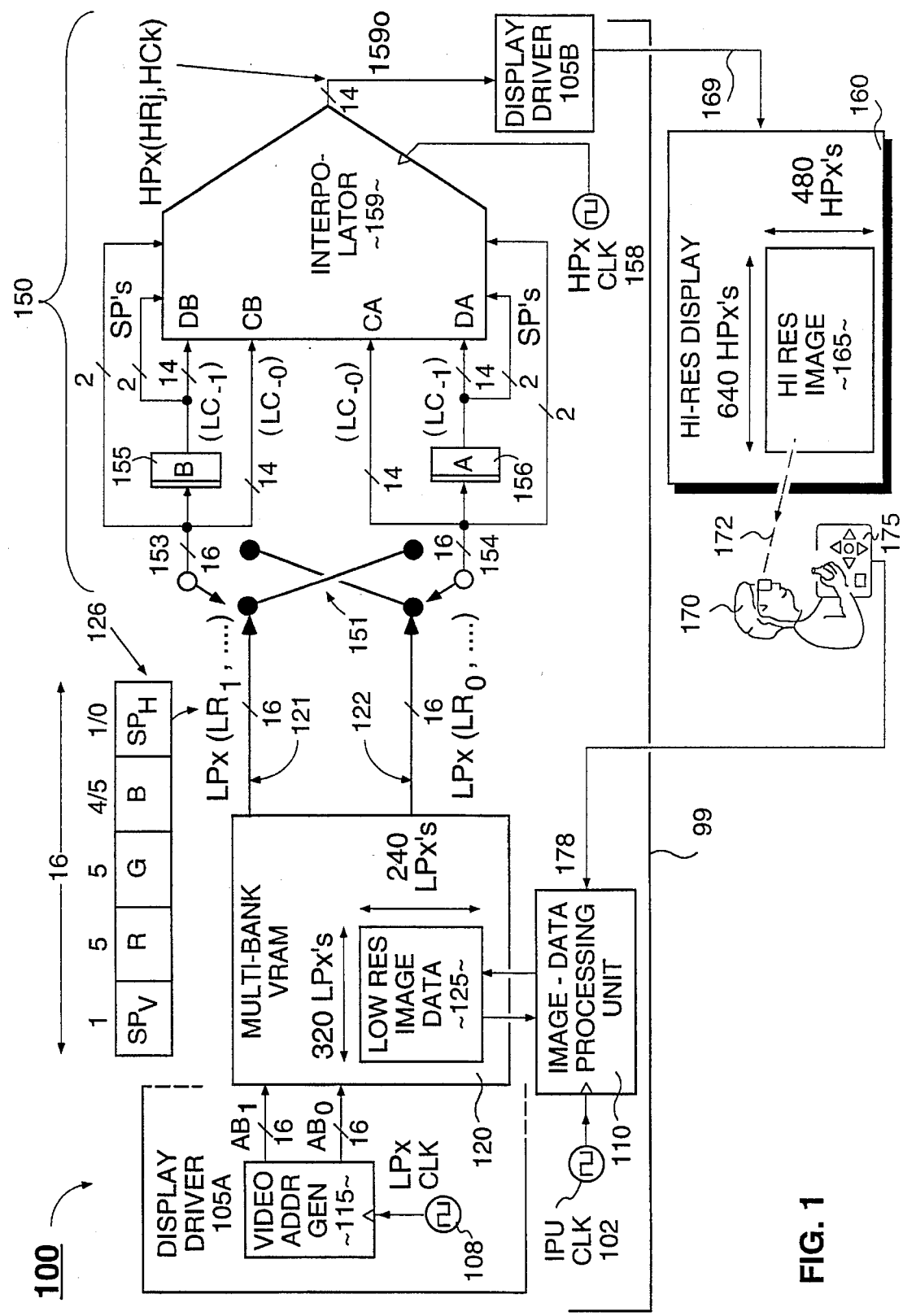
FIG. 1 is a block diagram of a first resolution enhancing system in accordance with the invention.

Referring to FIG. 1, a block diagram of an image processing and display system 100 in accordance with the invention is shown.

A key feature of system 100 is that it is relatively low in cost and yet it provides mechanisms for handling complex image scenes in real time and displaying them such that they appear to have relatively high resolution.

This feature is made possible by including a resolution-enhancing subsystem 150 on one or a few integrated circuit (IC) chips within the system 100. The operations of subsystem 150 are best understood by first considering the video processing operations of system 100 in an overview sense.

FIG. 1 provides an overview of the system 100. Except where otherwise stated, all or most parts of system 100 are implemented on a single printed circuit board 99 and the circuit components are defined within one or a plurality of integrated circuit (IC) chips mounted to the board 99. Except where otherwise stated, all or most of the circuitry is implemented in CMOS (complementary metal-oxide-semiconductor) technology using 0.9 micron line widths. An off-board power supply (not shown) delivers electrical power to the board 99.

System 100 includes a video display driver 105A–105B, a real-time image-data processing unit (IPU) 110, a video random-access memory unit (VRAM) 120 having multiple independently-addressable storage banks, the aforementioned resolution-enhancing subsystem 150 and a high-resolution video display unit 160.

In the illustrated embodiment, VRAM 120 has two independently-addressable storage banks. A front-end portion 105A of the video display driver incorporates a low-resolution video pixel (LPx) clock generator 108 supplying periodic clock pulses to a dual-output video-address generator (VAG) 115. The VAG 115 outputs two bank-address signals, $AB_0$ and $AB_1$, to the multi-bank VRAM 120 in response to a pulse received from the LPx clock generator 108.

VRAM 120 outputs two pixel-defining "halfword" signals, $Px(LR_0)$ and $Px(LR_1)$, on respective VRAM output buses 122 and 121 to the resolution-enhancing subsystem 150 in response to respective ones of the bank-address signals, $AB_0$ and $AB_1$.

The resolution-enhancing subsystem 150 includes a cross-over unit 151 for selectively transposing the $Px(LR_0)$ and $Px(LR_1)$ signals; first and second delay registers, 156 and 155 (A and B), coupled to the crossover unit 151 for generating previous-column signals, $Px(LR_0, LC_{-1})$ and $Px(LR_1, LC_{-1})$; and an interpolator 159 for generating high-resolution pixel signals, $HPx(HR_j, HC_k)$, in response to the previous-column signals, $Px(LR_0, LC_{-1})$ and $Px(LR_1, LC_{-1})$ and in response to current-column signals, $Px(LR_0, LC_{-0})$ and $Px(LR_1, LC_{-0})$, supplied from the cross-over unit 151. The bus which connects the output of cross-over unit 151 to the input of A-register 156 is referred to as the A-side bus 154. The bus which connects the opposed output of cross-over unit 151 to the input of B-register 155 is referred to as the B-side bus 153.

The high-resolution pixel signals, $HPx(HR_j, HC_k)$, produced by interpolator 159 appear on output bus 159o and then pass by way of display-driver portion 105B to the video display unit 160. A high-resolution pixel clock generator (HPx CLK) 158, operating at twice the frequency of the LPx clock generator 108, drives the resolution-enhancing subsystem 150 such that high-resolution pixel signals $HPx(HRj, HCk)$ appear on output bus 159o at twice the rate that low-resolution pixels $Px(LR_0)$ and $Px(LR_1)$ appear on VRAM output buses 122 and 121. (Incidentally, the video display unit 160 is located off board 99 and its circuitry can be implemented in technologies other than CMOS.)

Figure 2:
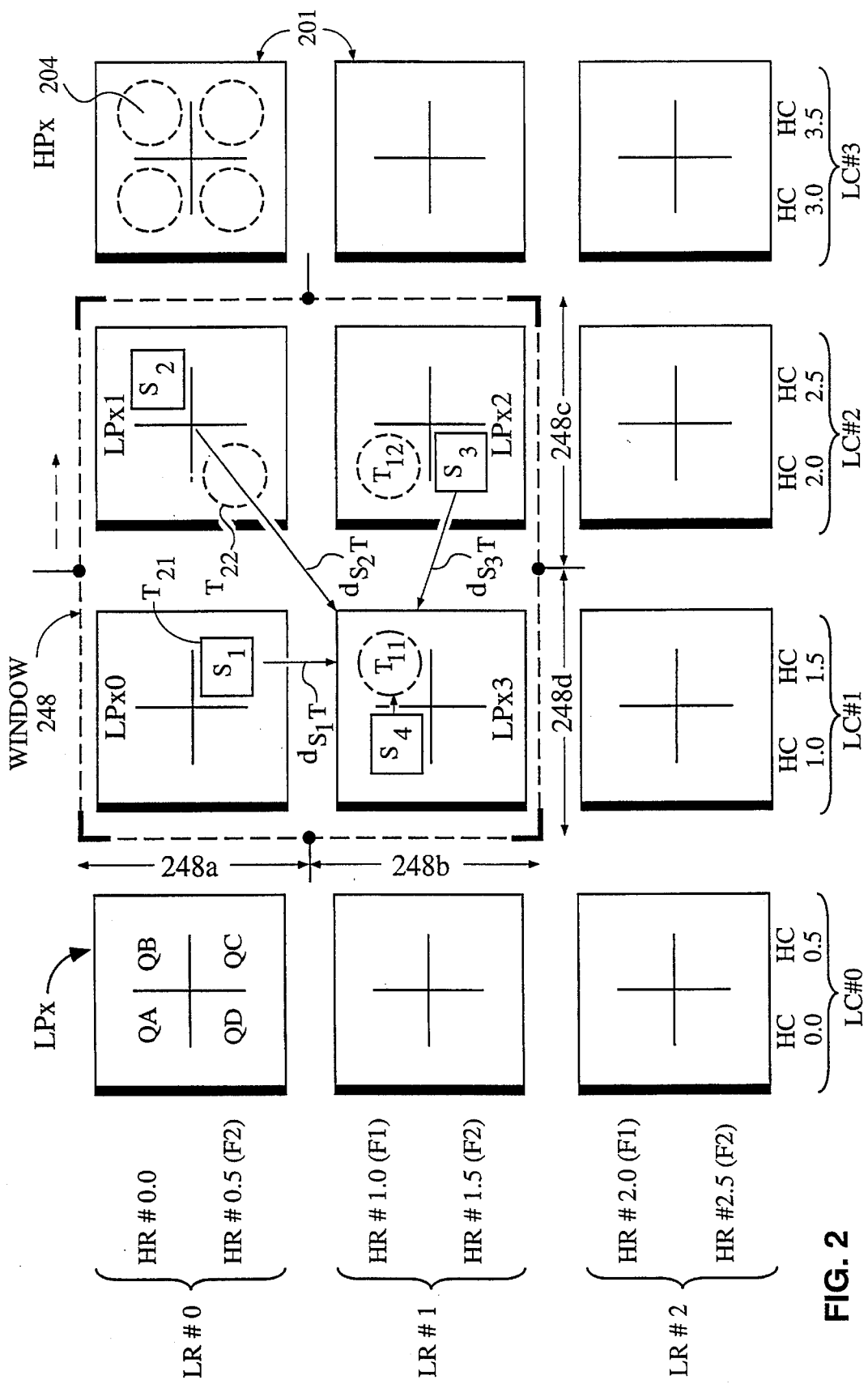
FIG. 2 is a schematic diagram illustrating how a group of low-resolution pixel datawords is interpolated to generate high-resolution pixel data in accordance with the invention.

The abbreviation "LR" is used in the above paragraphs and throughout the remainder of this disclosure to represent "Low-resolution Row". The abbreviation "LC" is used throughout this disclosure to represent "Low-resolution column". Similarly the abbreviations "HR" and "HC" are used throughout to respectively represent High-resolution Row and High-resolution Column. FIG. 2 shows the relation between low-resolution and high-resolution rows and columns.

The subscript "0" is often times (but not always) used in this disclosure to indicate an even-numbered row. The subscript "1" is often times (but not always) used to indicate an odd-numbered row. The abbreviation "HPx" is used to represent High-resolution Pixel.

The simple abbreviation "Px" is used to represent a low-resolution pixel. A reference such as $Px(LR_0, LC_k)$ therefore indicates a low-resolution pixel associated with an even-numbered low-resolution row, $LR_0$, and low-resolution column numbered as, $LC_k$. The abbreviation "LPx" is also used occasionally to represent a low-resolution pixel.

A reference such as $HPx(HR_j, HC_k)$ indicates a high-resolution pixel associated with a high-resolution row numbered as $HR_j$, and a high-resolution column numbered as $LC_k$, where j and k refer to either odd or even integers.

In the illustrated embodiment of FIG. 1, a human observer 170 is shown viewing a high-resolution image 165 projected from (or onto) video display unit 160. The perceived performance and image resolution is referenced as 172.

Display unit 160 is a VGA color monitor or an NTSC-compatible color television set, or a like display means (e.g., a liquid crystal display panel) or a display means of better resolution which has the capacity to display a pixel matrix of at least, approximately 640 by-480 pixels resolution. The link 169 between board 99 and display unit 160 can be provided through a baseband connection or by way of an RF modulator/demodulator pair.

The image data processing unit (IPU) 110 is driven by a processor clock generator 102 (50.097896 MHz divided by one or two) operating in synchronism with, but at a higher frequency than the LPx clock generator 108 (12.2727 MHz). IPU 110 includes a RISC type 25 MHz or 50 MHz ARM610 microprocessor (not shown) available from Advanced RISC Machines Limited of Cambridge, U.K. A plurality of sprite-rendering engines (not shown) and direct memory access (DMA) hardware (not shown) are also provided within the IPU 110.

The IPU 110 accesses binary-coded data (e.g., 125) stored within the VRAM 120 and modifies the stored data at a sufficiently high-rate of speed to create the illusion for observer 170 that real-time animation is occurring in the high-resolution image 165 displayed on video display unit 160. In many instances, observer 170 will be interactively affecting the animated image 165 by operating buttons or a joystick or other input means on a control panel 175 that feeds back signals 178 representing the observer's real-time responses to the image data processing unit (IPU) 110.

IPU 110 is operatively coupled to the video random-access memory (VRAM) 120 such that the IPU 110 has read/write access to various control and image data structures stored within VRAM 120 either on a cycle-steal basis or on an independent access basis. For purposes of the disclosed invention, the internal structure of IPU 110 is immaterial. Any means for loading and modifying the contents of VRAM 120 at sufficient speed to produce an animated low-resolution image data structure 125 of the type described below will do.

The VRAM 120 has the capacity to store 1 megabyte of data but it can be expanded to store 2 or 4 or 16 megabytes of data. (A byte is understood to consist of eight bits of data.) One to two megabytes of VRAM storage is preferred but not an absolute minimum or maximum storage requirement. The system will work with a VRAM of larger or smaller capacity also. VRAM access time should be small enough to meet the demands of the low-resolution pixel video clock 108 and processor clock 102. It is to be understood that VRAM 120 can be incorporated within a larger "system" memory that includes DRAM and/or RAMBUS™ storage devices. In such a case, VRAM 120 can serve as a cache area into which there is loaded image data that is to be then displayed or otherwise processed.

The IPU 110 reads and writes data from/into the VRAM 120 in the form of 32-bit wide "words". Physically, the VRAM 120 is split into left and right independently addressable banks where each bank has its own 16-bit-wide address port and 16-bit wide data port. This gives hardware devices, such the resolution-enhancing subsystem 150, simultaneous access to two separately addressable 16-bit "halfwords" within VRAM 120. In most instances, such as when the image data processing unit (IPU) 110 is accessing data within VRAM 120, the same address is applied to both banks of the VRAM 120, and accordingly, the VRAM 120 functions as a unitary 32-bit wide word-storing system. When the resolution-enhancing subsystem 150 is fetching data out of VRAM 120, however, the left-bank address word $AB_0$ (a 16-bit-wide signal) can be different from the right-bank address word $AB_1$ (also a 16-bit-wide signal). They can also be the same when desired.

VRAM 120 is programmed to contain image-defining data in a variety of VRAM address regions, including a low-resolution, current frame-buffer region (cFB) 125. The VRAM 120 also contains image-rendering control data in other regions (not shown) and instruction code for execution by the IPU 110 in yet other regions (not shown). In addition to current frame-buffer region (cFB) 125, the VRAM 120 will often contain one or more alternate frame-buffer regions (aFB's, not shown) storing low-resolution image data of similar structure to that stored in the current frame-buffer region (cFB) 125. A system variable is occasionally switched to designate one of these other regions as the current frame-buffer, thereby providing a quick means for changing the displayed image en masse.

If desired, VRAM 120 can also store high-resolution image data (not shown) and the stored high-resolution image data can be transmitted as is to video display unit 60.

When low-resolution images are to be displayed, the front end display driver 105A, which includes video-address generator (VAG) 115 and low-resolution pixel clock generator 108, periodically fetches low-resolution formatted display data (e.g. at a rate of 60 fields a second when display driver 105A–105B is operating in NTSC mode) from the system's current frame buffer region (cFB) 125. The fetched data appears in 32-bit-wide parallel format on respective left and right data output buses 122 (even) and 121 (odd) of VRAM 120.

Each of the fetched left and right halfwords, $Px(LR_0, LC_k)$ and $Px(LR_1, LC_k)$, is structured as shown at 126 to consist of 16 bits. When an RGB color-system is employed, 5 of the 16 halfword bits define one out of 32 possible Red gun intensities, 5 of the bits define one out of 32 possible Green gun intensities, and 4 (or 5 depending on a selected interpolation mode) of the bits define one out of 16 (or 32 depending on mode) possible Blue gun intensities. (Aside: it was found that the human eye is less sensitive to intensity variations at the blue end of the visible spectrum than to those at the red end, hence it is acceptable to provide less variance at the blue end when one of the 16 halfword bits is borrowed for other functions.)

When 4-bit blue mode is employed, the remaining 2 of the 16 halfword bits are referred to as the vertical and horizontal subposition bits, $SP_V$ and $SP_H$. They are used by a pixel interpolating portion 159 of resolution-enhancing subsystem 150 for resolution expansion. Although the format of the current frame buffer (cFB) 125 is 320×240 pixels, it is possible to expand its image into a 640×480 pixels format by judiciously copying the shading value of each original pixel in the 320×240 format (hereafter "low-resolution pixel") to a selected one of 4 corresponding pixel spaces in the 640×480 format (hereafter "high-resolution pixel" or "HPx"). The remaining three pixel spaces in the high-resolution space are filled through the use of an interpolation algorithm. The 2 subposition bits, $SP_V$ and $SP_H$, of each 16-bit halfword control the one-out-of-four placement step.

The $SP_H$ subposition bit is positioned adjacent to the least significant bit of the 4-bit blue field. When 5-bit blue mode is employed, the $SP_H$ subposition bit is replaced by the least significant bit of the 5-bit blue field. The remaining one of the 16 halfword bits is still referred to as the vertical subposition bit, $SP_V$, and it is used in a one-out-of-two placement step to control interpolation. The latter interpolation algorithm will be described later, in conjunction with

FIG. 2.

A RAM (not shown in FIG. 1), which functions as a color look-up table (CLUT), may be included in system 100 to convert the 5/5/4-bit-wide formatted RGB data of data structure 126 into 8/8/8-bit-wide formatted RGB data so as to provide a 24 shading-bits-per pixel RGB format. For the sake of simplification, system 100 (FIG. 1) is assumed to not include a CLUT. A second system 400 of a later-discussed FIG. 4A does include such a CLUT (451,452).

The invention is not restricted to RGB formats. Other digital formats such as YCC, or Composite Video Broadcast Standard (CVBS), can also be used. For the sake of simplification, RGB format is assumed.

If the video display unit 160 requires an analog input, an output portion 105B of the display driver converts the output of the resolution-enhancing subsystem 150 into NTSC or PAL or Super-VHS or some other analog signal format, and supplies the converted signal to the video display unit (TV monitor) 160. For the case of NTSC display, each pair of frames (a frame consists of two fields) is divided into four interlaced fields (FIELDS 1, 2, 3 and 0). The four fields are sequentially flashed to the eyes of a viewer 170 over time to create the illusion of animation. In some instances, the viewer 170 may be wearing stereoscopic eyeglasses (e.g., liquid crystal shutters) which alternatively block light from reaching one or the other of the viewers left and right eyes so as to create a three-dimensional effect. The stereoscopic image is appropriately distributed across FIELDS 0–1 and 2–3 for such instances. For the sake of simplicity, the two fields of a frame will be referred to as F1 and F2 throughout this disclosure.

Before the resolution-enhancing subsystem 150 is described in more detail, a few simple observations can be made with regard to having data representing a low-resolution image 125 stored in VRAM 120 rather than a high-resolution image 165. First, the storage capacity demands placed on VRAM 120 are small in comparison to those that would have been made if the current frame buffer (cFB) 125 and the alternate frame buffers (aFB's, not shown) had to store data representing an image of higher-resolution. Second, the image-processing bandwidth required from image data processing unit (IPU) 110 is small in comparison to what would have been required if the current frame buffer 125 had to store a higher-resolution image. And third, the frequency at which the video pixel clock 108 operates is reduced and the number of cycles it steals per second from the processor clock 102 (in cases where cycle-steal is used) is also reduced. The overall benefit is reduced cost and speed pressures placed on the design of system 100. Observer 170 nonetheless perceives 172 a high-resolution animated image 165 projected from (or onto) video display unit 160.

Referring to FIG. 2, the operation of the resolution-enhancing subsystem 150 is first explained graphically. Mapping 200 shows a plurality of low-resolution pixels (LPx's) 201 as large squares arranged in a regular matrix format on a first of two overlapping planes. The LPx's 201 are arranged to define low-resolution rows LR#0, LR#1, LR#2, LR#3, etc. and low-resolution columns LC#0, LC#1, LC#2, LC#3, etc. The top leftmost low-resolution pixel resides at LR#0, LC#0.

A low-resolution row will typically have 40 or more low-resolution pixels. The illustrated example assumes 320 low-resolution pixels per low-resolution row, but this number is not necessarily fixed. It is understood that a high-resolution row will have a substantially larger number of high-resolution pixels, for example, two or more times as many as a low-resolution row.

Similarly, a low-resolution column will typically have 40 or more low-resolution pixels. The illustrated example assumes 240 low-resolution pixels per low-resolution column, but this number is not necessarily fixed. It is understood that a high-resolution column will have a substantially larger number of high-resolution pixels, for example, two or more times as many as a low-resolution column.

In FIG. 2, each low-resolution pixel (LPx) 201 is subdivided into four equal-sized subposition regions (quadrants): QA, QB, QC, and QD, arranged clockwise in the recited order starting from the top left,corner. The subposition bits, $SP_V$ and $SP_H$, of each 16-bit halfword 126 (FIG. 1) point to one of the four subposition regions, QA–QD, of a corresponding low-resolution pixel. (QA=00, QB=01, QC=10, QD=11.)

The mapping 200 in FIG. 2 is to be viewed as further showing an array of equally-spaced high-resolution pixels (HPx's) 204 lying on a second plane directly below the plane of the low-resolution pixels (LPx's). The equal spacing of the high-resolution pixels 204 is somewhat distorted in FIG. 2 to show groups of four HPx's each associated with a corresponding four subposition regions, QA–QD, of each low-resolution pixel. High-resolution pixels 204 are depicted as dashed (hidden) circles in FIG. 2.

High-resolution pixels 204 are individually identified by respective high-resolution row and column numbers, HR and HC. For the sake of simplified mapping, two numbering systems are used to define the placement of each HPx 204. In a so-called "decimated" numbering system, the high-resolution rows are numbered sequentially, starting from the top, as HR#0.0, HR#0.5, HR#1.0, HR#1.5, HR#2.0, HR#2.5, HR#3.0, and so forth. In a so-called "non-decimated" numbering system, the same high-resolution rows are numbered sequentially, starting from the top, as HR#0, HR#1, HR#2, HR#3, HR#4, HR#5, HR#6, etc. To convert from decimated to non-decimated, one simply multiplies the decimated value by two and removes the decimal point with any trailing zeroes.

A similar system is used for identifying the high-resolution columns sequentially, starting from the left, as decimated column numbers HC#0.0, HC#0.5, HC#1.0, HC#1.5, HC#2.0, HC#2.5, HC#3.0, and so forth; or in the non-decimated system as HC#0, HC#1, HC#2, HC#3, HC#4, HC#5, HC#6, etc. The top leftmost high-resolution pixel resides at HR#0.0, HC#0.0.

As seen in FIG. 2, low-resolution row LR#0 overlaps high-resolution rows HR#0.0 and HR#0.5. Low-resolution column LC#0 overlaps high-resolution columns HC#0.0 and HC#0.5. And a similar one-to-two mapping exists between the remaining low-resolution row/columns and the high-resolution rows/columns.

Referring briefly to FIG. 1, it is to be understood that the color/shading codes of low-resolution pixels 201 residing in the same LC but adjacent even and odd-numbered low-resolution rows ($LR_0$ and $LR_1$) of FIG. 2 are stored respectively at same-addressed locations of the left and right banks of VRAM region 125. Accordingly, when $AB_0=AB_1$ (and they both point to region 125), the left bank-address signal $AB_0$ addresses the color/shading code of a low-resolution pixel residing in an even-numbered rows, LR#0, LR#2, LR#4, etc. and the right bank-address signal $AB_1$ addresses the color/shading code of a low-resolution pixel residing in the next-adjacent odd-numbered row, LR#1, LR#3, LR#5, etc.

When region 125 of VRAM 120 is appropriately programmed as stated above, the left VRAM output bus 122 will produce pixel-defining data Px(LR$_0$, LC$_k$) representing a low-resolution pixel in column LC$_k$ and an even-numbered row, LR$_0$, while the right VRAM output bus 121 will produce pixel-defining data Px(LR$_1$, LC$_k$) representing a low-resolution pixel in the same column LC$_k$ but in the next-adjoining odd-numbered row, LR$_1$ whenever equal address signals (AB$_0$=AB$_1$) are applied to the left and right bank portions of VRAM 120 that contain even-row/odd-row parts of low-resolution image structure 125. If, on the other hand, address signal AB$_0$ is advanced to point to the same column but one row ahead of the low-resolution pixel pointed to by address signal AB$_1$, the left VRAM output bus 122 will produce pixel-defining data Px(LR$_0$, LC$_k$) representing a low-resolution pixel in column LC$_k$ but the next-adjacent even-numbered row, LR$_0$, relative to the low-resolution pixel pointed to by address signal AB$_1$.

FIG. 2 shows an interpolation window 248 surrounding the four low-resolution pixels 201 found at the intersection of rows LR#0, LR#1 and columns LC#1, LC#2. Interpolation window 248 is subdivided into top and bottom halves, 248a and 248b, and also into left and right halves, 248d and 248c, respectively. The bottom half 248b of interpolation window 248 surrounds the eight high-resolution pixels 204 found at the intersection of rows HR#1.0, HR#1.5, and columns HC#1.0, HC#1.5, HC#2.0, HC#2.5. (The four low-resolution pixels in interpolation window 248 will later be referred to as LPx0 through LPx3.)

Four small squares respectively labeled S$_1$, S$_2$, S$_3$, and S$_4$, are shown located in prespecified subpositions of the low-resolution pixels (LPx's) of window 248. Each small square, S$_1$–S$_4$, represents the color and/or shading (e.g., a particular mix of the RGB primaries) assigned to its corresponding low-resolution pixel. The color/shading of squares S$_1$–S$_4$ are respectively designated as "source pen" codes PEN$_1$ through PEN$_4$.

The two center-most high-resolution pixels within the bottom half 248b of window 248 are referenced as targets T$_{11}$ and T$_{12}$. The color/shading of targets T$_{11}$ and T$_{12}$ are each derived by applying a distance-weighted interpolation algorithm (or an approximation thereof) to the source pen codes, PEN$_1$ through PEN$_4$ in accordance with one of the following equations (Eq. 1a-b or Eq. 2):

$$PEN_{Target} = \frac{\sum_{i=1}^{i=N} PEN_{Si}/(c + d_{SiT}^Q)}{N} \quad \text{(Eq. 1a)}$$

In equation Eq. 1, N is an integer greater than 1 (e.g., 2, 4, 9, 16), d$_{SiT}$ represents the distance from the center of source square S$_i$ to the center of the target high-resolution pixel, Q represents a power (e.g., 1, 2, etc.) to which the distance is to be raised, c represents a zero-offset constant (e.g., −1, 1, 0.5, 0.1, etc.) and PEN$_{Si}$ represents the color/shading of source square S$_i$.

From above equation Eq. 1a it is seen that contributions from the N source squares are averaged, and weighted according to distance, to determine the final color/shading (PEN$_{Target}$) of a target high-resolution pixel (T$_{11}$ or T$_{12}$). A source square S$_i$ sitting directly over the target pixel contributes the most because distance d$_{SiT}$ is zero. A source square S$_i$ located furthest from the target pixel contributes the least. In one embodiment, c=0, Q=2, and in cases where d$_{SiT}$=0, the above equation Eq. 1a is replaced by:

$$PEN_{Target} = PEN_{SiT} \quad \text{(Eq. 1b).}$$

It is also seen from the above equations (Eq. 1a and Eq. 1b) that the invention is not limited to an interpolation window (248) of any specific size or shape. The interpolation window (248) can be expanded in the horizontal direction (x) or vertical direction (y) or both by respective steps of one or more low-resolution columns and low-resolution rows if so desired. The number of independently-addressable banks in multi-bank VRAM 120 should be increased by one with each expansion of the window size by an LR step in the vertical direction (y). The number of time delay registers (155 and 156) would also have to be increased for each window expansion in either the horizontal direction (x) or vertical direction (y). The illustrated two LR's by two LC's size of window 248 is preferred for minimizing the number of VRAM banks and delay registers (155 and 156).

Rather than performing the complex calculations of equation Eq. 1a, a simplified average of N-choices calculation can be performed, as shown by the following equation Eq. 2, to approximate the results of Eq. 1a–1b.

$$PEN_{Target} = \frac{\sum_{i=1}^{i=N} PEN_{Sj(i)}}{N} \quad \text{(Eq. 2)}$$

In equation Eq. 2, for each value of i, the source-identifier, j(i), can acquire any value in the series 1, 2, . . . , N. PEN$_{Sj(1)}$ through PEN$_{Sj(N)}$ can therefore each be equal to PEN$_{S3}$, in which case PEN$_{Target}$ takes on the value of PEN$_{S3}$. (In other words, PEN$_{S3}$ contributes 100% to the value of PEN$_{Target}$.)

Alternatively, for a given integer k, where 1≤k<N, PEN$_{Sj(1)}$ through PEN$_{Sj(k)}$ can each be set equal to PEN$_{S2}$, while PEN$_{Sj(k+1)}$ through PEN$_{Sj(N)}$ are each set equal to PEN$_{S4}$, in which case PEN$_{Target}$ takes on the value of (k/N)*PEN$_{S2}$+(N-k/N)*PEN$_{S4}$. The amount of contribution of each of PEN$_{S2}$ and PEN$_{S4}$ to the final value of PEN$_{Target}$ depends on the values chosen for integers k and N.

Other combinations, using any others or all of PEN$_{S1}$–PEN$_{S4}$, are also possible. A wide range of possible contributions by each of PEN$_{S1}$–PEN$_{S4}$ to the final value of PEN$_{Target}$, from 0% through 100%, can be selected, depending on how many times each of PEN$_{S1}$–PEN$_{S4}$ gets selected as one of contribution factors PEN$_{Sj(1)}$ through PEN$_{Sj(N)}$. With an appropriate set of combinations, equation Eq. 2 can be made to approximate the results of Eq. 1a–1b.

In the embodiment of FIG. 2, the interpolation window 248 corresponds to a number of sources, N=4, and sixteen possible target pixels. Although window 248 covers 16 high-resolution pixels (HPx's), shading does not have to be calculated for all possible targets (high-resolution pixels) within the window in one pass. In a preferred embodiment only two target pixels, T$_{11}$ and T$_{12}$, are calculated while the window stops a first time over the indicated position (during a so-called field F1 pass). Later, when the window stops over the indicated position for a second time (during a so-called field F2 pass), the shading/coloring codes of two other centrally-located target pixels, T$_{21}$ and T$_{22}$, are calculated and generated.

After interpolation completes for a given stop over low-resolution rows LR#1 and LR#2 (and the shading/color of one or more target pixels (T$_{ij}$) is determined), the interpolation window 248 steps to the right by one low-resolution column (1 LC) and interpolation begins for determining the shading/color of one or more additional target pixels (T$_{ij}$) in the corresponding intersection of high-resolution rows HR#0.0–HR#1.5 with high-resolution columns HC#2.0–HC#3.5).

Preferably, at least two high-resolution target pixels (e.g., $T_{11}$ and $T_{12}$) should be calculated and generated by interpolator 159 per window stop. This approach allows interpolation to be carried out on the fly as the video-address generator (VAG) 115 of FIG. 1 scans across the pixels of a low-resolution row in source image 125 in synchronism with the LPx clock generator 108 and display driver end-portion 105B outputs the color/shade/illumination-defining signals for two or more corresponding high-resolution pixels in a high-resolution row of target image 165 in synchronism with the HPx clock generator 158.

As indicated in FIG. 2, rows HR#1.0, HR#2.0, HR#3.0, etc. are associated with interlaced field F1. Rows HR#0.5, HR#1.5, HR#2.5, etc. are associated with interlaced field F2. While field F1 is being output to the video display unit 160, window 248 steps rightward across low-resolution rows LR#0 and LR#1, writing out target positions $T_{11}$ and $T_{12}$ within the window as the codes for high-resolution row HR#1.0. (Aside: In the later described embodiments of FIGS. 6A and 6C horizontal interpolation can be selectively turned on or off. When horizontal interpolation is turned off (HION=0) in a first embodiment (FIG. 6A), the code written out for target positions $T_{11}$ and $T_{12}$ is the same. When horizontal interpolation is turned off (HION=0) in the second embodiment (FIG. 6C), the code written out for target positions $T_{11}$ and $T_{12}$ is adjusted in a more complex way to give the appearance that horizontal interpolation is not taking place.)

When window 248 reaches the end of rows LR#0 and LR#1, it steps down by one low-resolution row, returns to the left edge and scans rightward across low-resolution rows LR#1 and LR#2, again writing out target positions $T_{11}$ and $T_{12}$ within the window as the codes for high-resolution row HR#2.0. This process repeats for high-resolution rows HR#3.0, HR#4.0, etc., until field F1 completes.

Then window 248 returns to the top left of mapping 200 and repeats the process, this time writing out target positions $T_{21}$ and $T_{22}$ within the window as the codes for high-resolution rows HR#0.5, HR#1.5, HR#2.5, etc. (Aside: In the later described embodiments of FIGS. 6A and 6C vertical interpolation can be selectively turned on or off. When vertical interpolation is turned off (VION=0) in a first embodiment (FIG. 6A), the code written out for target positions $T_{21}$ and $T_{22}$ is the same as that written for target positions $T_{11}$ and $T_{12}$. When vertical interpolation is turned off (VION=0) in the second embodiment (FIG. 6C), the codes written out for reject target positions $T_{21}/T_{22}$ and $T_{11}/T_{12}$ is adjusted in a more complex way to give the appearance that vertical interpolation is not taking place.)

With regard to boundary conditions, the top most high-resolution row HR#0.0 and left-side high-resolution column HC#0.0 are not actually displayed. As a consequence, their contents do not have to be generated by the interpolator 159.

Note that the two targets, $T_{21}$ and $T_{22}$, for the field F2 rows are disposed within window 248 in mirror image opposition to targets, $T_{11}$ and $T_{12}$. The algorithm used for generating the interpolated codes for targets, $T_{21}$ and $T_{22}$, is preferably a mirror transform of the algorithm used for generating the interpolated codes for targets, $T_{11}$ and $T_{12}$.

Note also that each downward step taken by window 248, from where it overlaps rows LR#0 and LR#1 to where it overlaps rows LR#1 and LR#2 for example, involves an alternation between having an even-numbered low-resolution row (e.g. LR#0) under the top half 248a of the window and having an odd-numbered low-resolution row (e.g. LR#1) under the top half 248a of the window. Cross-over unit 151 (FIG. 1) is operated to place the appropriate even or odd-numbered pixel signal $LPx(LR_0, \ldots)$ or $LPx(LR_1, \ldots)$ on the respective A-side bus 154 and B-side bus 153 of resolution-enhancing subsystem 150.

Note further that each downward step taken by window 248, from where it overlaps rows LR#0 and LR#1 to where it overlaps rows LR#1 and LR#2 for example, involves an alternation between having bank address signals, $AB_0$ and $AB_1$, equal to one another and having bank address signals, $AB_0$ and $AB_1$, pointing to memory locations one row apart. When window 248 overlaps low-resolution rows LR#0 and LR#1, $AB_0 = AB_1$. When window 248 overlaps low-resolution rows LR#1 and LR#2, $AB_0 = AB_1 + L_{row}$, where $L_{row}$ is an offset for moving one low-resolution row forward in the address space of memory. Video-address generator (VAG) 115 is appropriately switched to generate the necessary stream of equal or nonequal $AB_0$ and $AB_1$ bank address signals.

FIGS. 3A through 3E show one possible set of contribution weightings which can be used within interpolator 159 to determine what contribution a source square $S_i$ within an interpolation window is to make to a target pixel in accordance with equation Eq 1a.

Figures 3A, 3B, 3C, 3D, 3E:
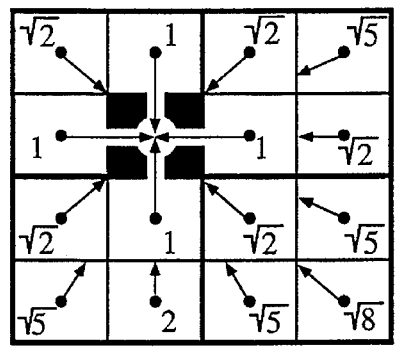
FIGS. 3A through 3E are transform diagrams showing one possible set of contribution weightings which can be used within a resolution enhancing system in accordance with the invention.

Referring to FIG. 3A, the distance between quadrant QD and target pixel $T_{21}$ of the same low-resolution pixel is defined as one unit. The distance between quadrant QB and target pixel $T_{21}$ of the same low-resolution pixel is therefore also equal to one unit. The distance between quadrant QA and target pixel $T_{21}$ of the same low-resolution pixel then becomes equal to the square root of two units. Source to target pixel $T_{21}$ distances ($d_{SiT}$) for further parts of the interpolation window are calculated accordingly.

FIG. 3B maps the $1/d^2_{SiT}$ contribution weights for target pixel $T_{21}$. FIGS. 3C–3E map the $1/d^2_{SiT}$ contribution weights for respective target pixels $T_{22}$, $T_{11}$, and $T_{12}$.

Note that the contribution weights are all equal to or approximately equal to multiples of 0.25. More specifically: $1.00 = 4*(0.25)$, $0.50 = 2*(.25)$, $0.25 = 1*(0.25)$, 0.20 is approximately equal to $1*(0.25)$, and 0.125 is approximately equal to $1*(0.25)$ or $0*(0.25)$, depending on the relative contributions of other source squares. These combinations can be produced by equation Eq. 2 when N is set to four. Division by four, in order to obtain an average after four contributors are selected and added, can be easily implemented for binary-coded values by a shift right of two bit positions.

Note also that the transform maps of FIGS. 3B–3E are mirror image copies of one another.

In one embodiment of the invention, a single combinatorial logic unit (320 of FIG. 3F, 620 of FIG. 6A) provides the transform function of FIG. 3C, as approximated by equation Eq. 2. The single combinatorial logic unit (320, 620) selects four choices from the set, $PEN_{S1}$ through $PEN_{S4}$, and outputs four 2-bit-wide signals, B0–B3, each representing one of the four choices. (The 2-bit "choice" signal is to be distinguished from the PEN code it points to. The PEN code typically has many more bits, fifteen for example.)

If the target high-resolution pixel is other than the one shaded in FIG. 3C, a forward/backward mapping scheme is used to first transform the subposition coordinates of the corresponding one of FIGS. 3B, 3D and 3E into the coordinates of FIG. 3C; and after combinatorial logic unit (320, 620) outputs the four choice signals, B0–B3, to transform those choices into their equivalents for the corresponding one of FIGS. 3B, 3D and 3E.

Referring to FIG. 3B, note that the weighting factors table of this FIG. 3B is also designated as the XY=00 table. X=0 represents an even numbered display field while X=1 represents an odd numbered display field. Y=0 represents a first table orientation for a given display field and Y=1 represents a second table orientation. The tables of FIGS. 3C, 3D and 3E are respectively referenced as XY=01, XY=11 and XY=10.

Figure 3F:
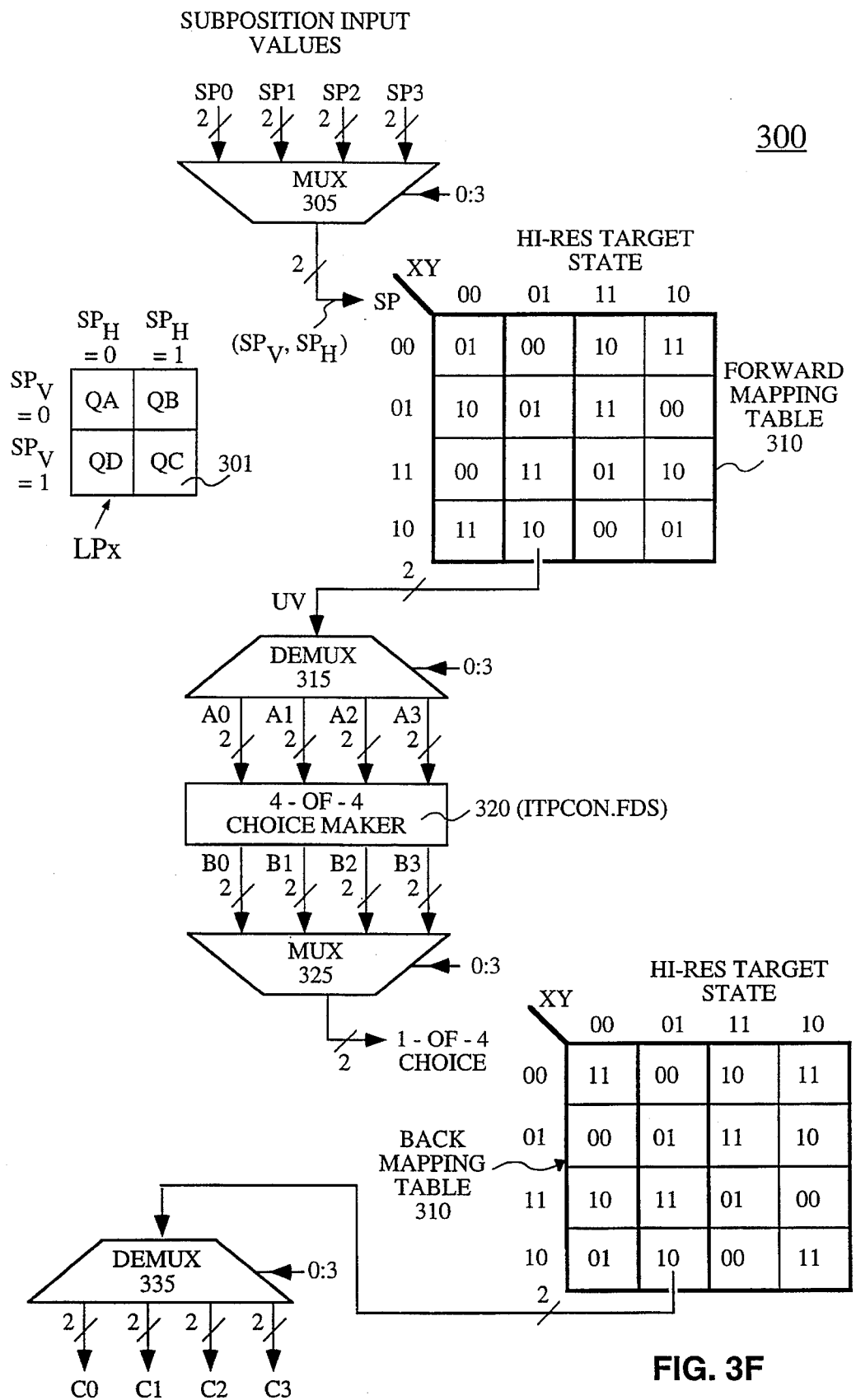
FIG. 3F shows a choice making system in which a subposition coordinates used in any of FIGS. 3B–3E are converted to universal (UV) table identifiers of a commonly shared choice-making table and the choices of the choice-making table are converted back to choice identifiers for corresponding condition of each of FIGS. 3B–3E.

FIG. 3F illustrates a choice-making system 300 comprised of a 4-by-4 forward-mapping table unit (FMT) 310, a 4-of-4choice-making table unit 320, and a 4-by-4 backward-mapping table unit (BMT) 330. The choice-making table unit 320 is structured to choose four unique or duplicate items, B0–B3, from the set, $PEN_{S1}$ through $PEN_{S4}$, approximately in accordance with the weightings suggested by FIG. 3C.

The internal operations of choice-making table unit 320 are detailed at the end of this disclosure by Code-conversion Table 1 (This same code-conversion table also describes the operations of later mentioned units 620 and 1620, and hence it is provided at the end of the disclosure.) Referring momentarily to Code-conversion Table 1, it is understood that the 2-bit wide input signal, A0, consists of less significant bit A00 and more significant bit A01. Similarly, the 2-bit wide output signal, B0, consists of less significant bit B00 and more significant bit B01.

Referring back to FIG. 2, each of quadrants QA through QD is associated with a corresponding 2-bit-wide subposition value (00, 01, 10, 11). The assignment of values is shown at 301 in FIG. 3F. Each of quadrants QA through QD has a horizontal bit value $SP_H$=0 or 1 and a vertical bit value $SP_V$=0 or 1. The ($SP_V$, $SP_H$) coordinates are QA=(0,0), QB=(0,1), QC=(1,1) and QD=(1,0).

In FIG. 3F, four 2-bit wide signals, $SP_0$ through $SP_3$ are provided, each representing an interpolation weighting coefficient (or "subposition point") that is assigned to a corresponding one of the four low-resolution pixels, LPx0 through LPx3, then residing in the interpolation window 248. This provides the choice-making table unit 320 with a total of eight bits of input information (A0 through A3) which it may use to produce a corresponding set of four choices (B0 through B3), each 2-bits wide. The choices are preferably arranged as set forth in code-conversion Table 1 to cause above equation Eq. 2 to approximate the weightings suggested by FIG. 3C.

FIG. 3F accordingly shows the choice-making table unit 320 receiving four input signals: A0, A1, A2, A3, each two-bits wide, and outputting four choice signals: B0, B1, B2, B3, each two-bits wide.

Forward-mapping table unit (FMT) 310 operates the same for each of low-resolution pixels LPx0 through LPx3. Multiplexer 305 supplies each of the corresponding four subposition coordinate signals, $SP_0$ through $SP_3$, one at a time to forward-mapping table unit (FMT) 310 for each step of interpolation window 248.

It is seen that for each XY target configuration and supplied set of subposition coordinate values ($SP_V$, $SP_H$) for one of respective low-resolution pixels LPx0, through LPx3, there is a corresponding set of universal, UV position values inside the boxes of forward-mapping table unit (FMT) 310. For target configuration XY=00, for example, subposition value 01 becomes UV position 00, subposition 10 becomes UV position 01, subposition 00 becomes UV position 11, and subposition 11 becomes UV position 10. For target configuration XY=01, the conversion is one-to-one. This is why the choice-making table unit 320 was earlier described as making its choices approximately in accordance with the weightings suggested by FIG. 3C.

Demultiplexer 315 converts the one-low-resolution pixel at-a-time output of forward-mapping table unit (FMT) 310 to the four input signals: A0, A1, A2, A3, of choice-making table unit 320. If desired, the forward-mapping table unit (FMT) 310 can be duplicated four times and multiplexer 305 and demultiplexer 315 can then be eliminated from FIG. 3F.

Once the four output choice signals: B0, B1, B2, B3, have been generated, the backward-mapping table unit (BMT) 330 converts the choices to conform with any one of high-resolution target states: XY=00 or XY=01 or XY=11 or XY=10. Multiplexer 325 supplies each of signals B0–B3, one at a time to backward-mapping table unit (BMT) 330 for conversion. Demultiplexer 335 converts the one-choice at-a-time output of backward-mapping table unit (BMT) 330 to the four appropriately-converted output choice signals: C0, C1, C2, C3, of choice-making table unit 320. If desired, the backward-mapping table unit (BMT) 330 can be duplicated four times and multiplexer 325 and demultiplexer 335 can then be eliminated from FIG. 3F.

Referring to the backward-mapping table unit (BMT) 330, it is seen that for each one-of-four choice (B0–B3) made by choice-making table unit 320, there are four possible target configurations. For target configuration XY=00, for example, universal 1-of-4 choice 00 becomes converted choice Cx=11 (x represents one of digits 0 to 3 here), universal 1-of-4 choice 01 becomes converted choice Cx=00, universal 1-of-4 choice 11 becomes converted choice Cx=10, and universal 1-of-4 choice 10 becomes converted choice Cx=01. For target configuration XY=01, the conversion is one-to-one.

A second embodiment in accordance with the invention which takes advantage of these factors will now be described with reference to combined FIGS. 4A and 4B.

Figure 4A:
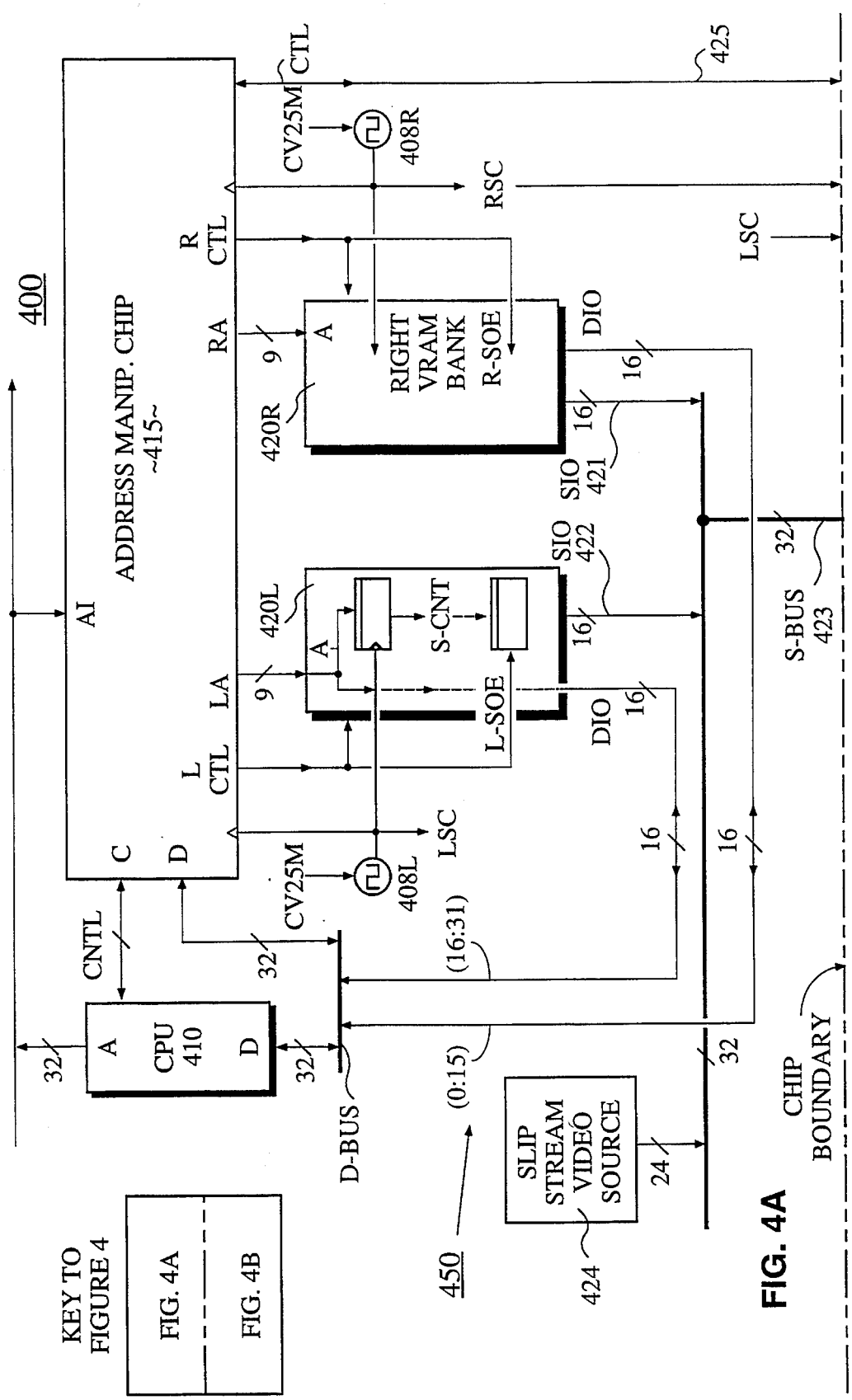
FIGS. 4A–4B combine as indicated by the key in FIG. 4A to form a block diagram of a second resolution enhancing system in accordance with the invention.
Figure 4B:
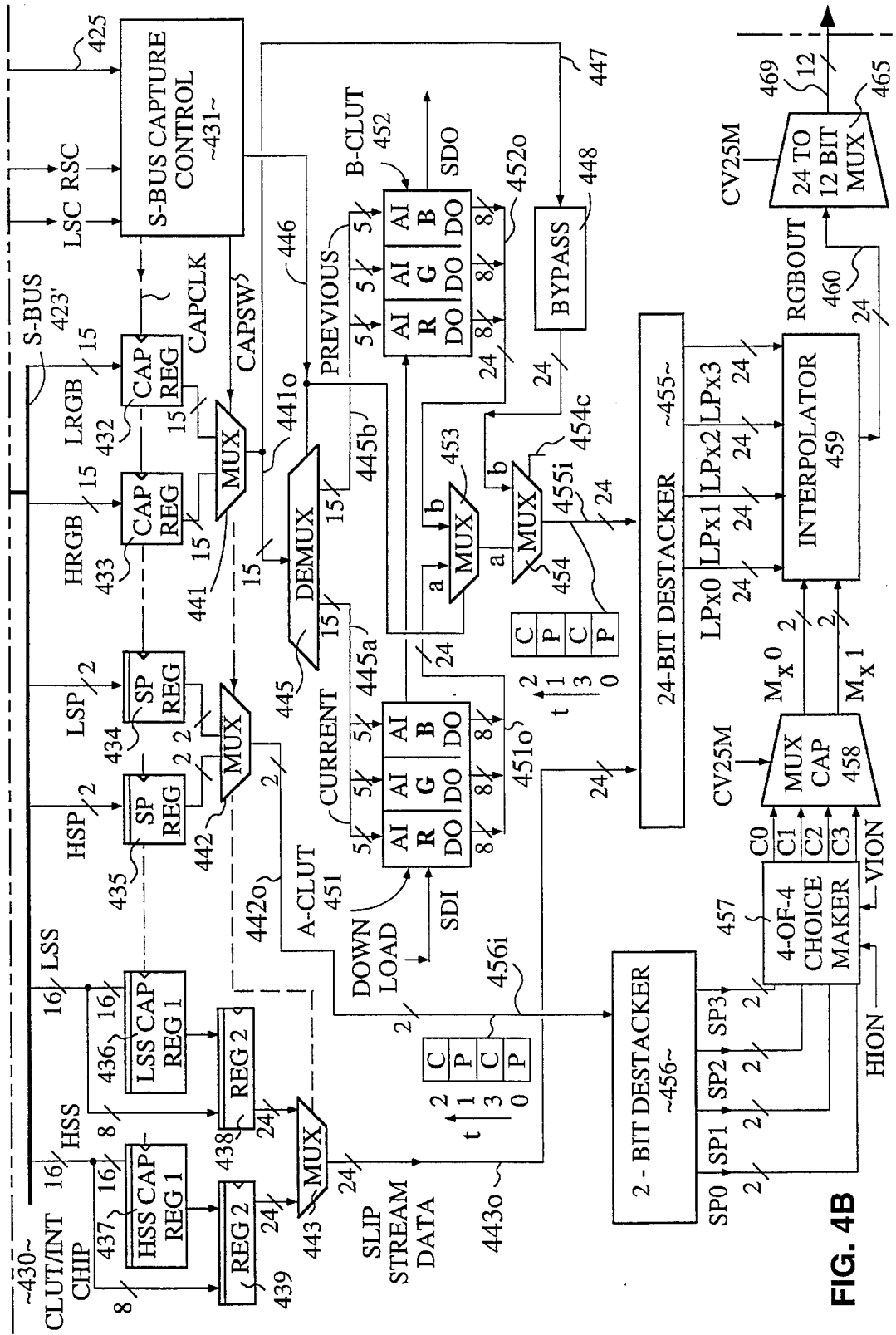

FIGS. 4A and 4B form a block diagram of a second imaging system 400 which includes a pipelined resolution-enhancing subsystem 450 in accordance with the invention. Like reference symbols in the "400" number series are used where possible for elements of FIGS. 4A, 4B which correspond to but are not necessarily the same as those in the "100" series within FIG. 1.

In imaging system 400, a VRAM (Video-speed Random Access Memory) is provided in the form of left and right memory banks 420L and 420R. Each of left and right banks 420L and 420R stores $2^9$ datawords. A single dataword is 16-bits wide. Left and right memory banks 420L and 420R are collectively referred to as VRAM 420.

It is to be understood that imaging system 400 can include other, slower forms of data storage such DRAM and/or RAMBUS™ storage devices that are operatively coupled to transfer data to and from VRAM 420. As such, VRAM 420 should be considered as a cache-like area of system memory into which there is loaded image data that is to be then displayed or otherwise processed.

A page-mode SRAM device such as the Toshiba TC524256AJ/AZ-12™ is preferred for forming VRAM banks 420L and 420R. The Toshiba device is a two-port static-random-access memory device in which one of the ports, a so-called "serial input/output" port (SIO), outputs a sequential stream of datawords beginning with one stored in an address loaded into a serial address counter (S-CNT). The serial address counter (S-CNT) is clocked by a serial clock (SC) signal applied to the device from clock generator.

The NEC uPD482234™ fast-page VRAM and NEC $uPD_{482235}$™ hyper-page VRAM are examples of other integrated circuit memory chips that support serial-mode data input and output.

In the illustrated embodiment of FIG. 4A, respective left and right clock generators, 408L and 408R, are separately coupled to the serial clock input terminals of VRAM banks 420L and 420R. Each of clock generators, 408L and 408R, operates at 6.13635 MHz, but the signals are provided out of phase to provide a combined frequency of 12.2727 MHz. Left and right clock generators 408L and 408R are synchronized to a shared video reference clock signal, CV25M, which operates at 24.5454 MHz.

FIG. 4C shows the corresponding signals, LSC\ (inverted left serial clock) and RSC\ (inverted right serial clock). They are derived from the 24.5454 MHz video reference clock, CV25M.

The serial input/output port (SIO) of the Toshiba TC524256AJ/AZ-12™ is tri-stateable and goes into a high-impedance state (Hi-Z) when a low serial-output enable (SOE) signal is applied to the device. This feature is used advantageously in system 400 to multiplex the SIO outputs of the left and right VRAM banks, 420L and 420R, over time onto upper and lower halves of a soon-to-be described S-bus 423.

Each Toshiba SRAM device has a second so-called "data input/output" port (DIO) which outputs datawords one at a time in accordance with a D-port address stored in another register (not shown) of the device. As seen, the 16-bit-wide DIO ports of VRAM banks 420L and 420R combine at the data input/output port (D) of CPU 410 to define a unitary 32-bit-wide data word for purposes of image data processing. The right VRAM bank 420R stores bits 0 through 15 and the left VRAM bank 420L stores bits 16 through 31.

FIG. 4A shows a memory address manipulator chip (MAMC) 415 supplying respective left and right address signals, LA and RA (each 9-bits wide), to the address input ports of left and right VRAM banks 420L and 420R. The MAMC 415 also applies respective left and right control signals, L-CTL and R-CTL, to control input ports of left and right VRAM banks 420L and 420R. Independent SOE signals are included within the L-CTL and R-CTL control signals supplied to each of VRAM banks 420L and 420R. These are respectively designated as L-SOE and R-SOE.

The 16-bit-wide SIO port 422 of left VRAM bank 420L connects to an upper 16-bit-portion, S(31:16) of a 32-bit-wide S-bus 423. The 16-bit-wide SIO port 421 of right VRAM bank 420R connects to a lower 16-bit-portion, S(15:0) of the same 32-bit-wide S-bus 423. The outputs of left and right SIO ports 422 and 421 are time-multiplexed onto the S-bus 423 in synchronism with the 24.5454 MHz clock, CV25M, as shown in FIG. 4C.

Referring to FIG. 4C, the waveforms of signals, CV25M, LSC\, RSC\, S(31:16) and S(15:0) are shown in time alignment at the top of FIG. 4C. Valid data states on S-bus portions, S(31:16) and S(15:0), are denoted as "V" and "D", where "V" represents valid Video datawords and "D" represents valid instances of so-called slip-stream data. FIG. 4A shows a 24-bit wide slipstream data source 424 also coupled to S-bus 423. The slipstream data source 424 has tristatable output lines so that its signals can be time-multiplexed onto the S-bus 423 with the VRAM SIO signals 421 and 422.

Note that in FIG. 4C there are two instances of valid slip-stream data between each valid video dataword on each of S-bus portions, S(31:16) and S(15:0). The 24-bit wide "D" dataword is subdivided into a first, 16-bit wide, less-significant portion followed by a second, 8-bit wide, more-significant portion. When the 8-bit wide, more-significant portion of the slipstream data is output, the remaining 8 lines of the upper or lower S-bus portion carry don't-care bits.

Note further that the "V" datawords of S-bus portions, S(31:16) and S(15:0) are non-overlapping. "V" and "D" datawords are introduced serially into the resolution enhancing subsystem 450 and processed in pipelined fashion thereafter.

Note, moreover, that the "V" datawords of upper S-bus portion S(31:16) become valid on that bus portion a short time delay after respective falling edges of clock signal LSC\. The "V" words of lower S-bus portion S(15:0) become valid on that bus portion a short time delay after respective falling edges of clock signal RSC\.

The left edge of FIG. 4C represents the end of a horizontal blanking interval. The first two active high or low states of a tri-statable ADOUT signal at the bottom of FIG. 4C represent the first 24-bit-wide pixel of a high-resolution video line.

During the horizontal blanking interval (left of the left edge of FIG. 4C), both the LSC\ and RSC\ signals are held high. As the horizontal blanking interval comes to an end, one of the LSC\ and RSC\ signals goes active low before the other.

FIG. 4C shows LSC\ becoming active low first. It is to be understood, however, that RSC\ could have been the one to become active low first. Control signals (not shown) from the memory address manipulator chip (MAMC) 415 determine which of clock generators 408L and 408R turns on first at the end of each horizontal blanking interval. This determination produces an effect similar to the function of cross-over unit 151 (FIG. 1), except that signal cross-over switching is now done by way of time-domain multiplexing in pipeline fashion rather than spatially. It will be seen later that the time-ordered presentation of the LSC\ and RSC\ signals works to place an appropriate even or odd-numbered pixel signal LPx(LR$_0$, ...) or LPx(LR$_1$, ...) on a respective A-side or B-side (e.g. CLUT banks 451 and 452 or left and right outputs of destacker 455) of circuitry further down the line in the resolution-enhancing subsystem 450.

S-bus 423 crosses an inter-chip boundary demarcated by a dash-dot line at the bottom of FIG. 4A and top of FIG. 4B. Left and right serial clock signals, LSC and RSC, also cross the inter-chip boundary. The circuitry of a so-called CLUT/INT/OUT chip 430 (CLIO for short) begins below the dash-dot line.

An S-Bus capture-control unit 431 is provided within CLIO chip 430 for controlling a set of S-Bus capture registers, 432–439, and capture-reordering multiplexers, 441–443. The set of registers 432–439 have inputs coupled to both upper and lower portions of S-bus 423 for picking off the left and right "V" signals that are time-multiplexed onto S-bus 423. A set of "CAPCLK" (capture clock) signals strobe the S-bus capture registers 432–439, causing them to capture the appropriate time-multiplexed signals from the S-bus 423 at the appropriate points in time. A set of "CAPSW" (capture switching) signals control the capture-reordering multiplexers, 441–443, causing them to output appropriate time-multiplexed signals from the capture registers 432–439 onto respective multiplexer output busses 441o (15-bits wide), 442o (2-bits wide), and 443o (24-bits wide), at the appropriate points in time. A specific embodiment 1431 for forming S-Bus capture-control unit 431 and capture registers 432–439 and capture-reordering multiplexers, 441–443, will be described later in conjunction with FIG. 4D.

Still referring to FIG. 4B, reordering multiplexer 441 has two 15-bit-wide inputs respectively coupled to the outputs of a 15-bit-wide LRGB-capture register 432 and a 15-bit-wide HRGB-capture register 433. LRGB-capture register 432 captures a 15-bit wide RGB video ("V") signal that is presented at various times on a lower portion (bits 15:00) of S-bus 423. HRGB-capture register 433 captures a 15-bit wide RGB video ("V") signal that is presented at various times on an upper portion (bits 31:16) of S-bus 423. The 15-bit-wide output 441o of multiplexer 441 produces a 15-bit-wide serial stream of RGB signals corresponding to those alternately presented on the upper or lower portions of S-bus 423. ("RGB" video-signals presented on one of the upper and lower portions of S-bus 423 are deemed as those belonging to a "previous" low-resolution row and "RGB" video-signals presented on the other of the S-bus portions are deemed as those belonging to a "current" low-resolution row. The output order on bus 441o is previous first, then current, then previous, then current, and so forth.)

Reorder multiplexer 442 has two 2-bit-wide inputs respectively coupled to the outputs of a 2-bit-wide LSP-capture register 434 and a 2-bit-wide HSP-capture register 435. LSP-capture register 434 captures a one-or-two bit wide "subposition" ("SP") signal that is presented at various times on the lower portion (bits 15:00) of S-bus 423. HSP-capture register 435 captures a one-or-two bit wide "subposition" ("SP") signal that is presented at various times on the upper portion (bits 31:16) of S-bus 423. The 2-bit-wide output 442o of multiplexer 442 produces a 2-bit-wide serial stream of SP signals corresponding to those alternately presented on the upper or lower portions of S-bus 423. (SP-signals presented on one of the upper and lower portions of S-bus 423 are deemed as those belonging to a "previous" low-resolution row and SP-signals presented on the other of the S-bus portions are deemed as those belonging to a "current" low-resolution row. The output order on bus 442o is previous first, then current, then previous, then current, and so forth.)

The RGB and SP output signals of reorder multiplexers 441 and 442 are derived from the 16-bit-wide data structure 126 shown in FIG. 1. When 4-bit blue mode is employed, the least significant bit in the 5-bit-wide Blue gun field is forced to zero by circuitry within multiplexer 441 (not shown) and the remaining 2 of the 16 halfword bits on one of the S-bus upper and lower halves then serve as the vertical and horizontal subposition bits, $SP_V$ and $SP_H$, that are output by reorder multiplexer 442. When 5-bit blue mode is employed, one of the vertical and horizontal subposition bits, $SP_V$ and $SP_H$, is forced to zero by circuitry within multiplexer 442 (not shown) and the remaining 15 of the 16 halfword bits on one of the S-bus upper and lower halves then serve as the 15-bit-wide RGB signals that pass through reorder multiplexer 441.

Reordering multiplexer 443 has two 24-bit-wide inputs respectively coupled to the outputs of a 24-bit-wide LSS-capture(2) register 438 and a 24-bit-wide HSS-capture(2) register 439. A 16-bit wide LSS-capture register(1) 436 first captures, on a first tick of the video reference clock signal, CV25M (24.5454 MHz), a 16-bit wide, less-significant portion of a "slip-stream" (SS) signal that is presented on the lower portion (bits 15:00) of S-bus 423. The 24-bit-wide LSS-capture(2) register 438 next captures, on a second tick of video reference clock signal, CV25M, an 8-bit wide, more-significant portion of the slip-stream (SS) signal that is then present on the lower portion (bits 15:00) of S-bus 423 plus the previously captured 16-bits now output by register 436.

Similarly, a 16-bit wide HSS-capture register(1) 437 first captures, on a first tick of the video reference clock signal, CV25M, a 16-bit wide, less-significant portion of a "slip-stream" (SS) signal that is presented on the upper portion (bits 31:16) of S-bus 423. The 24-bit-wide HSS-capture(2) register 439 next captures, on a second tick of video reference clock signal, CV25M, an 8-bit wide, more-significant portion of the slip-stream (SS) signal that is then present on the upper portion (bits 31:16) of S-bus 423 plus the previously captured 16-bits now output by register 437. The 24-bit-wide output 443o of multiplexer 443 produces a 24-bit-wide serial stream of SS signals corresponding to those alternately presented on the upper or lower portions of S-bus 423.

The S-bus control circuit 43i also produces previous/current designating signal 446 for designating signals streaming down multiplexer output bus 441o as belonging either to a previous or current low-resolution row. In one embodiment, the previous/current designating signal 446 is formed by clocking a Toggle-type flip flop with the video reference clock signal CV25M (24.5454 MHz). The Toggle-type find flop (not shown) is reset before the start of a scan through a current low-resolution row. The delay between the reset time and the time of start of a corresponding stream of data down bus 441o is adjusted such that the first data item is deemed The output 441o of capture-reordering multiplexer 441 connects to an input of a 15-bit-wide demultiplexer 445. Demultiplexer 445 has two 15-bit-wide output buses, 445a and 445b, respectively coupled to the address inputs of two color look-up table units (memory banks). Demultiplexer 445 responds to the previous/current line-of-origin designating signal 446 provided to a control terminal thereof from the S-bus control unit 431 and routes the signals at its input (441o) to one or the other of the two color look-up table units in accordance with the "previous" versus "current" line-of-origin designation provided by the line-of-origin designating signal 446.

The two color look-up table units are referred to as the A-CLUT 451 (current low-resolution video line color palette) and the B-CLUT 452 (previous low-resolution video line color palette).

A CLUT bypass bus 447 is also provided for carrying the 15-bit wide output 441o of capture-reordering multiplexer 441 to a CLUT-bypass unit 448. The function of unit 448 is explained later below.

The A-CLUT 451 is a multi-port random access memory device (RAM) which has three independent address input ports (AI's, each 5-bits wide) for receiving compressed 15-bit RGB signals. The 15-bit wide RGB signal is composed of 5 bits of R (e.g., Red intensity) data, 5 bits of G (e.g., Green intensity) data, and 5 bits of B (e.g., Blue intensity) data which are respectively applied to the three AI ports of the A-CLUT 451.

The A-CLUT 451 further has three corresponding data output ports (DO's) for outputting 24-bit-wide decompressed RGB datawords 451o associated with addresses supplied at the AI's. The 24-bit wide RGB output signal 451o is composed of 8 bits of R (e.g., Red intensity) data, 8 bits of G (e.g., Green intensity) data, and 8 bits of B (e.g., Blue intensity) data which are respectively output from the three DO ports of the A-CLUT 451.

The A-CLUT 451 also has a serial data input port (SDI) for receiving data which is downloaded into the A-CLUT 451 during each horizontal blanking interval. Color-palette conversion data for converting each 5-bit-wide color/shading code of the RGB domain into an 8-bit-wide color/shading code (in the RGB domain) is downloaded from the VRAM (420L and/or 420R) through the SDI data-input port of the A-side CLUT 451 at the end of each line-display period (during the horizontal blanking period). Old data within A-CLUT 451 shifts out to load B-CLUT 452 during this process. The "current" video line palette thereby becomes the "previous" video line palette as processing of the current video line completes. This is required for proper interpolation if interpolation is to use CLUT-converted pen values.

In addition to downloading new CLUT data, the horizontal blanking interval is also used for downloading new mode and path-control signals into the CLIO chip 430 such that the chip can switch its operating mode for each new line of video data.

Each of the three sections within A-CLUT 451 stores at least 32 datawords, each 8-bits wide. Demultiplexer output bus 445a is divided into three 5-bit-wide parts which respectively connect to the three AI's of the A-CLUT 451. Each 5-bit-wide AI signal converts to an 8-bit-wide as it passes through A-CLUT 451. The combined 24-bit-wide output of A-CLUT 451 connects to a 24-bit-wide input port 453a of a subsequent multiplexer 453.

B-CLUT 452 is similarly structured to convert the 15-bit-wide signal on demultiplexer output bus 445b into a 24-bit-wide RGB output-signal 452o that is supplied to another 24-bit-wide input port 453b of subsequent multiplexer 453.

In a second embodiment in accordance with the invention (not shown), A-CLUT 451 and B-CLUT 452 are software-defined parts distributed across three SRAM's. Each of these SRAM's (not shown) has its own 7-bit-wide, independent address input port (AI), and stores 66 bytes. The 66 bytes are divided into a first bank of 33 bytes and a second bank of 33 bytes. Five of the bits in the 7-bit address field receive the 5 R or G or B bits as above and they select one of the first 32 bytes in either the first bank or the second bank. A sixth bit in the 7-bit address field acts as the bank-select bit (previous/current designating bit 446). It replaces the functions of demultiplexer 445 and multiplexer 453. The seventh address input bit defines a background-mode bit. It is used to override the selection of the first five address bits and instead output the thirty-third (33rd) byte of the selected bank as a "background" color. (While various embodiments of the CLUT are under consideration, it is to be noted that RGB is not the only way to implement the invention. As an alternative to storing RGB formatted data, the CLUT SRAM could store data in YCC format or any other desired format.)

CLUT-bypass unit 448 is used if color conversion is to be bypassed. Color conversion can be bypassed on a line-byline basis. The connects to CLUT-bypass unit 448 converts the 15-bit-wide RGB signals of multiplexer output bus 441o into 24-bit-wide RGB signals by padding three zero bits or other data into each of the R, G and B fields, thereby converting the 5-bit-wide original fields into 8-bit-wide fields. In one embodiment, the received 5-bits of R or G or B intensity fill the 5 MSB's (most significant bits) of each 8-bit-wide output generated by the CLUT-bypass unit 448. The 3 LSB's (least significant bits) of each 8-bit-wide output are selectively forced equal to either (a) zero, or (b) the same value as that of the 3 MSB's, or (c) a 3-bit value produced by a pseudo-random number generator (not shown). The latter option produces an eye soothing color dither when an appropriate pseudo-random function is chosen.

The previous/current designating signal 446 controls multiplexer 453 so as to selectively couple either the 24-bit-wide output 451o of the A-CLUT 451 or the 24-bit-wide output 452o of the B-CLUT 452 to a 24-bit wide A-input of a bypass multiplexer 454. A 24-bit wide B-input of the bypass multiplexer 454 receives the output of CLUT-bypass unit 448. A CLUT-bypass control signal 454c is applied to the control terminal of the bypass multiplexer 454 for selecting either the output of previous/current selecting multiplexer 453 or the output of CLUT-bypass unit 448 as the output of the bypass multiplexer 454. Multiplexer control signal 454c is user-programmable (by path-control data downloaded during the horizontal blanking interval) for selecting either the CLUT outputs (451o and 452o) or the output of the CLUT-bypass unit 448 as the output of bypass multiplexer 454 on a line-by-line basis.

The AI-to-DO signal propagation delay of CLUT units 451 and 452 is approximately 4 ticks of the video reference clock signal CV25M (24.5454 MHz). The CLUT-bypass unit 448 has a similar delay incorporated into it so that the same delay timing occurs regardless of whether signals flowing from the output 441o of capture-reordering multiplexer 441 by way of CLUT 451/452 or bypass unit 448 are used. (A below described combination of units 457 and 458 is provided with a similar 4-tick delay to match the signal propagation delay of CLUT units 451 and 452.)

The output of bypass multiplexer 454 couples to a 24-bit-wide destacker input bus 455i. Signals on the destacker-input bus 455i change in synchronism with the video reference clock signal CV25M (24.5454 MHz). The sequence of time-multiplexed 24-bit-wide signals on bus 455i is represented in FIG. 4B as an over-time stack of datawords labeled 0,3,1,2 next to line 455i. This sequence will be explained in more detail later, in conjunction with FIG. 5. Note for now, however, that the sequence of signals is also labelled P/C/P/C/. . . to represent a preferred sequence of data alternatingly belonging to a previous and current row of the low-resolution source image 125 (see FIG. 1).

Figure 5:
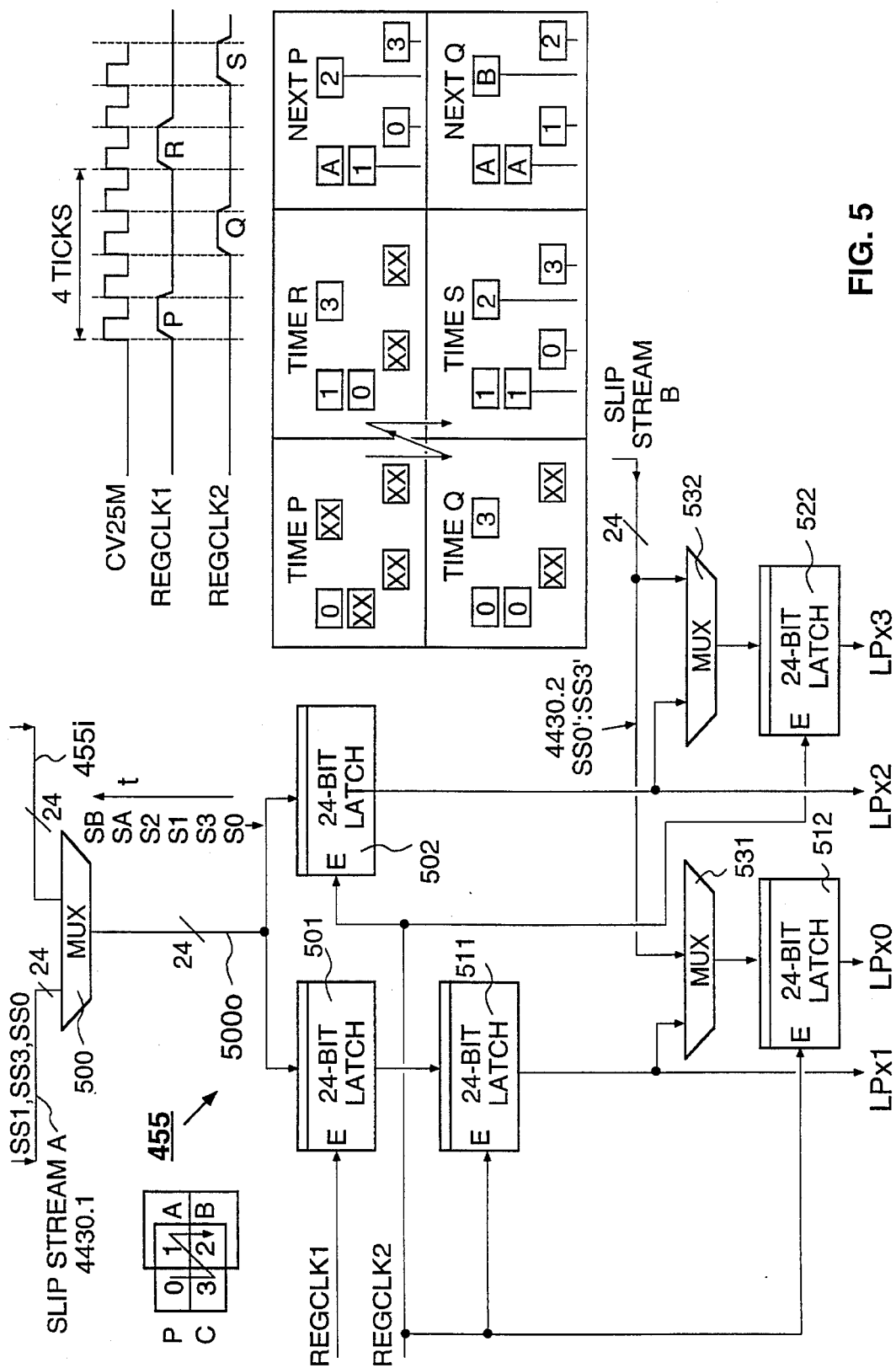
FIG. 5 is a schematic diagram illustrating details of a 24-bit destacker unit and its operation.

A 24-bit destacker 455 is provided for converting the format of signals output by bypass multiplexer 454 (or alternatively signals output by slipstream multiplexer 443) from an over-time serial format to a pipelined time-parallel format. This will also be explained in more detail when FIG. 5 is discussed.

Destacker 455 produces four destacked signals, LPx0, LPx1, LPx2, LPx3, in parallel pipelined fashion, where each signal is 24-bits-wide. Destacked signals, LPx0, LPx1, LPx2, LPx3, are then supplied to interpolator 459 for interpolation. A preferred embodiment of interpolator 459 will be explained in more detail later, in conjunction with later described FIGS. 6A–6D, 7 and 8. For now, it is sufficient to note that the interpolator 459 produces an interpolated output signal 460 (RGB-OUT) in accordance with the values of destacked signals, LPx0, LPx1, LPx2, LPx3, and in accordance with four subposition signals SP0, SP1, SP2, SP3, supplied to it from a 2-bit destacker 456 by way of a choice-making unit 457 and a choice-capturing multiplexer unit 458. Interpolator unit 459 should be viewed as being capable of combining its received destacked signals, LPx0, LPx1, LPx2, and LPx3, in accordance with any one of a plurality of predefined interpolation algorithms. The applied subposition signals, SP0, SP1, SP2, and SP3, select one of those predefined interpolation algorithms as the algorithm that is to be followed by interpolator unit 459.

The 2-bit destacker 456 operates in similar fashion as does the 24-bit destacker 455. It (the 2-bit destacker 456) converts serially-arranged subposition data delivered to it over a 2-bit-wide destacker-input bus 456i from the SP-reordering multiplexer 442 into a set of four time-parallel subposition signals, SP0, SP1, SP2, SP3 (each 2-bits-wide).

These four signals (SP0–SP4) then pass into choice-making unit 457. Choice-making unit 457 generates four choice signals C0, C1, C2, and C3. An HION=0 signal may be applied to choice-making unit 457 so that the latter makes modified choices (M0, M1, M2, and M3) whose end result is to create an appearance that horizontal interpolation has been turned off. A VION=0 signal may be further applied to choice-making unit 457 so that the latter makes modified choices whose end result is to create an appearance that vertical interpolation has been turned off. Either one or both of HION and VION can be set to logic one or logic zero.

Choice-capturing multiplexer unit 458 captures the choice signals C0, C1, C2, C3, (or modified choice signals M0, M1, M2, and M3) generated by choice-making unit 457. Two of the four choice signals (C0–C3) are selected by the choice-capturing multiplexer unit 458, delayed to compensate for the delay of the 24-bit path (the path between multiplexer output 441o and the 24-bit destacker input 455i), and then forwarded in a first clock cycle to the interpolator 459 as delayed/multiplexed signals, Mx0 and Mx1 (each of which is 2-bits wide). The two non-selected ones of choice signals, C0, C1, C2, C3, are pipelined in the choice-capturing multiplexer unit 458 and forwarded to the interpolator 459 as delayed/multiplexed signals, Mx0 and Mx1, in the next clock cycle. In FIG. 4C, the timing of the delayed/multiplexed signals, Mx0 and Mx1, over repeated first and second cycles, is represented by strobe signals, 2PL1 and 2PL2.

The combined signal propagation delay of choice-making unit 457 and choice-capturing multiplexer unit 458 is set to 4-ticks of the video reference clock signal CV25M (24.5454 MHz) to match the signal propagation delay of CLUT units 451 and 452 (or CLUT-bypass unit 448) so that delayed/multiplexed signals, Mx0 and Mx1, arrive at interpolator 459 in synchronism with corresponding signals LPx0–LPx3.

Interpolator 459 generates a 24-bit-wide interpolated output signal 460 by adding the sum of two, nonexhaustively chosen LPx's to the sum of two nonexhaustively, further chosen LPx's, thereby creating a sum of four, nonexhaustively chosen LPx's. The sum of the four nonexhaustively chosen LPx's is then divided by four (wire-shifted right by two bits) so that the generated output signal 460 represents the average value of the four LPx values.

Interpolated output signal 460 passes through a 24-to-12 bit multiplexer 465 where it is converted from a 24-bit-wide per two-cycles format to two a format of two 12-bit-wide signals alternated over the two cycles. The 12-bit-wide signal 469 output by the 24-to-12 bit multiplexer 465 is shown in FIG. 4C as an ADOUT signal. This ADOUT signal is transmitted out of the CLIO chip 430 at the video rate of 24.5454 MHz and thereafter it is displayed on a high-resolution monitor (e.g., a color CRT or color LCD panel, not shown).

The end result of the above-described arrangement of plural memory banks 420L, 420R (FIG. 4A), S-bus 423, capture registers 432–439 (FIG. 4B), reordering-multiplexers 441–442, previous/current selecting multiplexer 453, bypass multiplexer 454, destackers 455, 456, and 24-to-12 bit multiplexer 465, is that signals are repeatedly converted between parallel and serial formats as they flow downstream through a pipelined architecture. The parallel-to-serial-to-parallel conversions help to reduce the die-size and pin count of the CLIO chip 430 and help to take full advantage of the limited throughput bandwidth available on the S-bus 423. Note for example, that only 12 output pins are used for outputting the 12-bit-wide ADOUT output signal 469 from the CLIO chip 430. The output of capture-reordering multiplexer 441 is only 15-bits-wide rather than 30-bits-wide because of the use of demultiplexer 445. When the A-CLUT 451 and B-CLUT 452 are implemented as software-defined portions of the above-mentioned SRAM with 7-bit-wide AI ports, previous/current selecting multiplexer 453 merges into the CLUT address-processing circuitry and DO busses 451o and 452o are implemented within the CLIO chip 430 as one 24-bit-wide bus, thereby consuming less space within the CLIO chip 430.

As already mentioned, the 24-bit destacker 455 demultiplexes the signals of destacker-input bus 455i in groups of four to produce a time parallel set of four pixel color/shade/illumination value defining signals, LPx0, LPx1, LPx2, and LPx3, each being 24-bits-wide. These signals correspond to the four source pixels of FIG. 2, but not necessarily in the same numerical order.

Figure 4D:
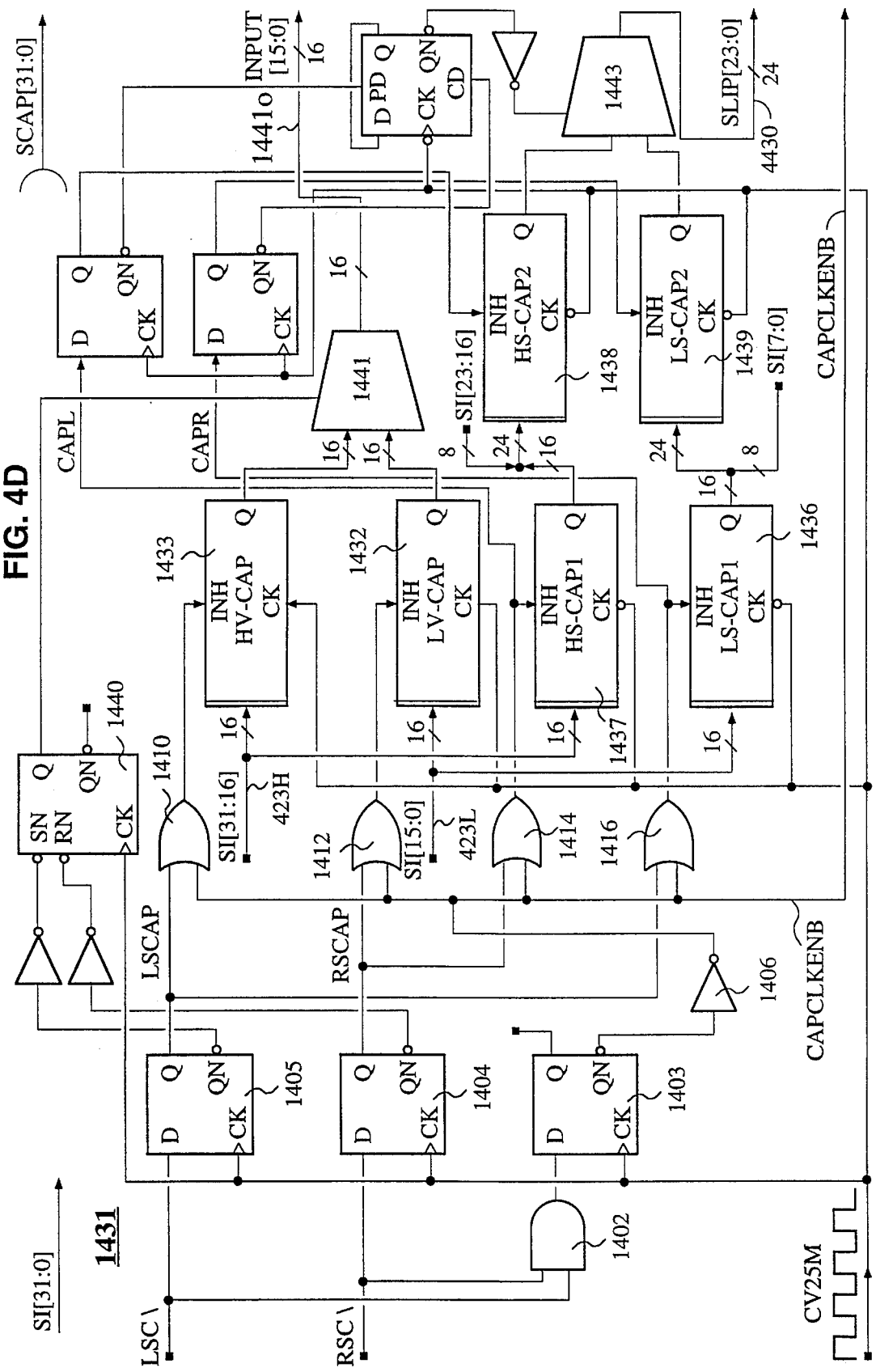
FIG. 4D is a schematic diagram of a CAPCLKEN generating circuit, a slip-stream capture circuit and a VRAM data capture circuit in accordance with the invention.

Referring to FIG. 4D, the structure and operation of one embodiment 1431 of the S-bus control circuit 431 is now detailed. Signals referred to here sometimes have a backslash suffix "\" or a capital "B" suffix or the suffix "-bar". These notations all mean the same thing, that the signal is in negative logic format. Thus the signal labeled "CAPCLK-ENB" in FIG. 4D is the same as the signal labeled "CAPCLKEN\" in FIG. 4C.

AND gate 1402 of FIG. 4D supplies the logic AND of inverted left and right serial clock signals, LSC\ and RSC\ to the D input of flipflop 1403. Flipflop 1403 is clocked by the video reference clock signal CV25M. Flipflops 1404 and 1405 are similarly clocked by CV25M and they respectively produce delayed versions, RSCAP and LSCAP, of serial clock signals, RSC\ and LSC\. The Q-bar output (QN) of flipflop 1403 passes through inverter 1406 to produce capture-enabling signal CAPCLKENB.

OR gate 1410 applies the logic OR of signals LSCAP and CAPCLKENB to the inhibit (INH) terminal of 16-bit wide HV-CAP register 1433 for capturing RGB data and SP data into that register 1433 from the upper portion (bits 31:16) of the S-bus 423. HV-CAP register 1433 is clocked by the CV25M video reference clock.

OR gate 1412 supplies the logic OR of signals RSCAP and CAPCLKENB to the INH terminal of 16-bit wide LV-CAP register 1432. LV-CAP register 1432 captures RGB and SP data off the lower portion (bits 15:0) of S-bus 423. Like register 1433, the LV-CAP register 1432 is clocked by the CV25M signal.

HS-CAP1 register 1437 and LS-CAP1 register 1436 are each clocked by an inverted version of the video reference clock signal CV25M. OR gate 1414 applies a signal CAPL, which is the logic or of RSCAP and CAPCLKENB, to the INH terminal of register 1437. OR gate 1416 supplies a signal CAPR which is the logic or of signals LSCAP and CAPCLKENB to the INH terminal of register LS-CAP1 1436. The 16-bit wide input of HS-CAP1 register 1437 connects to the upper portion of S-bus 423. The 16-bit wide input of LS-CAP1 register 1436 connects to the lower portion of S-bus 423.

The 16-bit wide output of register 1437 is referenced as LDATA(15:0). The 16-bit wide output of register 1436 is referenced as RDATA(15:0).

Register HS-CAP2 1438 has a 24-bit wide input which receives the LDATA(15:0) signal from register 1437 and additionally, bits 23 through 16 of S-bus 423. LS-CAP2 register 1439 also has a 24-bit wide input which receives signal RDATA(15:0) from register 1436 plus bits 7 through 0 of S-bus 423. The 24-bit wide outputs of registers 1438 and 1439 represent upper and lower captured portions of the slipstream data. These signals are applied to opposed inputs of multiplexer 1443. The output of multiplexer 1443 becomes the 24-bit wide slipstream output signal 443o.

The outputs of V-CAP registers 1432 and 1433 are applied to opposed inputs of multiplexer 1441. The signal select terminal of multiplexer 1441 is driven by set/reset flipflop 1440. A logic one ("1") on the Q-bar output of flipflop 1405 sets flipflop 1440. A logic one ("1") on the Q-bar of flipflop 1404 resets flipflop 1440. Flipflop 1440 is clocked by the CV25M video reference signal. The 16-bit wide output 1441o of multiplexer 1441 represents the combination of buses 441o and 442o of FIG. 4B.

Figure 4E:
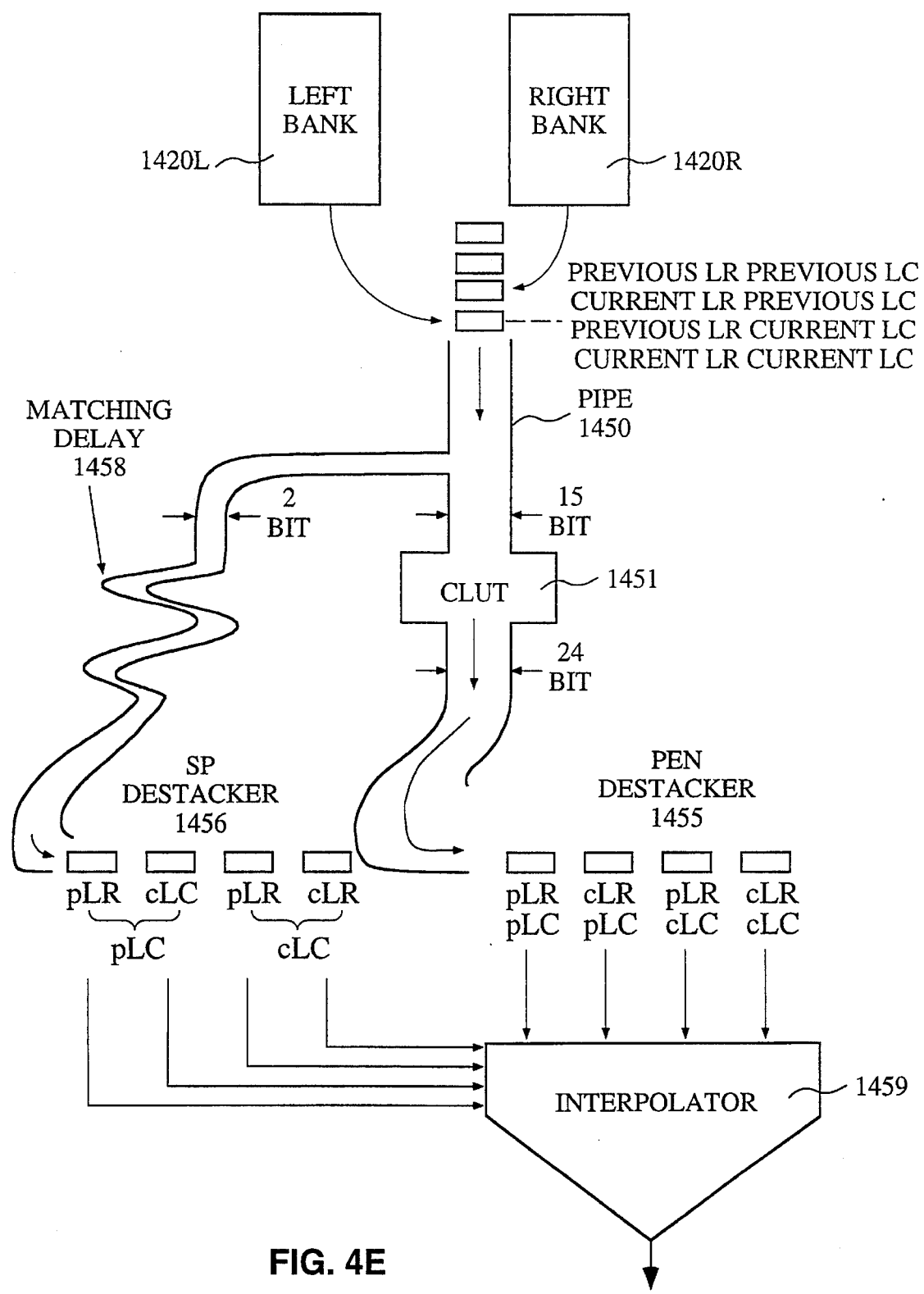
FIG. 4E is a conceptual diagram showing data interleaving in the pipelined structure of FIGS. 4A–B, showing the destacking of interleaved data and showing a CLUT-delay matching function performed within an SP carrying pipe of the system.

Referring to FIG. 4E, a conceptual view of system 400 is shown. Data words from left memory bank 1420L and right memory bank 1420R are interleaved as shown and sequenced into pipelined system 1450. The data word which is applied earliest in time represents the color/shading of a low-resolution pixel in the current low-resolution row (cLR) and current low resolution-column (cLC). The next data word represents low resolution pixel in the previous low resolution row (pLR) and the current low resolution column (cLC). The third applied data word represents a low resolution pixel in the current low resolution row (cLR) and previous low resolution column (pLC). The fourth supplied data word represents the color/shading of a low resolution pixel in the previous low resolution row (pLR) and previous low resolution column (pLC).

Fifteen-bit wide portions of these interleaved data words pass through CLUT unit 1451 where they are expanded into a corresponding interleaved stream of 24-bit wide data words (referred to as PEN signals). PEN destacker 1455 outputs these data words in time parallel form as shown. The "p" represents previous in the destacked formation. The "c" represents current. "LR" represents a low resolution row. "LC" represents a low resolution column.

At the same time, corresponding 2-bit wide subposition data words move through delay matching unit 1458 and into SP destacker unit 1456 for destacking by the SP destacker unit 1456. The signal-propagation delay of delay matching unit 1458 is set substantially equal to the signal-propagation delay of CLUT unit 1451 so that corresponding supposition data and PEN data are applied in synchronism to interpolator unit 1459.

Referring to FIG. 5, the structure and operation of 24-bit destacker unit 455 are now detailed. Ticks of the video reference clock (CV25M=24.5454 MHz) are divided into adjacent groups of four ticks each with an active-high REGCLK1 pulse occupying the first tick in a group and active-high REGCLK2 pulse occupying the third tick of the group, as shown.

The 24-bit-wide signals appearing on destacker-input bus 455i are identified in order as S0, S3, S1, S2, SA and SB according to their time of appearance, S0 being the first in time. These signals pass through multiplexer 500 onto bus 500o when slipstream mode is inactive. If slipstream mode is active, one or more of the corresponding slipstream signals, SS0, SS3, SS1, SS2, SSA and SSB, moving downstream along slipstream input bus 443o.1 can be substituted, by appropriate actuation of multiplexer 500, for a corresponding one or more of signals S0, S3, S1, S2, SA and SB on bus 455i.

Although there is only one, "current" line of slip stream data arriving from the slip stream source 424, slip stream pixels are interpolated by pretending that a "previous" line exists and the pixels of the previous slipstream line are the same as those of the current slipstream line. Substitution of slipstream pixels in place of some of the VRAM produced pixels creates a picture-in-picture effect. Interpolation can be used to smooth the seam between a slipstream image region and an immediately adjacent VRAM image region. Note that the VRAM data originates in a 15 bits per pixel RGB format, the slipstream data originates in a 24 bits per pixel RGB format, and yet the two can be merged into a single image.

Destacker unit 455 includes five 24-bit-wide latches respectively labeled as 501, 502, 511, 512 and 522. The REGCLK1 pulse signal is applied to the latch-enable (E) terminal of latch 501. The REGCLK2 pulse signal is applied to the latch-enable (E) terminals of the remaining latches, 502, 511, 512 and 522. Destacker-input bus 500 connects to the inputs of latches 501 and 502. The output of latch 511 defines signal node LPx1 (named after the signal generated there) and also connects by way of multiplexer 531 to the input of latch 512. (If slipstream mode is active, one or more of delayed slipstream signals, SS0', SS3', SS1', SS2', SSA', and SSB', moving downstream along slipstream input bus 443o.2 can be substituted, by appropriate actuation of multiplexer 531, for a corresponding one or more of the normal video ("V") signals passing from latch 511 to latch 512.) The output of latch 512 defines signal node LPx0. The output of latch 502 defines signal node LPx2 and also connects by way of multiplexer 532 to the input of latch 522. (If slipstream mode is active, one or more of delayed slipstream signals, SS0', SS3', SS1', SS2', SSA' and SSB', moving downstream along slipstream input bus 443o.2 can be substituted, by appropriate actuation of multiplexer 532, for a corresponding one or more of the normal video ("V") signals passing from latch 502 to latch 522.) The output of latch 522 defines signal node LPx3.

At the timepoint denoted as "TIME P" (first REGCLK1 pulse), signal S0 loads into latch 501. At timepoint Q (first REGCLK2 pulse), signal S0 loads into latch 511 while signal S3 loads into latch 502. At timepoint R (second REGCLK1 pulse), signal S1 loads into latch 501. At timepoint S (second REGCLK2 pulse), signal S1 loads into latch 511 while signal S2 loads into latch 502. At the same time, signal S0 loads into latch 512 and signal S3 loads into latch 522. The signals present at respective nodes LPx1, LPx0, LPx2 and LPx3 are therefore time-delayed, parallel-wise presented replicas of S1, S0, S2 and S3.

At a following timepoint P ("Next P"), the signals present at respective nodes LPx1, LPx0, LPx2 and LPx3 are still S1, S0, S2 and S3. At a following timepoint Q ("Next Q"), however, the signals present at respective nodes LPx1, LPx0, LPx2 and LPx3 are replicas of SA, S1, S3 and S2, where S1 and S2 represent pixel values of a previous column in the low-resolution image matrix and SA and S2 represent pixel values of a current column in the low-resolution image matrix (see FIGS. 1 and 2).

Note that in the transition between timepoints R and S, input signals S0 and S3 shift over from nodes LPx1 and LPx2 to nodes LPx0 and LPx3. Input signals S1 and S2 appear for the first time on nodes LPx0 and LPx3. In the transition between timepoints "Next P" and "Next Q", signals S0 and S3 shift out and disappear while signals S1 and S2 shift over, in pipeline fashion, from nodes LPx1 and LPx2 to nodes LPx0 and LPx3. Signals SA and SB appear for the first time on nodes LPx0 and LPx3. The process repeats for data subsequently delivered over the destacker-input bus 455i.

The 2-bit destacker 456 (FIG. 4B) operates in the same way except it consists of 2-bit-wide latches rather than 24-bit-wide latches and it does not process slipstream data.

Figure 6A:
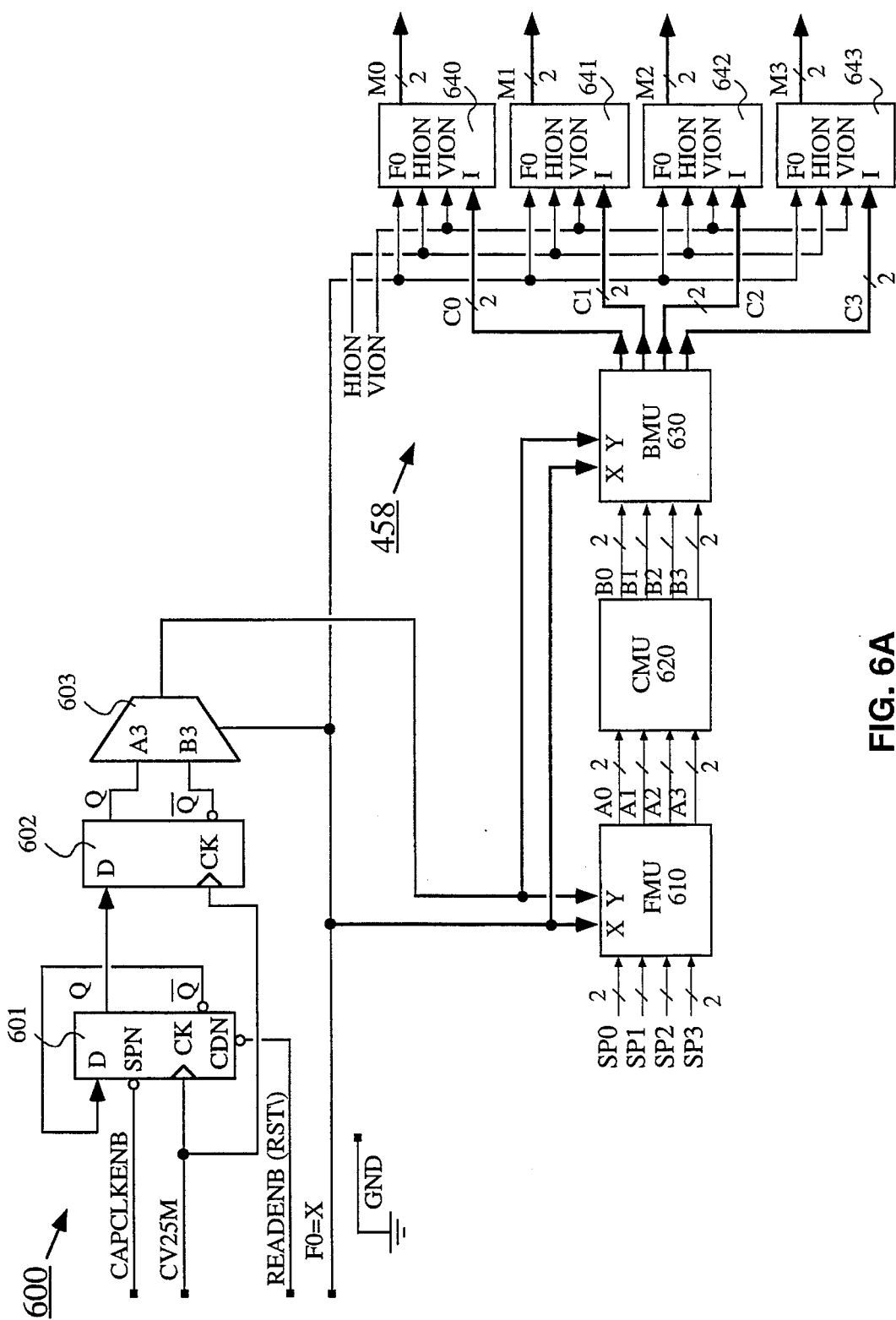
FIG. 6A is a schematic diagram illustrating details of a first addends-choosing unit which may be coupled to the MUXCAP unit of below-described FIG. 7, wherein the addends-choosing unit includes a post-choice horizontal and/or vertical interpolation enabling means which creates an appearance that one or both of horizontal and vertical interpolation functions has been selectively enabled or disabled.

The earlier mentioned choice-making and forward/backward mapping occur within choice-making unit 457 (FIG. 4B). FIG. 6A shows one such process in more detail. The destacked subposition signals, SP0, SP1, SP2, SP3, are delivered in parallel to a forward-mapping unit (FMU) 610 together with target configuration signals X and Y. (X is the same as Field odd/even indicating signal F0.)

Target configuration signal Y is generated by Y-generating circuit 600. Video clock signal CV25M (24.5454 MHz) drives the clock inputs of D-type flip flops 601 and 602. A READENB signal resets flip flop 601 at the end of each horizontal blanking interval. Flip flop 601 has its Q\ (read this as Q-bar or Q-not) output coupled to its D input so that it toggles its state each time it is enabled by the CAPCLK- ENB signal (developed in FIG. 4D as the delayed logical AND of LSC\ and RSC\ (In FIG. 6A, SPN is the negative sampling node of flip flop 601.) Flip flop 602 provides a one tick delay and forwards both the noninverted (Q) and inverted (Q\) versions of the toggling signal to multiplexer 603. Depending on the state of the Field odd/even indicating signal F0 applied to the selector input of multiplexer 603, its output, Y, starts off high or low at the start of each horizontal display line and toggles thereafter in synchronism with the video clock signal CV25M (24.5454 MHz).

Forward-mapping unit (FMU) 610 converts the four destacked subposition signals, SP0, SP1, SP2, SP3, into universal subposition signals A0, A1, A2, A3, in accordance with earlier-described FIG. 3F. Internally, FMU 610 comprises four combinatorial logic circuits each providing the function of forward-mapping table unit 310.

Universal choice making unit (CMU) 620 converts the four universal subposition signals A0, A1, A2, A3, into four universal choice signals, B0, B1, B2, B3, in accordance with earlier-described FIG. 3F. Internally, CMU 620 comprises a plurality of combinatorial logic circuits which provide the function of below code-conversion TABLE 1 (ITPCON.FDS).

Backward-mapping unit (BMU) 630 converts the four universal choice signals, B0, B1, B2, B3, into target-configuration specific choice signals C0, C1, C2, C3, in accordance with earlier-described FIG. 3F. Internally, BMU 630 comprises four combinatorial logic circuits each providing the function of forward-mapping table unit 330.

Choice signals C0, C1, C2, and C3 pass on to corresponding ones of choice-revising units, 640, 641, 642, and 643. The choice-revising units 640 through 643 convert choice signals C0, C1, C2, and C3 to respective, modified choice-signals M0, M1, M2, and M3 in accordance with a horizontal-interpolation activating signal, HION, and a vertical-interpolation activating signal, VION, supplied to units 640–643. Modified signals M0, M1, M2, and M3 are the same as original choice signals C0, C1, C2, and C3 in the case where both the horizontal and vertical interpolation activating signals are active (HION=1 and VION=1).

On the other hand, when one or both of the horizontal and vertical interpolation activating signals is inactive (HION=0 OR VION=0), choice-revising units 640–643 convert choice signals C0, C1, C2, and C3 to respective, modified signals M0, M1, M2, and M3 so as to give the impression that the respective horizontal or vertical interpolation operation has been turned off.

The code-conversion processes of each of choice-revising units 640–643 is the same and is given by the below code-conversion TABLE 2 (HVON.FDS). Table input terms Cx1 and Cx0 represent respective more and less-significant bits of a corresponding one, Cx, of 2-bit wide signals C0–C3. Table output terms Mz1 and Mz0 represent respective more and less-significant bits of a corresponding one, Mz, of 2-bit wide signals M0–M3.

FIGS. 6B.1 and 6B.2 are provided to explain the operations of units 640–643 by way of example.

FIG. 6B.1 shows the condition where horizontal interpolation is turned off (HION=0) but vertical interpolation is left on (VION=1). The high-resolution target pixel (T) is shown located within interpolation window 248 in quadrant QC of low-resolution pixel LPx0.

Interpolation window 248 is divided into left and right halves (L and R). Because the target high resolution target pixel (T) is located in the left half of window 248, and horizontal interpolation is turned off (HION=0), it is desirable to pretend that the right half of window 248 does not exist.

One way of doing so is to replace any choices of color/shading codes of LPx's in the right half of interpolation window 248 with corresponding choices in the left half of window 248. Choice-revising units 640–643 perform according to the following algorithm for the case where horizontal interpolation is to be turned off:

```
IF TARGET (T) IS ON LEFT AND HION=0:
    SUBSTITUTE CHOICE C=0 FOR EACH ORIGINAL CHOICE
    C=1;
    SUBSTITUTE CHOICE C=3 FOR EACH ORIGINAL CHOICE
    C=2;
ENDIF.
IF TARGET IS ON RIGHT AND HION=0:
    SUBSTITUTE C=1 FOR EACH C=0;
    SUBSTITUTE C=2 FOR EACH C=3;
ENDIF.
```

In the illustrated example of FIG. 6B.1, subposition points SP0–S3 are positioned such that SP1 is placed very close to the target (T) while SP0, SP3 and SP2 are positioned as far away as possible from the target position (T). The normal interpolation algorithm (wherein HION and VION are both set to a logic true or "1") will therefore choose the color/shading code of LPx1 as at least one, and more probably three or four of its four choices for averaging equation Eq. 2. However, because HION is reset to logic false ("0") and the target (T) is on the left side, choice-revising units 640–643 will replace each choice of LPx1 with a substitute choice of LPx0. If LPx2 is selected as one of the C0–C3 choices, that selection will be replaced by a choice of LPx3. Thus, all the revised choices, M0–M3 will focus on the left (L) half of window 248 rather than on the right half.

Referring to FIG. 6B.2, a similar approach is taken when vertical interpolation is turned off (VION=0) but horizontal interpolation is left on (HION=1). In this case, choice-revising-units 640–643 perform the following algorithm:

```
IF TARGET ON TOP AND VION=0:
    SUBSTITUTE C=0 FOR EACH C=3;
    SUBSTITUTE C=1 FOR EACH C=2;
```

```
                    -continued

ENDIF.
IF TARGET ON BOTTOM AND VION=0:
    SUBSTITUTE C=3 FOR EACH C=0;
    SUBSTITUTE C=2 FOR EACH C=1;
ENDIF.
```

With the above algorithm, all of revised choices M0–M3 will focus on the low resolution row (LR) in which the target pixel resides. This will give the appearance that vertical interpolation has been turned off.

If both the horizontal-interpolation and vertical-interpolation activating signals are switched to FALSE (HION=0, VION=0), then the algorithms of both FIG. 6B.1 and FIG. 6B.2 are performed one after the next. The result of executing both algorithms is that the same choice value will be output four times to the interpolator 459, where the same choice value is the color/shading code of the low resolution pixel under which the target high resolution pixel (T) resides. In the illustrated example of FIGS. 6B.1 and 6B.2, the target (T) is under LPx0, and as a consequence, when HION=0 and VION=0, the four revised choices, M0–M3 will all point to LPx0.

Figure 6C:
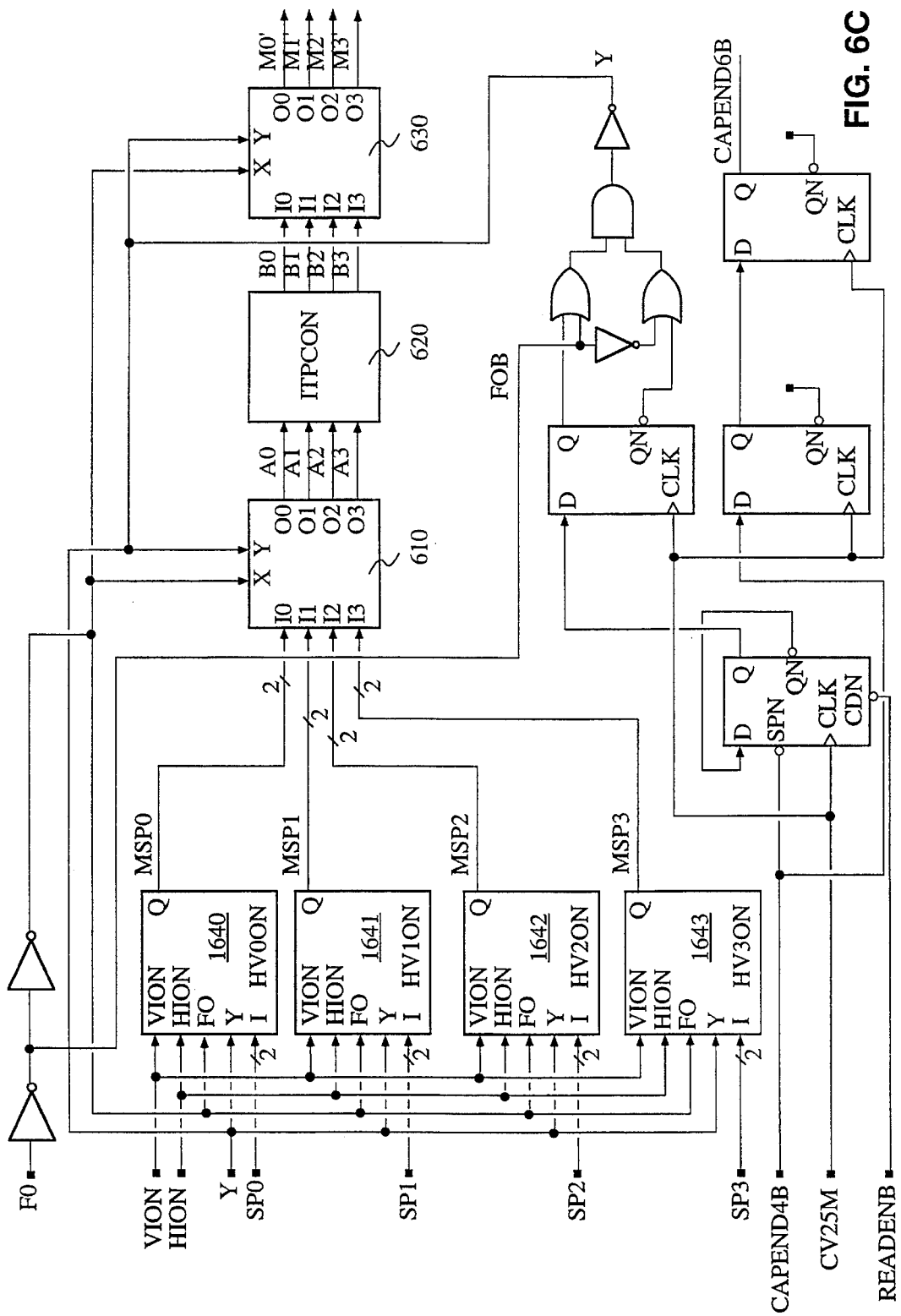
FIG. 6C is a schematic diagram illustrating details of a second addends-choosing unit which may be coupled to the MUXCAP unit of below-described FIG. 7, wherein the addends-choosing unit includes a pre-choice a horizontal and/or vertical interpolation enabling means which creates an appearance that one or both of horizontal and vertical interpolation functions has been selectively enabled or disabled.

Referring to FIGS. 6C, 6D.1, and 6D.2, a second approach in accordance with the invention modifies the subposition values (SP0–SP3) before they are applied to choice-making units 610–630. This pre-choice modifying scheme reduces the problem of bias from supposedly not-present subposition signals.

In the example illustrated within FIG. 6D.1 note that original subposition point SP1 is shifted to a new, modified subposition point, MSP1, thereby moving further away from the target position (T). Original subposition SP2 is shifted to new, modified subposition MSP2 to again increase its distance away from the target position (T). At the same time, original subposition point SP0 is shifted right to create the new, modified subposition point MSP0 which is closer to target position T. Similarly, SP3 is shifted right to new position MSP3 which is closer to target position T.

The algorithm performed in FIG. 6D.1 is described as follows. If horizontal interpolation is turned off (HION=0) but vertical interpolation is left on (VION=1), the interpolation window 248 is divided into left and right halves. The half in which the target high-resolution pixel (T) resides is defined as "interesting". The half in which the target pixel (T) does not reside is deemed to be "uninteresting". The original subposition points SP0–SP3 and the new, modified subposition points MSP0–MSP3 are respectively defined by their ($SP_V$, $SP_H$) coordinates. Then the following algorithm is performed:

```
IF VION=1 AND HION=0:
    FIRST SET THE ($SP_V$, $SP_H$) COORDINATES OF ALL
    MSP's EQUAL TO THAT OF ALL SP's;
    SET THE $SP_H$ COORDINATE OF EVERY MSP EQUAL TO
    THE $SP_H$ COORDINATE OF THE TARGET POSITION;
    SET THE $SP_V$ COORDINATE OF EACH MSP IN THE
    UNINTERESTING HALF TO BE OPPOSITE OF THE $SP_V$
    COORDINATE OF THE TARGET POSITION;
ENDIF.
```

The approach taken in FIGS. 6A, 6B.1 and 6B.2 is simple and effective. However, it suffers from a slight drawback. Looking momentarily back to FIG. 6B.1, note that subposition point SP1 contributes most heavily to the choice-making process of units 610–630 because SP1 is positioned closest to the target point (T). Ideally, if horizontal interpolation is supposed to be turned off, subposition point SP1 should not in any way bias the choices made by units 610–630. But in the post-choice revising scheme of FIG. 6A, it does.

Another way to look at the same algorithm is to view the column in which the target resides as a "KEEP" column and to view the non mirror one of the columns in which the uninteresting half of window 248 as also being a "KEEP" column. The remaining two columns are deemed as "COLLAPSE" columns. Subposition points that are originally in the COLLAPSE columns are moved to the KEEP columns.

FIG. 6D.2 shows the counterpart algorithm for the case where vertical interpolation is turned off but horizontal interpolation in left on. The top or bottom half of window 248 in which the target resides is defined as "interesting". The half in which the target does not reside is deemed as "uninteresting". The subposition-modifying algorithm is then defined as follows:

```
IF VION=0 AND HION=1:
    IF NOT YET DONE, FIRST SET THE ($SP_V$, $SP_H$)
    COORDINATES OF ALL MSP's EQUAL TO THAT OF THE
    CORRESPONDING SP's;
    SET THE $SP_V$ COORDINATE OF EVERY MSP POINT EQUAL
    TO THE $SP_V$ COORDINATE OF THE TARGET;
    SET THE $SP_H$ COORDINATE OF MSP's IN THE
    UNINTERESTING HALF TO BE OPPOSITE THAT OF THE
```

-continued

SP_H COORDINATE OF THE TARGET;
ENDIF.

FIG. 6C shows the circuit for performing the above functions. Note that subposition-modifying units 1640–1643 are now placed ahead of choice-making units 610–630. A different code-conversion table is used to define each of subposition-modifying units 1640–1643. The below code-conversion tables 3.0 through 3.3 respectively define the input and output bits of respective modifying units 1640 through 1643. Input parameter SPx1 represents the more significant bit and input parameter SPx0 represents the less significant bit of a respective subposition signal SPx selected from a respective one of SP0–SP3. Similarly, output parameters MSPx1 and MSPx0 represent respective more and less significant portions of each output signal MSPx selected from the set MSP0–MSP3.

The respective outputs of units 640–643 in FIG. 6A are referenced respectively as M0–M3. The outputs of unit 630 in FIG. 6C is similarly referenced as M0'–M3'.

Figure 7:
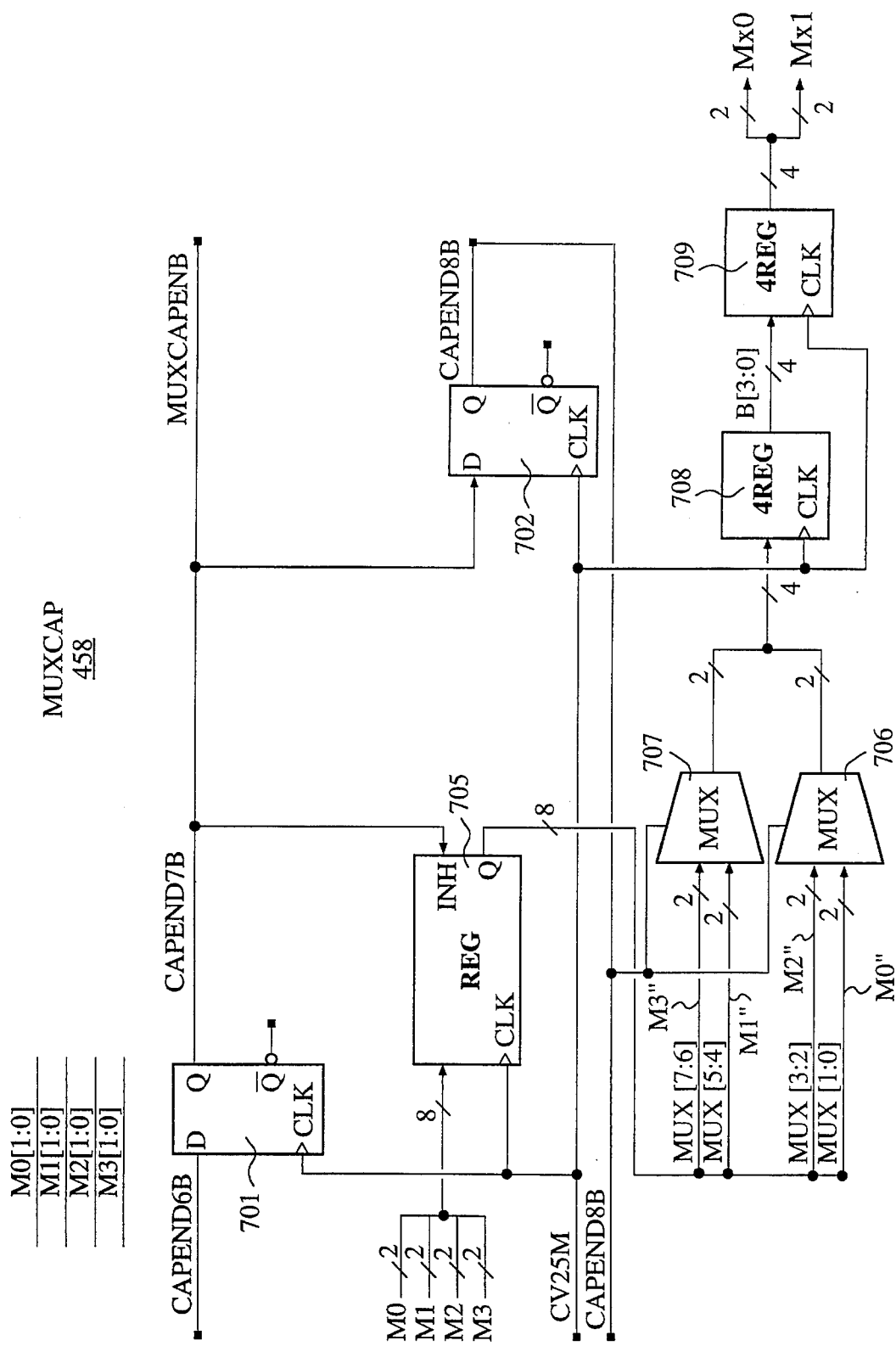
FIG. 7 is a schematic diagram of a MUXCAP unit of the invention.

Referring to FIG. 7, the modified choices M0–M3 (or M0'–M3' if the embodiment of FIG. 6C is used) are next applied to the illustrated MUXCAP unit 458. Eight-bit wide register 705 captures the modified choice signals M0–M3. A CAPEND7B signal connects to the inhibit (INH) terminal of register 705 to define the choice capture time. The CAPEND7B signal represents the capture enable signal CAPCLKEN (see FIG. 4C) where the delay is seven ticks of the CV25M video reference clock. Register 701 develops the CAPEND7B signal from a supplied CAPEND6B signal. Register 702 develops a further delayed signal CAPEND8B from the CAPEND7B signal.

The 8-bit wide output of register 705 is subdivided into one-tick delayed signals M0", M1", M2", and M3". These delayed signals correspond to the modified choice signals M0–M3 (or M—M3') applied to the input side of register 705. Delayed signals M0" and M2" are delivered to opposed inputs of multiplexer 706. Delayed signals M1" and M3" are delivered to opposed inputs of multiplexer 707. The select terminals of multiplexers 706 and 707 are both driven by the CAPEND8B signal.

During a first phase of the CAPEND8B signal, multiplexers 706 and 707 deliver respective signals M0" and M1" to the 4-bit wide input of register 708. During a second phase of the CAPEND8B signal, multiplexers 706 and 707 deliver respective signals M2" and M3" to the 4-bit wide input of register 708. Register 708 is clocked by the video reference clock signal CV25M, as are registers 701, 702 and 705. The 4-bit wide output of register 708 couples to the input of 4-bit wide register 709. Register 709 is also clocked by the CV25M signal. The output of register 709 defines a first multiplexed, modified choice signal Mx0 (2 bits wide) and a second multiplexed, modified choice signal Mx1 (2 bits wide).

The delay from the input of choice making unit 457 (FIG. 4B) to the output of register 705 is approximately two ticks of the video reference clock CV25M. The delay from the output of register 705 to the output of register 709 is two more ticks of the video reference clock CV25M. Accordingly the total delay of choice making unit 457 and MUXCAP unit 458 is four ticks of the video reference clock CV25M. This matches the four-tick signal-propagation delay time of the CLUT units 451 and 452 (FIG. 4B).

Figure 8:
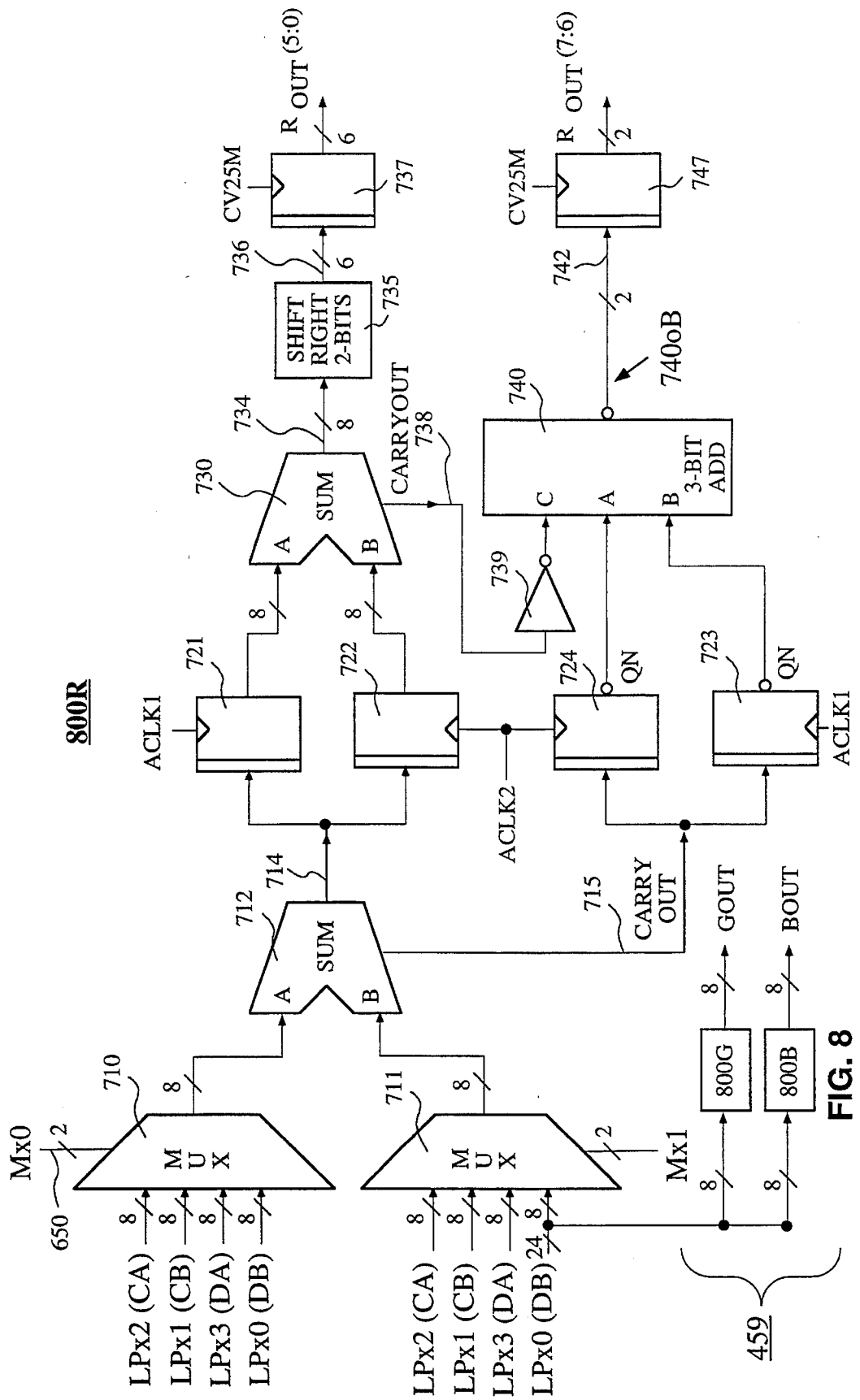
FIG. 8 is a schematic diagram illustrating details of a pipelined average-calculating mechanism in accordance with the invention.

FIG. 8 shows the internal structure of interpolator 459. Interpolation 459 is divided into respective R, G and B units, 800R, 800G and 800B (e.g., red, green, blue color handling units). Only unit 800R is shown in detail. Units 800G and 800B are understood to have internal similar structures.

Unit 800R receives the 8-bit wide "R" components of each of the 24-bit wide, destacked signals, LPx0, LPx1, LPx2, LPx3, and produces a corresponding 8-bit wide ROUT signal. Unit 800G receives the 8-bit wide "G" components of each of the 24-bit wide, destacked signals, LPx0, LPx1, LPx2, LPx3, and produces a corresponding 8-bit wide GOUT signal. Unit 800G receives the 8-bit wide "G" components of each of the 24-bit wide, destacked signals, LPx0, LPx1, LPx2, LPx3, and produces a corresponding 8-bit wide GOUT signal. Unit 800B receives the 8-bit wide "B" components of each of the 24-bit wide, destacked signals, LPx0, LPx1, LPx2, LPx3, and produces a corresponding 8-bit wide BOUT signal. Output signals ROUT, BOUT and GOUT combine to form a 24-bit wide output signal RGBOUT.

Referring to the detailed schematic of unit 800R, during each tick of the video reference clock signal CV25M, multiplexer 710 picks one of the R values of destacked signals, LPx0, LPx1, LPx2, LPx3, in accordance with the Mx0 choice signal supplied to a control terminal of multiplexer 710. Multiplexer 710 supplies the picked LPx value to the A-input of first adding unit 712. During the same clock tick, multiplexer 711 picks one of the R values of destacked signals, LPx0, LPx1, LPx2, LPx3, in accordance with the Mx1 choice signal supplied to its select control terminal. Multiplexer 711 supplies the picked LPx value to the B-input of first adding unit 712.

First adding unit 712 generates first-sum signal 714 during each tick. This first-sum signal 714 represents the sum of two nonexhaustively chosen ones of destacked R signals, LPx0, LPx1, LPx2, LPx3. On alternating ticks (indicated by ACLK1 and ACLK2), the first-sum signal 714 is stored into a respective one or the other of registers 721 and 722. After an initializing tick, registers 721 and 722 respectively store, in pipelined fashion, the sums of a first chosen pair (current pair) and a second chosen pair of values (previous pair) selected from the set of destacked R signals, LPx0, LPx1, LPx2, LPx3. Carry-out signals (addition overflows) 715 produced by each pipelined addition step of adder 712 are simultaneously stored on alternating ticks in one or the other of registers 723 and 724. Signals designated as "current" become "previous" data in the next successive tick. Computation therefore proceeds through the circuit in pipeline fashion.

Second adding unit 730 generates a second-sum signal 734 during each tick. This second-sum signal 734 represents the sum of the four destacked R signals, LPx0, LPx1, LPx2, LPx3 chosen by modified choice signals M0–M3.

A carry-out signal (addition overflow) 738 produced by adder 730 is supplied to a C input of a carries-adding unit 740 by way of inverter 739. Carries-adding unit 740 is two-bit plus carry adder with an inverted, 2-bit wide output, 740oB. Inverted versions of the carry-out signals previously generated by adder 712 in successive ticks and stored in registers 723 and 724 are applied to A and B inputs of carries-adding unit 740. It turns out that the process of inverting three 1-bit values, adding them, and inverting the 2-bit result is logically equivalent to a noninverted addition of the three values. Circuit size is minimized and use of two additional inverters is saved in the circuitry of FIG. 8 by using the already inverted outputs (QN) of registers 723, 724 and an already available inverted output 740oB within the 2-bit plus carry adder 740. The 2-bit wide output 740oB of unit 740 represents the sum of the three carry bits generated respectively by a first tick addition in adder 712, a second tick addition in adder 712, and the subsequent addition in adder unit 730.

The second-sum signal 734 passes through a divide-by-four unit 735 where it is shifted right by two bit positions (e.g., a hard-wired shift right of two). The result signal 736 output by divide-by-four unit 735 then represents the less-significant 6 bits (ROUT bits 5:0) of the sum of four chosen ones of destacked R signals, LPX0, LPX1, LPX2, LPX3, divided by four. In one embodiment, because the lower two bits are thrown away by unit 735, those portions of preceding unit 730 which output these two bits are eliminated to save circuit space.

Result signal 736 is synchronized to the video clock signal CV25M by storing it in register 737. The signal output by synchronizing register 737 represents bits 5:0 of the earlier-mentioned ROUT signal. Carries-sum signal 740oB represents the more-significant 2 bits (bits 7:6 of ROUT) of the sum of four chosen ones of destacked R portions of signals, LPx0, LPx1, LPx2, LPx3, divided by four. Result signal 740oB is synchronized to the video clock signal CV25M by storing it in register 747. The combined outputs of registers 737 and 747 form the 8-bit wide ROUT signal.

The produced RGBOUT signal of units 800R, 800G and 800B is ultimately transmitted out of the CLIO chip 430 and used to produce a corresponding light image on an appropriate display means (e.g. a color CRT or color LCD).

When both of the HION and VION interpolation-activating signals are switched to the true state, the machine-internal 320-by-240 pixels low-resolution image (element 125 in FIG. 1) is transformed into a light image (element 165 in FIG. 1) that has an apparent high-resolution of 640by-480 pixels. When only the HION interpolation-activating signal is switched to the true state, the machine-internal 320-by-240 pixels low-resolution image (element 125 in FIG. 1) is transformed into a light image (element 165 in FIG. 1) that has an apparent high-resolution of 640-by-240 pixels. When only the VION interpolation-activating signal is switched to the true state, the machine-internal 320-by-240 pixels low-resolution image (element 125 in FIG. 1) is transformed into a light image (element 165 in FIG. 1) that has an apparent high-resolution of 320-by-480 pixels. And when both HION and VION are switched to false, the machine-internal 320-by-240 pixels low-resolution image (element 125 in FIG. 1) is transformed into a light image (element 165 in FIG. 1) that has a same apparent resolution of 320-by-240 pixels. Accordingly, the invention provides for a number of different transformations from stored data (125) to physical light image (165).

The transformation process need not be viewed as merely an interpolation process. The user-supplied subposition signals (SP0–SP3) can be seen as means for changing the colors of produced pixels. The user-supplied interpolation activating signals (HION, VION) can be seen as means for changing the apparent fuzziness or sharpness of the produced light image. When subpositions are appropriately concentrated or scattered at the boundary of two differently colored objects within a display image, the appearance of the boundary can be highlighted by increasing or decreasing color intensity in the region of the boundary to create perception of a sharp edge. Conversely, the boundary can be blurred by smoothing the transition of colors and/or intensity as one moves from one image object to the next to thereby create a perception of a soft or rounded edge. Also, an appearance of different surface textures can be created by patterning subposition bits differently in areas that are to appear as different surfaces. Moreover, anti-aliasing effects can be created to remove the jagged edges appearance of angled lines by appropriate manipulation scattering of subposition values within a display image. The various effects are developed empirically by trying different distribution patterns of subposition values and observing the resultant effect on a CRT or other display means (e.g., LCD).

CODE CONVERSION TABLES

The below code conversion Tables 1, 2, 3.0–3.3 each have the same format. Input data bits are presented in a left-hand column in the same left to right order as recited next to the introduction "INPUTS: . . . ". The corresponding output data bits are indicated on the same line in a right-hand column in the same left to right order as recited next to the introduction "OUTPUTS: . . . ". For purposes of speed and circuit compactness, the code-conversion functions are preferably implemented in the form of combinatorial logic circuitry which is designed using conventional Karnough-mapping techniques or the like. Each input/output "1" represents a logic true electrical or other signal, each input/output "0" represents a logic false electrical or other signal, each input/output "x" bit represents a logic don't-care electrical or other signal. The code-conversion functions can be alternatively implemented in the form of a ROM (read only memory) circuit or a computer program or the like. (Copyright Notice: In so far that the subject matter of the code-conversion tables is coverable by copyrights, the copyright owner reserves all such rights except those expressly waived above.)

TABLE 1

(ITPCON.FDS)
COPYRIGHT © 1992 The 3DO Company
CONTENTS OF CHOICE MAKING UNIT 320 OR 620 OR 1620

| CKTNAME: | ITPCON; |
|---|---|
| TYPE: | COMB; |
| INPUTS: | A01,A00,A11,A10,A21,A20,A31,A30; |
| OUTPUTS: | B01,B00,B11,B10,B21,B20,B31,B30; |
| <TT> | |
| 00000000 | 01011010 |
| 00000001 | 01101101 |
| 00000010 | 01011010 |
| 00000011 | 01011010 |

TABLE 1-continued (ITPCON.FDS)
COPYRIGHT © 1992 The 3DO Company
CONTENTS OF CHOICE MAKING UNIT 320 OR 620 OR 1620

| | |
|---|---|
| 00000100 | 01011001 |
| 00000101 | 01011011 |
| 00000110 | 01011001 |
| 00000111 | 01011001 |
| 00001000 | 01010101 |
| 00001001 | 01011101 |
| 00001010 | 01010101 |
| 00001011 | 01010110 |
| 00001100 | 01011001 |
| 00001101 | 01011011 |
| 00001110 | 01011001 |
| 00001111 | 01010110 |
| 00010000 | 01101001 |
| 00010001 | 01101011 |
| 00010010 | 01101001 |
| 00010011 | 01101001 |
| 00010011 | 01100011 |
| 00010101 | 01101101 |
| 00010110 | 01100011 |
| 00010111 | 01011010 |
| 00011000 | 01011000 |
| 00011001 | 01100011 |
| 00011010 | 01011000 |
| 00011011 | 01011000 |
| 00011100 | 01011000 |
| 00011101 | 01100011 |
| 00011110 | 01011000 |
| 00011111 | 01011000 |
| 00100000 | 01011010 |
| 00100001 | 01101101 |
| 00100010 | 01011010 |
| 00100011 | 01011010 |
| 00100100 | 01011001 |
| 00100101 | 01011011 |
| 00100110 | 01011001 |
| 00100111 | 01011001 |
| 00101000 | 01010101 |
| 00101001 | 01011101 |
| 00101010 | 01010101 |
| 00101011 | 01010110 |
| 00101100 | 01011001 |
| 00101101 | 01011011 |
| 00101110 | 01011001 |
| 00101111 | 01010110 |
| 00110000 | 01010101 |
| 00110001 | 01010101 |
| 00110010 | 01010101 |
| 00110011 | 01010101 |
| 00110100 | 01010101 |
| 00110101 | 01010101 |
| 00110110 | 01010101 |
| 00110111 | 01010101 |
| 00111000 | 01010101 |
| 00111001 | 01010101 |
| 00111010 | 01010101 |
| 00111011 | 01010101 |
| 00111100 | 01010101 |
| 00111101 | 01010101 |
| 00111110 | 01010101 |
| 00111111 | 01010101 |
| 01000000 | 01100001 |
| 01000001 | 01100011 |
| 01000010 | 01100001 |
| 01000011 | 01011010 |
| 01000100 | 01011000 |
| 01000101 | 01011000 |
| 01000110 | 01011000 |
| 01000111 | 01011000 |
| 01001000 | 01010001 |
| 01001001 | 01010011 |
| 01001010 | 01010001 |
| 01001011 | 01010001 |
| 01001100 | 01011000 |
| 01001101 | 01010011 |
| 01001110 | 01011000 |

TABLE 1-continued (ITPCON.FDS)
COPYRIGHT © 1992 The 3DO Company
CONTENTS OF CHOICE MAKING UNIT 320 OR 620 OR 1620

| | |
|---|---|
| 01001111 | 01011000 |
| 01010000 | 01101000 |
| 01010001 | 01101000 |
| 01010010 | 01101000 |
| 01010011 | 01101000 |
| 01010100 | 01100001 |
| 01010101 | 01100011 |
| 01010110 | 01100001 |
| 01010111 | 01100001 |
| 01011000 | 01100011 |
| 01011001 | 01001101 |
| 01011010 | 01100011 |
| 01011011 | 01011000 |
| 01011100 | 01100011 |
| 01011101 | 01100011 |
| 01011110 | 01100011 |
| 01011111 | 01100001 |
| 01100000 | 01100001 |
| 01100001 | 01100011 |
| 01100010 | 01100001 |
| 01100011 | 01011010 |
| 01100100 | 01011000 |
| 01100101 | 01011000 |
| 01100110 | 01011000 |
| 01100111 | 01011000 |
| 01101000 | 01010001 |
| 01101001 | 01010011 |
| 01101010 | 01010001 |
| 01101011 | 01010001 |
| 01101100 | 01011000 |
| 01101101 | 01010011 |
| 01101110 | 01011000 |
| 01101111 | 01011000 |
| 01110000 | 01010101 |
| 01110001 | 01010101 |
| 01110010 | 01010101 |
| 01110011 | 01010101 |
| 01110100 | 01010101 |
| 01110101 | 01010101 |
| 01110110 | 01010101 |
| 01110111 | 01010101 |
| 01111000 | 01010101 |
| 01111001 | 01010101 |
| 01111010 | 01010101 |
| 01111011 | 01010101 |
| 01111100 | 01010101 |
| 01111101 | 01010101 |
| 01111110 | 01010101 |
| 01111111 | 01010101 |
| 10000000 | 01100001 |
| 10000001 | 01100011 |
| 10000010 | 01100001 |
| 10000011 | 01100001 |
| 10000100 | 01100001 |
| 10000101 | 01100011 |
| 10000110 | 01100001 |
| 10000111 | 01011000 |
| 10001000 | 01010000 |
| 10001001 | 01001101 |
| 10001010 | 01010000 |
| 10001011 | 01010000 |
| 10001100 | 01010000 |
| 10001101 | 01001101 |
| 10001110 | 01010000 |
| 10001111 | 01010000 |
| 10010000 | 01100001 |
| 10010001 | 01100011 |
| 10010010 | 01100001 |
| 10010011 | 01101000 |
| 10010100 | 01100000 |
| 10010101 | 01100000 |
| 10010110 | 01100000 |
| 10010111 | 01100000 |
| 10011000 | 01000001 |
| 10011001 | 01000011 |

TABLE 1-continued (ITPCON.FDS)
COPYRIGHT © 1992 The 3DO Company
CONTENTS OF CHOICE MAKING UNIT 320 OR 620 OR 1620

```
10011010  01000001
10011011  01000001
10011100  01100000
10011101  01000011
10011110  01100000
10011111  01100000
10100000  01100001
10100001  01100011
10100010  01100001
10100011  01100001
10100100  01100001
10100101  01100011
10100110  01100001
10100111  01011000
10101000  01010000
10101001  01001101
10101010  01010000
10101011  01010000
10101100  01010000
10101101  01001101
10101110  01010000
10101111  01010000
10110000  01010101
10110001  01010101
10110010  01010101
10110011  01010101
10110100  01010101
10110101  01010101
10110110  01010101
10110111  01010101
10111000  01010101
10111001  01010101
10111010  01010101
10111011  01010101
10111100  01010101
10111101  01010101
10111110  01010101
10111111  01010101
11000000  01011010
11000001  01101101
11000010  01011010
11000011  01011010
11000100  01011000
11000101  01011011
11000110  01011000
11000111  01011000
11001000  01010001
11001001  01010011
11001010  01010001
11001011  01010110
11001100  01011000
11001101  01011101
11001110  01011000
11001111  01011000
11010000  01101000
11010001  01101011
11010010  01101000
11010011  01101000
11010100  01100011
11010101  01100011
11010110  01100011
11010111  01100001
11011000  01011000
11011001  01100011
11011010  01011000
11011011  01011000
11011100  01011000
11011101  01100011
11011110  01011000
11011111  01011000
11100000  01011010
11100001  01101101
11100010  01011010
11100011  01011010
11100100  01011000
```

TABLE 1-continued (ITPCON.FDS)
COPYRIGHT © 1992 The 3DO Company
CONTENTS OF CHOICE MAKING UNIT 320 OR 620 OR 1620

| | |
|---|---|
| 11100101 | 01011011 |
| 11100110 | 01011000 |
| 11100111 | 01011000 |
| 11101000 | 01010001 |
| 11101001 | 01010011 |
| 11101010 | 01010001 |
| 11101011 | 01010110 |
| 11101100 | 01011000 |
| 11101101 | 01011101 |
| 11101110 | 01011000 |
| 11101111 | 01011000 |
| 11110000 | 01010101 |
| 11110001 | 01010101 |
| 11110010 | 01010101 |
| 11110011 | 01010101 |
| 11110100 | 01010101 |
| 11110101 | 01010101 |
| 11110110 | 01010101 |
| 11110111 | 01010101 |
| 11111000 | 01010101 |
| 11111001 | 01010101 |
| 11111010 | 01010101 |
| 11111011 | 01010101 |
| 11111100 | 01010101 |
| 11111101 | 01010101 |
| 11111110 | 01010101 |
| 11111111 | 01010101 |

<END>

TABLE 2

(HVON.FDS)
CONTENTS OF EACH OF H/V CONTROL UNITS 640–643
COPYRIGHT © 1992 The 3DO Company

| | |
|---|---|
| CKTNAME: | HVON; |
| TYPE: | COMB; |
| INPUTS: | F0,Y,HION,VION,Cx1,Cx0; |
| OUTPUTS: | Mz1,Mz0; |

<TT>

| | |
|---|---|
| 000000 | 00 |
| 000001 | 00 |
| 000010 | 00 |
| 000011 | 00 |
| 000100 | 00 |
| 000101 | 00 |
| 000110 | 11 |
| 000111 | 11 |
| 001000 | 00 |
| 001001 | 01 |
| 001010 | 01 |
| 001011 | 00 |
| 001100 | 00 |
| 001101 | 01 |
| 001110 | 10 |
| 001111 | 11 |
| 010000 | 01 |
| 010001 | 01 |
| 010010 | 01 |
| 010011 | 01 |
| 010100 | 01 |
| 010101 | 01 |
| 010110 | 10 |
| 010111 | 10 |
| 011000 | 00 |
| 011001 | 01 |
| 011010 | 01 |
| 011011 | 00 |
| 011100 | 00 |
| 011101 | 01 |
| 011110 | 10 |
| 011111 | 11 |
| 100000 | 10 |
| 100001 | 10 |
| 100010 | 10 |
| 100011 | 10 |
| 100100 | 01 |
| 100101 | 01 |
| 100110 | 10 |
| 100111 | 10 |
| 101000 | 11 |
| 101001 | 10 |
| 101010 | 10 |
| 101011 | 11 |
| 101100 | 00 |
| 101101 | 01 |
| 101110 | 10 |
| 101111 | 11 |
| 110000 | 11 |
| 110001 | 11 |
| 110010 | 11 |
| 110011 | 11 |
| 110100 | 00 |
| 110101 | 00 |
| 110110 | 11 |
| 110111 | 11 |
| 111000 | 11 |
| 111001 | 10 |
| 111010 | 10 |
| 111011 | 11 |
| 111100 | 00 |
| 111101 | 01 |
| 111110 | 10 |
| 111111 | 11 |

<END>

TABLE 3.0

(HV0ON.FDS)
CONTENTS OF H/V CONTROL UNIT 1640
COPYRIGHT © 1992 The 3DO Company

```
CKTNAME:    HV0ON;
TYPE:       COMB;
INPUTS:     VION,HION,F0,Y,SPx1,SPx0;
OUTPUTS:    MSPx1,MSPx0;
<TT>
    000000      10
    000001      10
    000010      10
    000011      10
    000100      11
    000101      11
    000110      11
    000111      11
    001000      00
    001001      00
    001010      00
    001011      00
    001100      01
    001101      01
    001110      01
    001111      01
    010000      11
    010001      10
    010010      10
    010011      11
    010100      11
    010101      10
    010110      10
    010111      11
    011000      01
    011001      01
    011010      01
    011011      01
    011100      00
    011101      00
    011110      00
    011111      00
    100000      01
    100001      01
    100010      10
    100011      10
    100100      00
    100101      00
    100110      00
    100111      00
    101000      11
    101001      11
    101010      11
    101011      11
    101100      01
    101101      01
    101110      10
    101111      10
    110000      00
    110001      01
    110010      10
    110011      11
    110100      00
    110101      01
    110110      10
    110111      11
    111000      00
    111001      01
    111010      10
    111011      11
    111100      00
    111101      01
    111110      10
    111111      11
<END>
```

TABLE 3.1

(HV1ON.FDS)
CONTENTS OF H/V CONTROL UNIT 1641
COPYRIGHT © 1992 The 3DO Company

```
CKTNAME:    HV1ON;
TYPE:       COMB;
INPUTS:     VION,HION,F0,Y,SPx1,SPx0;
OUTPUTS:    MSPx1,MSPx0;
<TT>
    000000      10
    000001      10
    000010      10
    000011      10
    000100      11
    000101      11
    000110      11
    000111      11
    001000      00
    001001      00
    001010      00
    001011      00
    001100      01
    001101      01
    001110      01
    001111      01
    010000      11
    010001      10
    010010      10
    010011      11
    010100      11
    010101      10
    010110      10
    010111      11
    011000      01
    011001      01
    011010      01
    011011      01
    011100      00
    011101      00
    011110      00
    011111      00
    100000      01
    100001      01
    100010      01
    100011      01
    100100      00
    100101      00
    100110      11
    100111      11
    101000      00
    101001      00
    101010      11
    101011      11
    101100      10
    101101      10
    101110      10
    101111      10
    110000      00
    110001      01
    110010      10
    110011      11
    110100      00
    110101      01
    110110      10
    110111      11
    111000      00
    111001      01
    111010      10
    111011      11
    111100      00
    111101      01
    111110      10
    111111      11
<END>
```

TABLE 3.2

(HV2ON.FDS)
CONTENTS OF H/V CONTROL UNIT 1642
COPYRIGHT © 1992 The 3DO Company

| CKTNAME: | HV2ON; |
|---|---|
| TYPE: | COMB; |
| INPUTS: | VION,HION,F0,Y,SPx1,SPx0; |
| OUTPUTS: | MSPx1,MSPx0; |

<TT>

| | |
|---|---|
| 000000 | 10 |
| 000001 | 10 |
| 000010 | 10 |
| 000011 | 10 |
| 000100 | 11 |
| 000101 | 11 |
| 000110 | 11 |
| 000111 | 11 |
| 001000 | 00 |
| 001001 | 00 |
| 001010 | 00 |
| 001011 | 00 |
| 001100 | 01 |
| 001101 | 01 |
| 001110 | 01 |
| 001111 | 01 |
| 010000 | 11 |
| 010001 | 11 |
| 010010 | 11 |
| 010011 | 11 |
| 010100 | 10 |
| 010101 | 10 |
| 010110 | 10 |
| 010111 | 10 |
| 011000 | 00 |
| 011001 | 01 |
| 011010 | 01 |
| 011011 | 00 |
| 011100 | 00 |
| 011101 | 01 |
| 011110 | 01 |
| 011111 | 00 |
| 100000 | 01 |
| 100001 | 01 |
| 100010 | 01 |
| 100011 | 01 |
| 100100 | 00 |
| 100101 | 00 |
| 100110 | 11 |
| 100111 | 11 |
| 101000 | 00 |
| 101001 | 00 |
| 101010 | 11 |
| 101011 | 11 |
| 101100 | 10 |
| 101101 | 10 |
| 101110 | 10 |
| 101111 | 10 |
| 110000 | 00 |
| 110001 | 01 |
| 110010 | 10 |
| 110011 | 11 |
| 110100 | 00 |
| 110101 | 01 |
| 110110 | 10 |
| 110111 | 11 |
| 111000 | 00 |
| 111001 | 01 |
| 111010 | 10 |
| 111011 | 11 |
| 111100 | 00 |
| 111101 | 01 |
| 111110 | 10 |
| 111111 | 11 |

<END>

TABLE 3.3

(HV3ON.FDS)
CONTENTS OF H/V CONTROL UNIT 1643
COPYRIGHT © 1992 The 3DO Company

| CKTNAME: | HV3ON; |
|---|---|
| TYPE: | COMB; |
| INPUTS: | VION,HION,F0,Y,SPx1,SPx0; |
| OUTPUTS: | MSPx1,MSPx0; |

<TT>

| | |
|---|---|
| 000000 | 10 |
| 000001 | 10 |
| 000010 | 10 |
| 000011 | 10 |
| 000100 | 11 |
| 000101 | 11 |
| 000110 | 11 |
| 000111 | 11 |
| 001000 | 00 |
| 001001 | 00 |
| 001010 | 00 |
| 001011 | 00 |
| 001100 | 01 |
| 001101 | 01 |
| 001110 | 01 |
| 001111 | 01 |
| 010000 | 11 |
| 010001 | 11 |
| 010010 | 11 |
| 010011 | 11 |
| 010100 | 10 |
| 010101 | 10 |
| 010110 | 10 |
| 010111 | 10 |
| 011000 | 00 |
| 011001 | 01 |
| 011010 | 01 |
| 011011 | 00 |
| 011100 | 00 |
| 011101 | 01 |
| 011110 | 01 |
| 011111 | 00 |
| 100000 | 01 |
| 100001 | 01 |
| 100010 | 10 |
| 100011 | 10 |
| 100100 | 00 |
| 100101 | 00 |
| 100110 | 00 |
| 100111 | 00 |
| 101000 | 11 |
| 101001 | 11 |
| 101010 | 11 |
| 101011 | 11 |
| 101100 | 01 |
| 101101 | 01 |
| 101110 | 10 |
| 101111 | 10 |
| 110000 | 00 |
| 110001 | 01 |
| 110010 | 10 |
| 110011 | 11 |
| 110100 | 00 |
| 110101 | 01 |
| 110110 | 10 |
| 110111 | 11 |
| 111000 | 00 |
| 111001 | 01 |
| 111010 | 10 |
| 111011 | 11 |
| 111100 | 00 |
| 111101 | 01 |
| 111110 | 10 |
| 111111 | 11 |

<END>

MISCELLANEOUS OTHER TABLES

TABLE 3.4

Engine Control Data Structure

In addition to the CPU, there is a SPRYTE-rendering engine operatively coupled to the VRAM for writing image data into the VRAM. The CPU loads a general SPRYTE-rendering engine control word into a hardware address to control the Spryte-engine. The bits of this control word include those which manipulate the subposition bits before they are stored in VRAM. The control word structure is as follows:

| Bits | Name | Description |
|---|---|---|
| B31:B30= | B15POS | B15 oPEN selector for output of a PMPP section within the Spryte engine. (This bit can function as a subposition defining bit that is used by the pre-display interpolater.) 0 = reset it to 0, 1 = set it to 1, 2 = xx, 3 = keep it same as Source data |
| B29:B28= | B0POS | B0 oPEN selector for output of PMPP. (This bit can also function as a subposition defining bit that is used by the pre-display interpolater.) 0 = 0, 1 = 1, 2 = PPMP math, 3 = same as Source data |
| B27= | SWAPHV | 1 = Swap the H and V subpositions prior to their entry into the PPMP |
| B26= | ASCALL | 1 = Allow super clipping function (master enable switch) |
| B25= | xx | Reserved |
| B24= | CFBDSUB | 1 = use the H and V subposition bits of the cFB data in place of (vice) the SPRYTE source values when the cFB data is selected as a PPMP source. (Note: CFBDsel = (S1 = 1) OR (S2 = 2).) |
| B23:B22= | CFBDLSB | cFBD PPMP Blue LSB source. 0=0, 1=cFBD[B0], 2=cFBD[B4], 3=x |
| B21:B20= | IPNLSB | IPN PPMP Blue LSB source. 0=0, 1=IPN[B0], 2=IPN[B4], 3=x |

NOTE#1: The B0POS value of '2' is the only setting that uses PPMP math to control the B0 bit in the actually output oPEN signal. When this setting is chosen, the Blue LSB will also be included in the input parameters of the black detector.
-------<END OF TABLE 3.4>

TABLE 3.5

Spryte Data Preamble Words

The Spryte-rendering engine is also controlled by certain "Preamble" words that accompany a so-called Spyrte-control Block (SCoB). One of the preamble words (the second one) contains controls that affect the subposition bits that are to be stored in VRAM.

Second preamble word:

If the PACKED bit (in the SCoB) is '0', then the source data is totally literal. For totally literal Sprytes, there is a second preamble word. It contains the horizontal pixel count for each line of the source data and the word offset from one line of source data to the next. It also contains the other special bits needed for totally literal Sprytes. Note that these bits are only valid while the totally literal Spryte is being rendered. These bits are not used ...GATED AWAY... when the current Spryte is not totally literal.

| | | |
|---|---|---|
| B31->B24 | = | WOFFSET(8). Word offset from one line of data to the next (−2) (8 bits). bits 23-> 16 of offset are set to 0. |
| B25->B16 | = | WOFFSET(10). Word offset from one line of data to the next (−2) (10 bits). bits 31->26 of offset are set to 0. |
| B15 | = | Reserved, set to 0. |
| B14 | = | NOSWAP 1=disable the SWAPHV bit from the general Spryte control word. |
| B13->B12 | = | TLLSBIPN PPMP blue LSB source. 0=0, 1=IPN[0], 2=IPN[4], 3=IPN[5]. |
| B11 | = | LRFORM Left/right format. |
| B10->B0 | = | TLHPCNT Horizontal pixel count (−1) (11 bits). |

The TLLSB bits perform the same function that the IPNLSB bits perform in normal Sprytes.

If LRFORM = 1, the source data has the frame buffer format of the screen as a source format. Vertically adjacent pixels in the rectangular display space are horizontally adjacent in the 2 halves of a memory word. This is useful for 16 BPP totally literal. The unpacker will disable the 'B' FIFO data requests and alternately place pixels from the source into both FIFOs. Left 16 bits will go to 'A' FIFO, right 16 bits go to 'B' FIFO. The data requests for 'A' FIFO will be made in a request 'pair' to insure the reduction of page breaks and '6 tick latencies'. The hardware will lock the corner engines (regardless of the LCE bit).

TABLE 3.5-continued

Spryte Data Preamble Words

TLHPCNT is the number of pixels in the horizontal dimension (−1). This is the number of pixels that will be attempted to be rendered for each horizontal line of the Spryte. This value is used by the data unpacker. A '0' in the value will attempt 1 pixel. A '−1' in the value will attempt many pixels. There is no 'zero pixel count' value.

WOFFSET is the offset in words of memory from the start of one line of data to the start of the next line (−2). If the BPP for this Spryte is 8 or 16, use WOFFSET(10), else use WOFFSET(8). This number is a zero for the minimum sized Spryte (2 words).

By arranging WOFFSET and TLHPCNT correctly, you can extract a rectangular area of data our of a larger sized rectangular area of data.

The DMA engine will also use WOFFSET as the length value in the normal data fetch process. If WOFFSET and TLHPCNT are set badly, WOFFSET may expire first and the DMA engine will not cope properly.
-------<END OF TABLE 3.5>

In conclusion, it has been shown that image data is advantageously placed within independently addressable, parallel banks of a multi-bank video random access memory unit (VRAM) in order to perform multi-row interpolation without need for a row buffer for separately storing the image data of one or more entire rows during the multi-row interpolation. It has also been shown that a distance-weighted interpolation scheme can be approximated by averaging N low resolution values and that such an approximation can be carried out in a pipelined system.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

What is claimed is:

1. An enhanced resolution imaging system comprising:
   (a) a memory unit having a plurality of independently addressable storage banks for storing a plurality of low-resolution datawords respectively representing pixels of adjacent low-resolution image lines in memory locations of respective ones of the plural storage banks, the low-resolution image lines being aligned at least hypothetically one above the next so that their respective pixels define a plurality of low-resolution columns, with each column having at least four low-resolution pixels;
   (b) extracting means for extracting from the memory unit, in one or more extraction cycles, a group comprised of no more than N low-resolution pixel datawords, where N is an integer greater than one but less than the number of pixels in a low-resolution image line and where the extracted group includes low-resolution pixel datawords from at least two of said plural storage banks; and
   (c) interpolating means for interpolating the N low-resolution pixel datawords of the extracted group and producing therefrom an interpolated signal representing at least one high-resolution pixel.

2. An enhanced resolution imaging system according to claim 1 further comprising:
   (d) high-resolution display means, operatively coupled to the interpolating means, for displaying a high-resolution image containing a plurality of high-resolution pixels, where said high-resolution pixels are derived from the interpolated signal produced by said interpolating means and said high-resolution image contains more pixels than the number of pixels represented by said plurality of low-resolution datawords.

3. An enhanced resolution imaging system according to claim 2 wherein said high-resolution display means displays a high-resolution image consisting only of a plurality of high-resolution pixels derived from the interpolated signal produced by said interpolating means.

4. An enhanced resolution imaging system according to claim 1 wherein the extracted group includes low-resolution pixel datawords from at least two of said low-resolution columns and wherein the number of pixels in a low-resolution image line is 40 or more and N is selected from the group consisting of 2, 4, 9 and 16.

5. An enhanced resolution imaging system according to claim 4 wherein the number of pixels in a low-resolution image line is 320, wherein N is equal to 4, and wherein the 4 low-resolution pixel datawords of the extracted group are supplied substantially simultaneously to the interpolating means for interpolation.

6. An enhanced resolution imaging system according to claim 4 wherein the low-resolution datawords stored in respective memory locations of the plural storage banks represent forty or more successively adjacent, low-resolution image lines and thereby define a low-resolution image comprised of said forty or more successively adjacent, low-resolution image lines and wherein the interpolating means outputs a high-resolution image corresponding to the low-resolution image at a real-time video rate.

7. An enhanced resolution imaging system according to claim 4 wherein said low-resolution image includes at least 240 low-resolution image lines and wherein the interpolating means outputs a high-resolution image corresponding to the low-resolution image at a real-time video rate.

8. An enhanced resolution imaging system according to claim 1 further comprising:
   image-data processing means, operatively coupled to the video memory unit, for bi-directionally accessing the video memory unit to read and modify a low-resolution image comprised of said adjacent low-resolution image lines and represented by the plurality of low-resolution datawords stored in said plurality of independently addressable storage banks.

9. An enhanced resolution imaging system according to claim 8 further comprising:
   high-resolution display means, operatively coupled to the interpolating means, for displaying a high-resolution image containing a plurality of high-resolution pixels, where said high-resolution pixels are derived from the interpolated signal produced by said interpolating means; and interactive control means, operatively coupled to the image-data processing means, for controlling the processing of said low-resolution image by the image-data processing means, where the interactive control means supplies response signals to the image-data processing means representing responses by an observer to high-resolution pixels displayed by the high-resolution display means.

10. An enhanced resolution imaging system according to claim 9 wherein said image-data processing means modifies the low-resolution datawords in real-time to create the appearance of an animated high-resolution image on said high-resolution display means and wherein the responses of the observer to said animated high-resolution image are real-time responses.

11. An enhanced resolution imaging system according to claim 1 wherein said extracting means includes relative line-of-origin designating means for designating one of the low-resolution image lines as being current and another as being previous, and for identifying one or more of the extracted datawords as belonging to the previous low-resolution image line, and for further identifying one or more others of the extracted datawords as belonging to the current low-resolution image line; and wherein the interpolated signal produced by the interpolating means varies in response to which of the first recited, one or more extracted datawords belongs to the previous low-resolution image line, and which of the other one or more extracted datawords belongs to the current low-resolution image line.

12. An enhanced resolution imaging system according to claim 11 wherein said extracting means further includes relative column-of-origin designating means for identifying one or more of the extracted datawords as belonging to a previous low-resolution image column, and for further identifying one or more others of the extracted datawords as belonging to a current low-resolution image column; and wherein the interpolated signal produced by the interpolating means varies in response to which of the one or more extracted datawords belongs to the previous low-resolution image column, and which of the one or more other extracted datawords belongs to the current low-resolution image column.

13. An enhanced resolution imaging system according to claim 12 further comprising:

pipeline-injecting means, cooperatively coupled to the relative column-of-origin designating means and relative line-of-origin designating means, for injecting said N low-resolution pixel datawords of the extracted group into a pipeline bus in time-multiplexed fashion according to the current versus previous row and column identifications made by the column-of-origin and line-of-origin designating means;

wherein the interpolating means is operatively coupled to receive the extracted group from the pipeline bus.

14. An enhanced resolution imaging system according to claim 13 further comprising:

destacker means, operatively coupled to receive time-multiplexed datawords from the pipeline-injecting means, for converting the format of the received datawords from time-multiplexed to parallel-in-time and for presenting the parallel-in-time datawords to the interpolating means.

15. An enhanced resolution imaging system comprising:

(a) a memory unit having a plurality of independently addressable storage banks for storing a plurality of low-resolution datawords respectively representing pixels of adjacent low-resolution image lines in memory locations of respective ones of the plural storage banks, the low-resolution image lines being aligned logically one above the next so that their respective pixels define a plurality of low-resolution columns, with each column having at least four low-resolution pixels;

(b) extracting means for extracting from the memory unit, in one or more extraction cycles, a group comprised of no more than N low-resolution pixel datawords, where N is an integer greater than one but less than the number of pixels in a low-resolution image line and where the extracted group includes low-resolution pixel datawords from at least two of said plural storage banks; and (c) interpolating means for interpolating the N low-resolution pixel datawords of the extracted group and producing therefrom an interpolated signal representing at least one high-resolution pixel;

wherein the memory unit further stores subposition data for each low-resolution pixel and wherein the interpolating means includes subposition-sensitive means for producing a high-resolution pixel dataword that is a function of the subposition data of the corresponding N low-resolution pixel datawords in the extracted group in addition to being a function of the N low-resolution pixel datawords.

16. An enhanced resolution imaging system according to claim 15 wherein the subposition data represents a relative position of each of the corresponding N low-resolution pixel datawords within an interpolation window and wherein said subposition-sensitive means produces each high-resolution pixel signal from said N low-resolution pixel datawords in accordance with a distance-dependent algorithm that uses the subposition data to variably define relative distances between each to-be-produced high-resolution pixel and its corresponding N low-resolution pixels.

17. An enhanced resolution imaging system according to claim 15 wherein the subposition-sensitive means produces a high-resolution pixel dataword satisfying an equation of the form:

$$PEN_{Target} = \frac{\sum_{i=1}^{i=N} PEN_{Si}/(c + d_{SiT}^Q)}{N} \quad \text{(Eq. 1a)}$$

wherein $PEN_{Target}$ represents the color/shading of a high-resolution target pixel, N is an integer greater than one, $d_{SiT}$ represents a normalized distance from the center of a low-resolution source area $S_i$ to the center of the target high-resolution pixel, Q represents a power to which the normalized distance is to be raised, c represents a zero-offset constant and $PEN_{Si}$ represents the color/shading of a low-resolution source area $S_i$.

18. An enhanced resolution imaging system according to claim 15 wherein the subposition-sensitive means produces a high-resolution pixel dataword in accordance with an equation of the form:

$$PEN_{Target} = \frac{\sum_{i=1}^{i=N} PEN_{Sj(i)}}{N} \quad \text{(Eq. 2)}$$

wherein N is an integer greater than one, $PEN_{Si}$ represents the color/shading of a low-resolution source area $S_i$, $PEN_{Target}$ represents the color/shading of a high-resolution target pixel, and for each value of i, source-identifier j(i) can acquire any value in the series 1, 2, ..., N.

19. An enhanced resolution imaging system according to claim 17 wherein Q is greater than or equal to 2.

20. An enhanced resolution imaging system according to claim 17 or 18 wherein the subposition-sensitive means includes:

target-configuration independent means for producing universal weighting signals for defining the color/shading of a high-resolution target pixel, $PEN_{Target}$, independently of the position of said target high-resolution pixel relative to the low-resolution source areas, $S_i$; and forward mapping means for converting subposition data that is specific to a particular target-configuration to universal subposition data corresponding to the target-configuration independent means.

21. An enhanced resolution imaging system according to claim 20 wherein the subposition-sensitive means further includes:

backward mapping means for converting the universal weighting signals produced by the target-configuration independent means into target-specific weighting signals corresponding to a specific target-configuration.

22. An enhanced resolution imaging system according to claim 15 wherein the memory unit further stores for each low-resolution pixel, a corresponding one or more bits of said subposition data, each corresponding one or more bits of subposition data being variable independently of the dataword for the corresponding low-resolution pixel.

23. An enhanced resolution imaging system according to claim 22 wherein the corresponding one or more bits of subposition data for each low-resolution pixel represents a relative position of the corresponding low-resolution pixel within an interpolation window when the corresponding low-resolution pixel is represented by one of the extracted N low-resolution pixel datawords and wherein said subposition-sensitive means produces each high-resolution pixel signal from said N low-resolution pixel datawords in accordance with a distance-dependent algorithm that uses the subposition data of the extracted N low-resolution pixel datawords to define relative distances between each to-be-produced high-resolution pixel and its corresponding N low-resolution pixels.

24. An enhanced resolution imaging system according to claim 22 wherein each low-resolution pixel has a blue color component and one or more other color components and wherein a first group of bits within the corresponding low-resolution dataword that represent the blue color component consists of fewer bits than each of one or more other groups of bits within the corresponding low-resolution dataword that respectively represent the one or more other color components.

25. An enhanced resolution imaging system comprising:

(a) a memory unit having a plurality of addressable storage locations storing a plurality of low-resolution datawords representing pixels of adjacent low-resolution image lines;

(b) extracting means for extracting from the memory unit, a group consisting of N low-resolution pixel datawords, where N is an integer greater than one, and where the extracted group includes low-resolution pixel datawords representing pixels from at least two of said low-resolution image lines; and (c) interpolating means for interpolating the N low-resolution pixel datawords of the extracted group and producing therefrom an interpolated signal representing at least one high-resolution pixel dataword;

wherein the memory unit further stores subposition data for each low-resolution pixel and wherein the interpolating means includes subposition-sensitive means for producing a high-resolution pixel dataword that is a function of the subposition data of the corresponding N low-resolution pixel datawords in the extracted group in addition to being a function of the N low-resolution pixel datawords.

26. An enhanced resolution imaging system according to claim 25 further comprising:

(d) high-resolution display means, operatively coupled to the interpolating means, for displaying a high-resolution image containing a plurality of high-resolution pixels, where said high-resolution pixels are derived from the interpolated signal produced by the subposition-sensitive means in accordance with the subposition data.

27. An enhanced resolution imaging system according to claim 25 wherein the subposition data represents a relative position of each of the corresponding N low-resolution pixel datawords within an interpolation window and wherein said subposition-sensitive means produces each high-resolution pixel signal from said N low-resolution pixel datawords in accordance with a distance-dependent algorithm that uses the subposition data to define relative distances between each to-be-produced high-resolution pixel and its corresponding N low-resolution pixels.

28. An enhanced resolution imaging system according to claim 25 wherein the subposition-sensitive means produces a high-resolution pixel dataword in accordance with an equation of the form:

$$PEN_{Target} = \frac{\sum_{i=1}^{i=N} PEN_{Sj(i)}}{N} \quad \text{(Eq. 2)}$$

wherein N is an integer greater than one, $PEN_{Si}$ represents the color/shading of a low-resolution source area $S_i$, $PEN_{Target}$ represents the color/shading of a high-resolution target pixel, and for each value of i, source-identifier j(i) can acquire any value in the series 1, 2, ..., N.

29. An enhanced resolution imaging system according to claim 28 wherein the subposition-sensitive means includes:

target-configuration independent means for producing universal weighting signals for defining the color/shading of a high-resolution target pixel, $PEN_{Target}$, independently of the position of said target high-resolution pixel relative to the low-resolution source areas, $S_i$; and forward mapping means for converting subposition data that is specific to a particular target-configuration to universal subposition data corresponding to the target-configuration independent means.

30. An enhanced resolution imaging system according to claim 29 wherein the subposition-sensitive means further includes:

backward mapping means for converting the universal weighting signals produced by the target-configuration independent means into target-specific weighting signals corresponding to a specific target-configuration.

31. An enhanced resolution imaging system according to claim 25 wherein said extracting means includes relative line-of-origin designating means for designating one of the low-resolution image lines as being current and another as being previous, and for identifying one or more of the extracted datawords as belonging to the previous low-resolution image line, and for further identifying one or more others of the extracted datawords as belonging to the current low-resolution image line; and wherein the interpolated signal produced by the interpolating means varies in response to which of the first recited, one or more extracted datawords belongs to the previous low-resolution image line, and which of the other one or more extracted datawords belongs to the current low-resolution image line.

32. An enhanced resolution imaging system according to claim 31 further comprising:

pipeline-injecting means, cooperatively coupled to the relative line-of-origin designating means, for injecting said N low-resolution pixel datawords of the extracted group into a pipeline bus in time-multiplexed fashion according to the current versus previous row identifications made by the line-of-origin designating means;

wherein the interpolating means is operatively coupled to receive the extracted group from the pipeline bus.

33. An enhanced resolution imaging system according to claim 32 further comprising:

destacker means, operatively coupled to receive time-multiplexed datawords from the pipeline-injecting means, for converting the format of the received datawords from time-multiplexed to parallel-in-time and for presenting the parallel-in-time datawords to the interpolating means.

34. An enhanced resolution imaging system according to claim 25 wherein the memory unit stores with the dataword of each low-resolution pixel, a corresponding one or more bits of said subposition data, each corresponding one or more bits of subposition data being variable independently of the dataword for the corresponding low-resolution pixel.

35. An enhanced resolution imaging system according to claim 34 wherein the corresponding one or more bits of subposition data for each low-resolution pixel represents a relative position of the corresponding low-resolution pixel within an interpolation window when the corresponding low-resolution pixel is represented by one of the extracted N low-resolution pixel datawords and wherein said subposition-sensitive means produces each high-resolution pixel signal from said N low-resolution pixel datawords in accordance with a distance-dependent algorithm that uses the subposition data of the extracted N low-resolution pixel datawords to define relative distances between each to-be-produced high-resolution pixel and its corresponding N low-resolution pixels.

36. An enhanced resolution imaging system according to claim 34 wherein each low-resolution pixel has a blue color component and one or more other color components and wherein a first group of bits within the corresponding low-resolution dataword that represent the blue color component consists of fewer bits than each of one or more other groups of bits within the corresponding low-resolution dataword that respectively represent the one or more other color components.

37. A method for enhancing the resolution of low-resolution image-data, said method comprising the steps of:

providing a memory having independently addressable storage banks; and storing the low-resolution image-data in the memory such that low-resolution image-data defining a first low-resolution row resides in a first of said storage banks and such that low-resolution image-data defining a second low-resolution row, adjacent to the first low-resolution row, resides in a second of said storage banks;

extracting no more than first through Nth low-resolution pixel signals from the memory in a given extraction operation, said signals representing values of low-resolution pixels in the adjacent first and second low-resolution rows of the low-resolution image-data, where N is an integer greater than one but substantially less than the number of pixels in a low-resolution image line; and supplying the extracted first through Nth low-resolution pixel signals to an interpolating means for interpolation therein.

38. A resolution enhancing method according to claim 37, further comprising the step of:

producing a high-resolution pixel signal in the interpolating means from the supplied first through Nth low-resolution pixel signals in accordance with an equation of the form:

$$PEN_{Target} = \frac{\sum_{i=1}^{i=N} PEN_{Si}/(c + d_{SiT}^Q)}{N} \quad \text{(Eq. 1a)}$$

wherein $PEN_{Target}$ represents the color/shading of a high-resolution target pixel, N is an integer greater than one, $d_{SiT}$ represents a normalized distance from the center of a low-resolution source square $S_i$ to the center of the target high-resolution pixel, Q represents a power to which the normalized distance is to be raised, c represents a zero-offset constant and $PEN_{Si}$ represents the color/shading of a low-resolution source area $S_i$.

39. A resolution enhancing method according to claim 37, further comprising the step of:

producing a high-resolution pixel signal in the interpolating means from the supplied first through Nth low-resolution pixel signals in accordance with a distance-weighted algorithm, said distance being defined as the distance between the center of the high-resolution pixel and centers of the N low-resolution pixels when the corresponding high-resolution image is hypothetically projected onto the low-resolution image.

40. A method according to claim 37 for enhancing the resolution of low-resolution image-data, said method further comprising the steps:

interpolating each supplied group of extracted first through Nth low-resolution pixel signals in the interpolating means to produce therefrom an interpolated signal that defines a corresponding high-resolution pixel; and displaying a high-resolution image consisting of a plurality of high-resolution pixels, where said high-resolution pixels are each derived from a corresponding interpolated signal produced by said interpolating means and said high-resolution image contains more pixels than the number of pixels represented by said plurality of low-resolution datawords.

41. A method for enhancing the resolution of low-resolution image-data, said method comprising the steps of:

providing a memory having independently addressable storage banks;

storing the low-resolution image-data in the memory such that low-resolution image-data defining a first low-resolution row resides in a first of said storage banks and such that low-resolution image-data defining a second low-resolution row, adjacent to the first low-resolution row, resides in a second of said storage banks:

extracting no more than first through Nth low-resolution pixel signals from the memory in a given extraction operation, said signals representing values of low-resolution pixels in the adjacent first and second low-resolution rows of the low-resolution image-data, where N is an integer greater than one but substantially less than the number of pixels in a low-resolution image line;

supplying the extracted first through Nth low-resolution pixel signals to an interpolating means for interpolation therein; and producing a high-resolution pixel signal in the interpolating means from the supplied first through Nth low-resolution pixel signals in accordance with an equation of the form:

$$PEN_{Target} = \frac{\sum_{i=1}^{i=N} PEN_{Sj(i)}}{N} \quad \text{(Eq. 2)}$$

wherein N is an integer greater than one, $PEN_{Si}$ represents the color/shading of a low-resolution source area $S_i$, $PEN_{Target}$ represents the color/shading of a high-resolution target pixel, and for each value of i, j (i) can acquire any value in the series 1, 2, . . . , N.

42. A method according to claim 41 for enhancing the resolution of low-resolution image-data, said method further comprising the step:

selecting j(i) for each i so as to approximate a distance-weighted algorithm, where the distance is defined as the distance between the center of the high-resolution pixel and centers of the N low-resolution pixels when the corresponding high-resolution image is hypothetically projected onto the low-resolution image.

43. The method of claim 42 further comprising the step of:

displaying a high-resolution image consisting of a plurality of high-resolution pixels, where said high-resolution pixels are each derived from a corresponding high-resolution pixel signal produced by said interpolating means and said high-resolution image contains more pixels than the number of pixels represented by said plurality of low-resolution datawords.

* * * * *

UNITED STATES PATENT AND TRADEMARK OFFICE
CERTIFICATE OF CORRECTION

PATENT NO. : 5,481,275
DATED : January 2, 1996
INVENTOR(S) : Robert J. Mical et al.

It is certified that error appears in the above-indentified patent and that said Letters Patent is hereby corrected as shown below:

```
Column 1,  line 46, "07/970,380" should be --07/970,308--.
           line 53, "07/970,278" should be --07/970,274--.
Column 20, line 20, after "deemed" insert --"previous".---
Column 26, line 35, "S3" should be --SB--.
           line 37, "S2" should be --SB--.
Column 31, line 40, "(or M--M3')" should be --(or M0'-M3')--.
Column 36, 17th line of code, left column should be
           --00010100--.
Column 49, line 44, delete "at least hypothetically" and
           insert therefor --logically--.
```

Signed and Sealed this

Seventh Day of May, 1996

Attest:

BRUCE LEHMAN

Attesting Officer

Commissioner of Patents and Trademarks